(12) United States Patent
Jeyakumar et al.

(10) Patent No.: US 11,303,655 B2
(45) Date of Patent: Apr. 12, 2022

(54) MULTISTAGE ANALYSIS OF EMAILS TO IDENTIFY SECURITY THREATS

(71) Applicant: Abnormal Security Corporation, San Francisco, CA (US)

(72) Inventors: Sanjay Jeyakumar, Berkeley, CA (US); Jeshua Alexis Bratman, Brooklyn, NY (US); Dmitry Chechik, San Carlos, CA (US); Abhijit Bagri, Oakland, CA (US); Evan James Reiser, San Francisco, CA (US); Sanny Xiao Yang Liao, San Francisco, CA (US); Yu Zhou Lee, San Francisco, CA (US); Carlos Daniel Gasperi, New York, NY (US); Kevin Lau, Long Island, NY (US); Kai Jing Jiang, San Francisco, CA (US); Su Li Debbie Tan, San Mateo, CA (US); Jeremy Kao, Corona, CA (US); Cheng-Lin Yeh, Menlo Park, CA (US)

(73) Assignee: Abnormal Security Corporation, San Francisco, CA (US)

( * ) Notice: Subject to any disclaimer, the term of this patent is extended or adjusted under 35 U.S.C. 154(b) by 0 days.

(21) Appl. No.: 16/927,427

(22) Filed: Jul. 13, 2020

(65) Prior Publication Data
US 2020/0344251 A1   Oct. 29, 2020

Related U.S. Application Data

(63) Continuation-in-part of application No. PCT/US2019/067279, filed on Dec. 18, 2019, which
(Continued)

(51) Int. Cl.
*H04L 29/06* (2006.01)
*G06F 16/958* (2019.01)
(Continued)

(52) U.S. Cl.
CPC ........ *H04L 63/1416* (2013.01); *G06F 16/951* (2019.01); *G06F 16/9558* (2019.01);
(Continued)

(58) Field of Classification Search
CPC ............. H04L 63/1416; H04L 63/1483; G06F 16/9558; G06F 16/951; G06F 16/986; G06Q 10/107; G06N 20/00
See application file for complete search history.

(56) References Cited

U.S. PATENT DOCUMENTS 6,088,717 A   7/2000 Reed
7,263,506 B2  8/2007 Lee
(Continued)

OTHER PUBLICATIONS

Mahajan et al. "Finding HTML Presentation Failures Using Image Comparison Techniques", ASE'14, pp. 91-96 (Year: 2014).*
(Continued)

*Primary Examiner* — Daniel B Potratz
*Assistant Examiner* — Wansikyou You
(74) *Attorney, Agent, or Firm* — Van Pelt, Yi & James LLP

(57) ABSTRACT

Conventional email filtering services are not suitable for recognizing sophisticated malicious emails, and therefore may allow sophisticated malicious emails to reach inboxes by mistake. Introduced here are threat detection platforms designed to take an integrative approach to detecting security threats. For example, after receiving input indicative of an approval from an individual to access past email received by employees of an enterprise, a threat detection platform can download past emails to build a machine learning (ML) model that understands the norms of communication with internal contacts (e.g., other employees) and/or external contacts (e.g., vendors). By applying the ML model to
(Continued)

incoming email, the threat detection platform can identify security threats in real time in a targeted manner.

24 Claims, 41 Drawing Sheets

Related U.S. Application Data is a continuation-in-part of application No. 16/672,854, filed on Nov. 4, 2019.

(60) Provisional application No. 62/782,158, filed on Dec. 19, 2018, provisional application No. 62/807,888, filed on Feb. 20, 2019, provisional application No. 62/813,603, filed on Mar. 4, 2019.

(51) Int. Cl.
  *G06N 20/00* (2019.01)
  *G06F 16/951* (2019.01)
  *G06Q 10/10* (2012.01)
  *G06F 16/955* (2019.01)

(52) U.S. Cl.
  CPC ............ *G06F 16/986* (2019.01); *G06N 20/00* (2019.01); *G06Q 10/107* (2013.01); *H04L 63/1483* (2013.01)

(56) References Cited

U.S. PATENT DOCUMENTS

| | | | |
|---|---|---|---|
| 7,451,487 B2 | 11/2008 | Oliver | |
| 7,610,344 B2 | 10/2009 | Mehr et al. | |
| 7,953,814 B1 | 5/2011 | Chasin | |
| 8,566,938 B1 | 10/2013 | Prakash | |
| 8,819,819 B1 | 8/2014 | Johnston | |
| 8,935,788 B1 | 1/2015 | Diao | |
| 9,009,824 B1 | 4/2015 | Chen | |
| 9,154,514 B1 | 10/2015 | Prakash | |
| 9,245,115 B1 | 1/2016 | Jakobsson | |
| 9,264,418 B1 | 2/2016 | Crosley | |
| 9,348,981 B1 | 5/2016 | Hearn | |
| 9,473,437 B1 | 10/2016 | Jakobsson | |
| 9,537,880 B1 | 1/2017 | Jones | |
| 9,686,308 B1 | 6/2017 | Srivastava | |
| 9,774,626 B1 | 9/2017 | Himler | |
| 9,781,152 B1 | 10/2017 | Mistratov | |
| 9,847,973 B1 | 12/2017 | Jakobsson | |
| 9,967,268 B1 | 5/2018 | Hewitt | |
| 10,104,029 B1 | 10/2018 | Chambers et al. | |
| 10,129,194 B1 | 11/2018 | Jakobsson | |
| 10,129,288 B1 | 11/2018 | Xie | |
| 10,243,989 B1 | 3/2019 | Ding et al. | |
| 10,277,628 B1 | 4/2019 | Jakobsson | |
| 10,362,057 B1 | 7/2019 | Wu | |
| 10,397,272 B1* | 8/2019 | Bruss | G06F 21/568 |
| 10,601,865 B1 | 3/2020 | Mesdaq et al. | |
| 10,721,195 B2 | 7/2020 | Jakobsson | |
| 10,911,489 B1 | 2/2021 | Chechik | |
| 11,019,076 B1 | 5/2021 | Jakobsson | |
| 2002/0002520 A1 | 1/2002 | Gatto | |
| 2005/0187934 A1 | 8/2005 | Motsinger | |
| 2006/0253581 A1 | 11/2006 | Dixon | |
| 2007/0074169 A1 | 3/2007 | Chess | |
| 2007/0276851 A1 | 11/2007 | Friedlander | |
| 2008/0086532 A1 | 4/2008 | Cunningham | |
| 2008/0114684 A1 | 5/2008 | Foster | |
| 2009/0037350 A1 | 2/2009 | Rudat | |
| 2009/0132490 A1 | 5/2009 | Okraglik | |
| 2010/0318614 A1 | 12/2010 | Sager | |
| 2011/0173142 A1* | 7/2011 | Dasgupta | G06N 20/00 709/206 |
| 2012/0028606 A1 | 2/2012 | Bobotek | |
| 2012/0110672 A1 | 5/2012 | Judge | |
| 2012/0278887 A1 | 11/2012 | Vitaldevara | |
| 2012/0290712 A1 | 11/2012 | Walter | |
| 2012/0297484 A1 | 11/2012 | Srivastava | |
| 2013/0041955 A1 | 2/2013 | Chasin | |
| 2014/0013441 A1 | 1/2014 | Hencke | |
| 2014/0032589 A1 | 1/2014 | Styler | |
| 2014/0380478 A1 | 12/2014 | Canning | |
| 2015/0026027 A1 | 1/2015 | Priess | |
| 2015/0128274 A1 | 5/2015 | Giokas | |
| 2015/0143456 A1 | 5/2015 | Raleigh | |
| 2015/0161609 A1 | 6/2015 | Christner | |
| 2015/0228004 A1 | 8/2015 | Bednarek | |
| 2015/0234831 A1 | 8/2015 | Prasanna | |
| 2015/0237068 A1 | 8/2015 | Sandke et al. | |
| 2015/0295942 A1 | 10/2015 | Tao | |
| 2015/0339477 A1 | 11/2015 | Abrams | |
| 2016/0014151 A1* | 1/2016 | Prakash | G06N 7/005 726/22 |
| 2016/0036829 A1 | 2/2016 | Sadeh-Koniecpol et al. | |
| 2016/0057167 A1 | 2/2016 | Bach | |
| 2016/0156654 A1 | 6/2016 | Chasin | |
| 2016/0227367 A1 | 8/2016 | Alsehly et al. | |
| 2016/0253598 A1 | 9/2016 | Yamada | |
| 2016/0262128 A1* | 9/2016 | Hailpern | H04W 68/005 |
| 2016/0321243 A1 | 11/2016 | Walia et al. | |
| 2016/0328526 A1 | 11/2016 | Park et al. | |
| 2016/0344770 A1 | 11/2016 | Verma | |
| 2017/0041296 A1 | 2/2017 | Ford | |
| 2017/0048273 A1 | 2/2017 | Bach | |
| 2017/0098219 A1 | 4/2017 | Peram | |
| 2017/0111506 A1 | 4/2017 | Strong et al. | |
| 2017/0186112 A1 | 6/2017 | Polapala | |
| 2017/0223046 A1 | 8/2017 | Singh | |
| 2017/0230323 A1 | 8/2017 | Jakobsson | |
| 2017/0230403 A1 | 8/2017 | Kennedy | |
| 2017/0237776 A1 | 8/2017 | Higbee et al. | |
| 2017/0251006 A1 | 8/2017 | Larosa | |
| 2017/0289191 A1 | 10/2017 | Thioux et al. | |
| 2018/0084003 A1* | 3/2018 | Uriel | H04L 63/168 |
| 2018/0084013 A1 | 3/2018 | Dalton | |
| 2018/0091453 A1* | 3/2018 | Jakobsson | H04L 51/12 |
| 2018/0091476 A1 | 3/2018 | Jakobsson et al. | |
| 2018/0227324 A1 | 8/2018 | Chambers | |
| 2018/0295146 A1 | 10/2018 | Kovega | |
| 2018/0324297 A1 | 11/2018 | Kent et al. | |
| 2019/0014143 A1 | 1/2019 | Syme | |
| 2019/0026461 A1 | 1/2019 | Cidon | |
| 2019/0052655 A1 | 2/2019 | Benishti | |
| 2019/0065748 A1 | 2/2019 | Foster | |
| 2019/0068616 A1* | 2/2019 | Woods | G06F 21/53 |
| 2019/0089711 A1 | 3/2019 | Faulkner | |
| 2019/0104154 A1 | 4/2019 | Kumar | |
| 2019/0109863 A1 | 4/2019 | Traore | |
| 2019/0141183 A1 | 5/2019 | Chandrasekaran et al. | |
| 2019/0166161 A1 | 5/2019 | Anand | |
| 2019/0166162 A1 | 5/2019 | Anand | |
| 2019/0199745 A1 | 6/2019 | Jakobsson | |
| 2019/0205511 A1 | 7/2019 | Zhan | |
| 2019/0222606 A1 | 7/2019 | Schweighauser | |
| 2019/0238571 A1 | 8/2019 | Adir | |
| 2019/0384911 A1 | 12/2019 | Caspi | |
| 2020/0007502 A1 | 1/2020 | Everton | |
| 2020/0021609 A1 | 1/2020 | Kuppanna | |
| 2020/0053111 A1 | 2/2020 | Jakobsson | |
| 2020/0076825 A1 | 3/2020 | Vallur | |
| 2020/0125725 A1 | 4/2020 | Petersen | |
| 2020/0162483 A1 | 5/2020 | Farhady | |
| 2020/0204572 A1 | 6/2020 | Jeyakumar et al. | |
| 2020/0287936 A1 | 9/2020 | Nguyen | |
| 2020/0344251 A1 | 10/2020 | Jeyakumar et al. | |
| 2020/0374251 A1 | 11/2020 | Warshaw | |
| 2020/0389486 A1 | 12/2020 | Jeyakumar | |
| 2021/0058395 A1 | 2/2021 | Jakobsson | |
| 2021/0091962 A1 | 3/2021 | Finke | |
| 2021/0092154 A1 | 3/2021 | Kumar | |
| 2021/0168161 A1 | 6/2021 | Dunn | |
| 2021/0240836 A1 | 8/2021 | Hazony | |
| 2021/0272066 A1 | 9/2021 | Bratman | |
| 2021/0295179 A1 | 9/2021 | Eyal Altman | |

(56) References Cited

U.S. PATENT DOCUMENTS

| | | |
|---|---|---|
| 2021/0329035 A1 | 10/2021 | Jeyakumar |
| 2021/0336983 A1 | 10/2021 | Lee |
| 2021/0360027 A1 | 11/2021 | Boyer |
| 2021/0374679 A1 | 12/2021 | Bratman |
| 2021/0374680 A1 | 12/2021 | Bratman |

OTHER PUBLICATIONS

Mahajan et al. "Finding HTML Presentation Failures Using Image Comparison Techniques", ASE' 14, pp. 91-98 (Year: 2014).*

Mahajan et al. "Finding HTML Presentation Failures Using Image Comparison Techniques", ASE1 14, pp. 91-98 (Year: 2014).*

International Search Report and Written Opinion dated Apr. 24, 2020 of PCT/US2019/067279 (14 pages).

Barngrover, Adam, "Vendor Access Management with IGA", Saviynt Inc. Apr. 24, 2019 (Apr. 24, 2019) Retrieved on Apr. 17, 2021 (Apr. 17, 2021) from <https://saviynt.com/vendor-access-management-with-iga/> entire document, 2 pp.

Mont, Marco Casassa, "Towards accountable management of identity and privacy: Sticky policies and enforceable tracing services", 14th International Workshop on Database and Expert Systems Applications, 2003. Proceedings. IEEE, 2003. Mar. 19, 2003 (Mar. 19, 2003), Retrieved on Apr. 17, 2021 (Apr. 17, 2021) from <https://eeexplore.ieee.org/abstract/documenV1232051 > entire document, Mar. 19, 2003, 17 pp.

Proofpoint (Proofpoint Closed-Loop Email Analysis and Response, Aug. 2018, 2 pages) (Year: 2018).

* cited by examiner

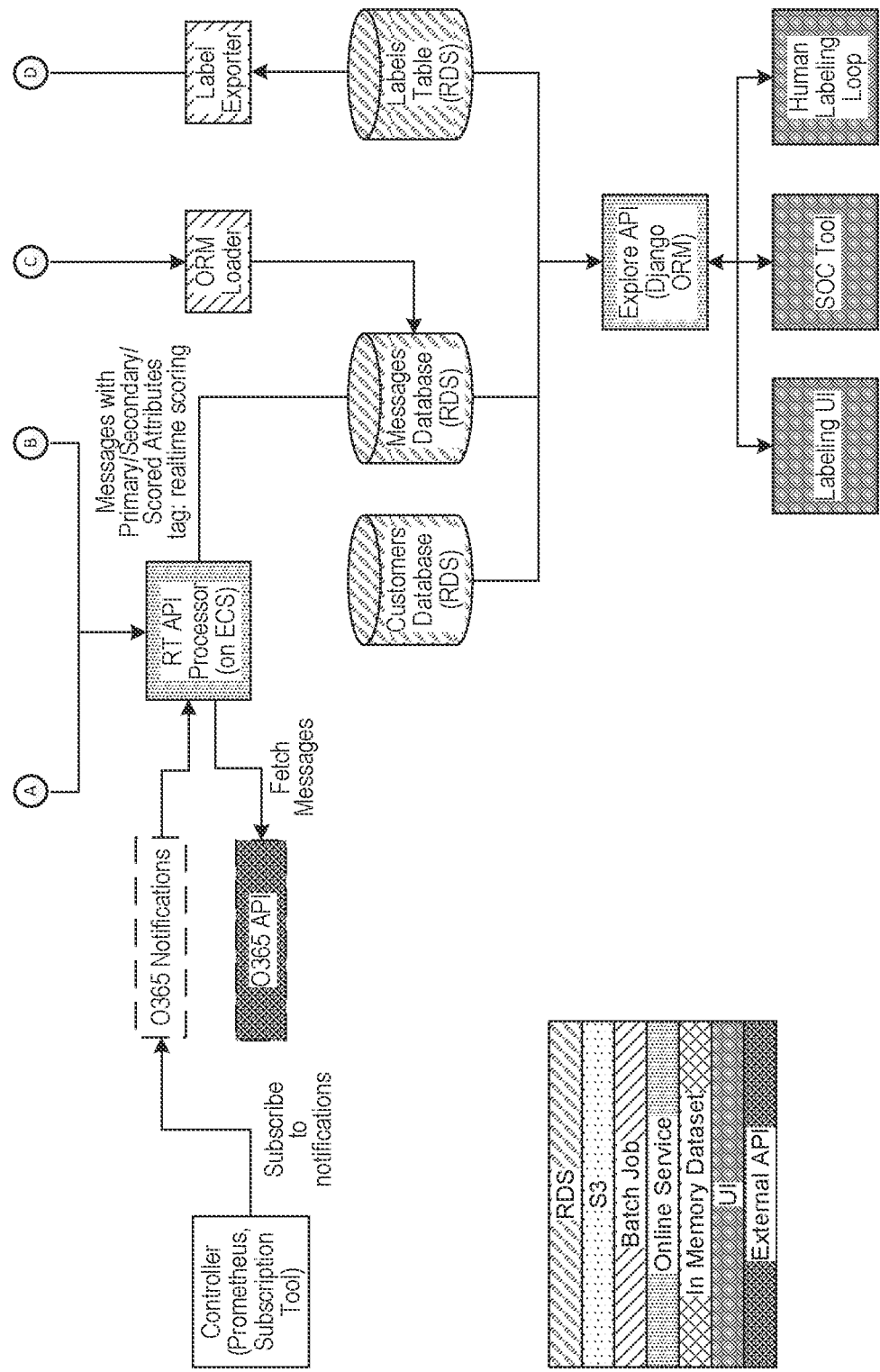
FIG. 8B, Cont.

Entity Risk Graph

Contains historical combinations of these entities and risk scores associated with that combination.

For Example:
- Risk score for Domain
- Risk score for IP
- Risk score for Employee sending from Domain
- Risk score for Employee A sending to Employee B
- Risk score for URL
- Risk score associated with the urgent intent in this message

Entities
- Person / Employee
- Device / IP
- Intent / Content
- Organizations / Brand
- Domain / URL
- Vendor / Invoice

*FIG. 11*

| Stage | Output(s) | Data Dependencies |
|---|---|---|
| Stage 1: Download | Raw Messages<br>Raw Attachments<br>Raw Outlook Directory List*<br>Raw Mail Filters*<br><br>*: Output may persist in memory, or may be temporarily stored in memory before being fed into Stage 2. | None |
| Stage 2: Extraction<br><br>Threat Detection Platform (TDP) can extract text, metadata, and/or attachment signals from an email message directly, or the TDP may use learned model parameter(s), such as embedding models, for text extraction. | Text Signals<br>Attachment Signals<br>Metadata Signals ("Primary Attributes")<br><br>Output can be fed into Stage 3 in, for example, columnar format. | Raw Messages<br>Raw Attachments<br>Raw Outlook Directory List<br>Raw Mail Filters<br>Raw Risk Events<br>Model DB (e.g., Text Model, Attachment Model)<br>Rules DB (e.g., for text-extraction rules) |
| Stage 3: Entity Resolution | Canonical identifiers of entities (e.g., people, brands, vendors) | |
| Stage 4: Summarization<br><br>TDP can produce summaries of historical features ("corpus stats"). | Key-value DBs (Date, Key) indexed summaries | Text Signals<br>Attachment Signals<br>Metadata Signals<br>Summarization Cfg |

*FIG. 13*

| Stage | Output(s) | Data Dependencies |
|---|---|---|
| Stage 5: Hydration and Scoring<br><br>DAG of rules/models that have access to join against auxiliary databases. | Derived Attributes ("Secondary Attributes")<br><br>Score Attributes (e.g., based on rules that define a likelihood of an attack)<br><br>Output can be fed into Stage 6 in, for example, columnar format. | Model DB (e.g., Sub-models and Detection Models)<br>Rules DB (e.g., User-defined Feature Rules and Detection Rules)<br>Summary DB ("Corpus Stats")<br>Employee DB<br>Brand DB<br>Domain DB<br>URL DB<br>Signature DB |
| Stage 6: Final Detection Decision<br><br>Each score attribute may have a threshold that is updated to maintain a target percentage flagged. | Is attack in {BORDERLINE, SUSPICIOUS, BAD}<br><br>May be stored in memory only. | Threshold DB |

*FIG. 13, Cont.*

FIG. 14A

Metadata Attributes Table (currently equivalent to Text Signals + Primary Attributes):

| Time | MsgID | Sender ID | Mailbox ID | Auth | From FQDN | URLS | phrases | bigrams | trigrams | Tokenized words | Word embeddings | ... | Text-model prediction | ... | Image hash | ... | signature |
|---|---|---|---|---|---|---|---|---|---|---|---|---|---|---|---|---|---|

FIG. 14B

Attachment Attributes Table (currently equivalent to Attachment Signals):

| Time | Attachment ID | URLs | Image Hashes | phrases | bigrams | trigrams | Attachment metadata | ... | Text-model prediction | ... |
|---|---|---|---|---|---|---|---|---|---|---|

FIG. 14C

| Date Key | Summary Type | Summary Key | This Count | Total Count |
|---|---|---|---|---|
| 2019-01-01 | Sender Registered Domain | gmail.com | 1000 | 10000000 |
| 2019-01-01 | Sender Email | Jeremy Zimmer x zimmerj@uta.com | 12 | 15 |
| 2019-01-01 | Sender Domain x PDF Creator | Westin.com x Free PDFCreator | 0 | 3 |

*FIG. 14D*

| Date Key | Person ID | Emails Used | Person | Level | ... | ... |
|---|---|---|---|---|---|---|
| 2019-01-01 | ID(Jeremy Zimmer) | 100: zimmerj@uta.co, 5: zimmer@gmail.com | Employee of UTA | CEO | | |

*FIG. 14E*

Threat Intel

A centralized system that captures Indicators of Compromise (IOC) collected from a variety of Abnormal's products Sort by: Recent ⌄    Filter by ⊕    Export Feed

| Time ⌄ | Threat Type | IoC | Indicator Source | Severity ⌄ | Confidence ⌄ | Source |
|---|---|---|---|---|---|---|
| 2 hours ago<br>September 30th 12:01pm | Phishing | URL ⓘ | http://12.34.56.78firstgenericbank/<br>account-update/ | Very High | 98 | View Attack |
| 2 hours ago<br>September 30th 12:01pm | Compromised | IP ⓘ | 216.3.128.12 | High | 96 | View Attack |
| 2 hours ago<br>September 30th 12:01pm | Phishing | Domain ⓘ | http://active-userid.com | Medium | 80 | View Attack |
| 2 hours ago<br>September 30th 12:01pm | Compromised | Account Email ⓘ | j.anderson@acme.org<br>Adewale Eze | Low | 96 | View Attack |

*FIG. 15B*

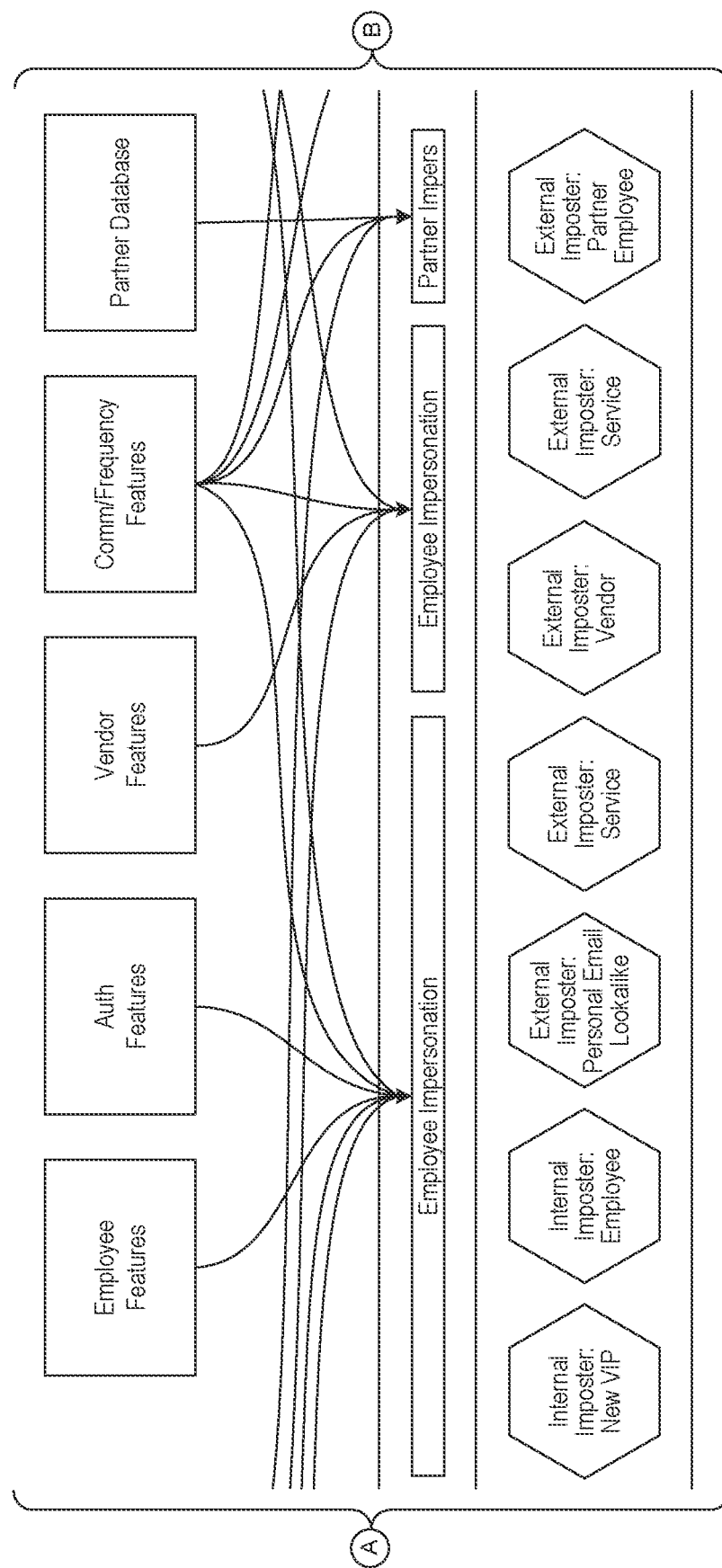
FIG. 16, Cont.

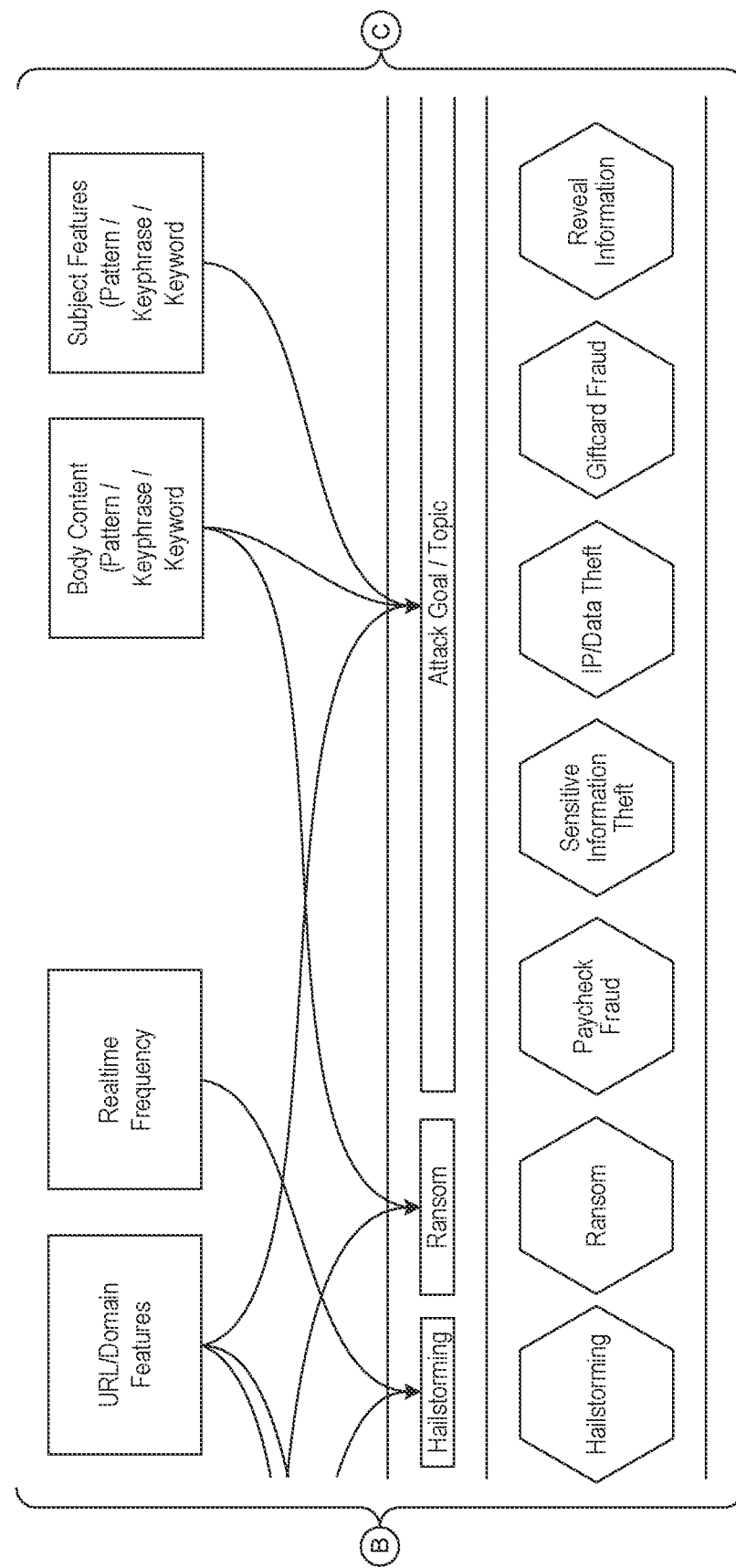
FIG. 16, Cont. 2

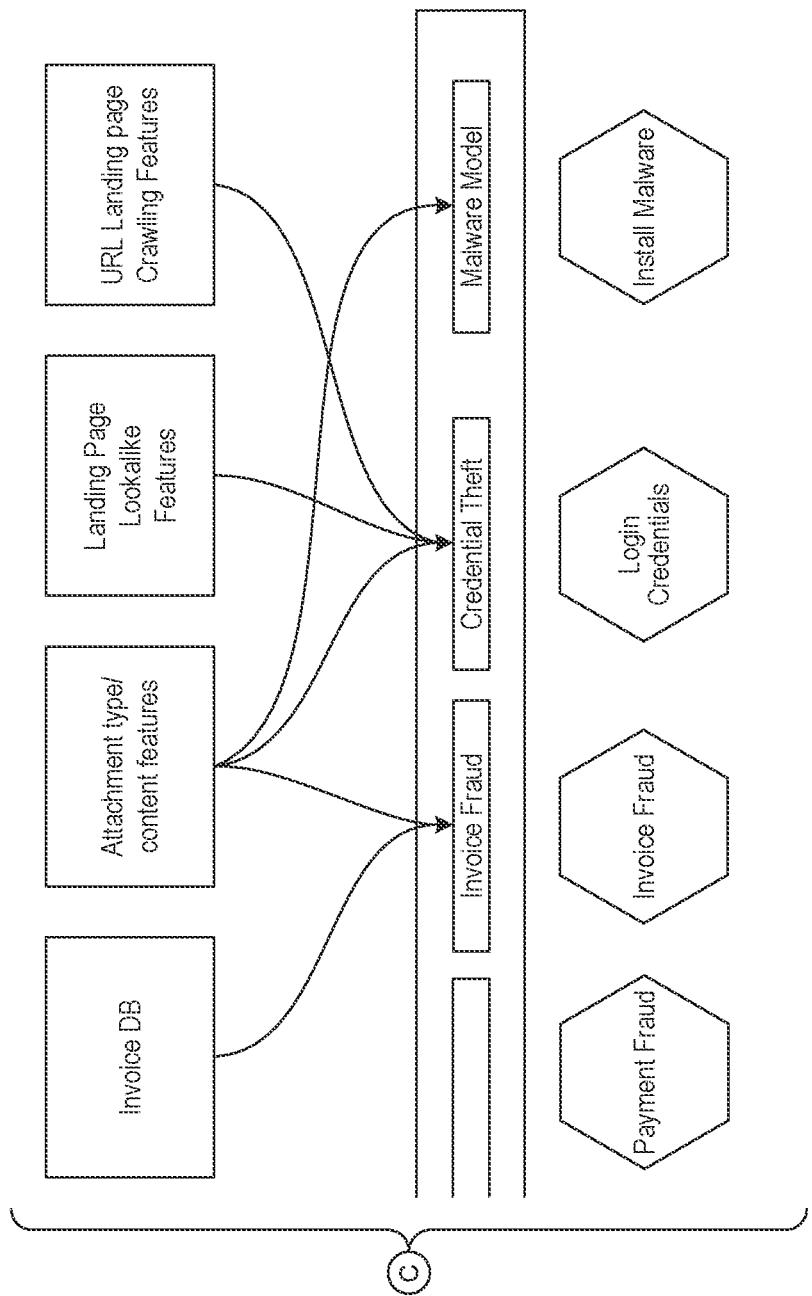
FIG. 16, Cont. 3

| Entity Type | Entity | Date Partition | Safe Count | Attack Count |
|---|---|---|---|---|
| Link Domain | dropbox.com | Mar 12th 2019 | 3894329 | 329 |
| Link Domain | sharepoint.com | Mar 12th 2019 | 93234323 | 8397 |
| Link Domain | instagram.com | Mar 12th 2019 | 9834792 | 0 |
| From Domain x Simple Auth | gmail.com x Pass | Mar 12th 2019 | 38294729 | 9837 |
| From Domain x Simple Auth | instagram.com x Fail | Mar 12th 2019 | 0 | 380 |
| From Email | sakura.ne.jp | Mar 12th 2019 | 0 | 5873 |
| Subject | Update your password NOW | Mar 12th 2019 | 73 | 1329 |

2101
Employ machine learning (ML) models to consume features extracted for an incoming email from primary and secondary attributes to determine whether the incoming email is representative of a security threat 2102
Glean signature for each indicator of compromise (IOC) to be ingested by database for use in discovering future attacks with same features 2103
Perform deep feature extraction to lessen likelihood of harm from sophisticated security threats

2201
Acquire an incoming email addressed to an employee of an enterprise

2202
Employ ML model(s) to identify linguistic features in the email from which a determination of risk can be made 2203
Determine whether the incoming email poses a risk to the enterprise based on insights derived from the linguistic features 2204
Cause display of a visualization component that indicates how these insights were derived on an interface

Analysis Overview

Attack Score: 99

Attack Type: VIP Impersonation (Requesting Action)

Analysis:
- Name Impersonation
- VIP
- Engage
- Text
- BEC – Payment Fraud
- Covid-19 Related Attack Abnormal Security has blocked this as a possible VIP Impersonation (Requesting Action) attack for the following reasons:

⚠ Attack Theme: COVID-19 Related
Message body contains language related to the COVID-19 pandemic, a common theme amongst attacks we have seen recently.

⚠ Identity Analysis: Possible Executive Impersonation
Out of 8443 real emails we've seen from 'Jonathan Green' (Chief Financial Officer), 0 have been sent from 'jonathan.green@gmail.com'.

⚠ Behavior Analysis: Atypical Contact
'Josh Waters' and 'Jonathan Green' have never previously corresponded.

⚠ Content Analysis: Urgent Financial Request
This email was flagged with a "Financial Request" topic and "Urgent" sentiment. Urgent financial requests are commonly associated with business email compromise.

7407+ signals analyzed    What is this?

---

Analysis Overview

Attack Score: 94

Attack Type: Internal Invoice/Payment Fraud

Analysis:
- Internal Account Compromise
- VIP
- Wire Fraud
- Attachment
- Email Account Compromise Abnormal Security has blocked this as a possible Internal Invoice/Payment Fraud attack for the following reasons:

⚠ Behavior Analysis: Never-Before-Seen Vendor
Of the 1791 vendors we have seen delivering invoices by email, 0 match the name 'Orion Limited'.

⚠ Invoice Analysis: Suspicious Invoice Attached
Of the 3007 invoices we've seen delivered by email, 0 contain the bank name and routing number in this invoice, and 0 contain the metadata "Creator=wkhtmltopdf 0.12.2.1" (previously observed in fraudulent invoices from "invoice-generator.com").

⚠ Identity Analysis: Suspicious Mail Filters
Email sender account ('renee.west@enterprise.com') has an unusual mail filter rules change. Mail filter rules changes are commonly associated with Email Account Compromise.

⚠ Possible Account Compromise
For "Renee West", we observed a too-fast-to-travel login from Hong Kong in the past 24 hours. Of the 776 real emails we've observed from 'Renee West', 0 have come from Hong Kong.

7248+ signals analyzed    What is this?

*FIG. 23B*

Email Content | Default View | User View | Analysis

Subject: Payment request
Sender: Jonathan Green VIP <jonathan.green@gmail.com>
Recipient: Josh Waters <josh.waters@enterprise.com>
To: Josh Waters <josh.waters@enterprise.com>
Apr 1st 10:11 AM PDT
[View Original Email Headers]

[Josh <recipient>] -- [Can you assist <request>] in [getting 2 stimulus <COVID-19>] checks out [today <date>] for the [COVID19 relief program <COVID-19>], I'm not available at the moment but will get you the consolidated [wiring instructions <financial>] for it. [Please confirm <request>] if you can handle [before noon. <time>]

Regards,
Jonathan
Sent from my iPhone

✓ Links: None
✓ Attachments: None

What is this?

Subject: [EXTERNAL] Covid 19 Stimulus Payment
Sender: Wellsfargo [codeiwzard@approject.org]
Recipient: Diamond, Jennifer <diamondjennifer@proliasystems.com>
To: Diamond, Jenny <diamondjennifer@proliasystems.com>
Apr 6th 09:12 AM PDT
[View Original Email Headers]

✉ wellsfargo.com

Your [Wells Fargo <organization>] [account <personal info>] has been credited from another customer. For security reasons your [payment <payment>] has been placed on hold to verify [account <personal info>] ownership.
To accept your [payment <payment>] on your [account <personal info>], [sign on <URL>] and go to Profile and Settings.
We're available [24 hours <time>] a day, 7 days a week. Please do not reply to this automated email.
Thank you. We appreciate your business.
[Wells Fargo <organization>] Online Customer Service
wellsfargo.com | Fraud Information Center
a635bc2d-fcb5-4e56-b6da-90016a1f3dd4

✓ Links: None
✓ Attachments: None

What is this?

2501
Receive an email addressed to an employee of an enterprise

2502
Apply a first model to the email to produce a first output indicative of whether the email is representative of a malicious email 2503
Determine, based on the first output, that the email is representative of a malicious email 2504
Apply a second model to the email to produce a second output indictive of whether the email is representative of a given type of malicious email 2505
Determine whether to remediate the email based on the second output 2506
Apply a third model designed to produce a comprehensible visualization component based on the second output

*FIG. 25*

MULTISTAGE ANALYSIS OF EMAILS TO IDENTIFY SECURITY THREATS

CROSS-REFERENCE TO RELATED APPLICATIONS

This application is a continuation-in-part of International Application No. PCT/US2019/67279, filed on Dec. 18, 2019, which claims priority to U.S. application Ser. No. 16/672,854, filed on Nov. 4, 2019. U.S. application Ser. No. 16/672,854 claims priority to U.S. Provisional Application No. 62/782,158, filed on Dec. 19, 2018, U.S. Provisional Application No. 62/807,888, filed on Feb. 20, 2019, and U.S. Provisional Application No. 62/813,603, filed on Mar. 4, 2019. The contents of these applications are incorporated by reference in their entirety.

TECHNICAL FIELD

Various embodiments concern computer programs and associated computer-implemented techniques for detecting email-based threats in the security field.

BACKGROUND

Employees of enterprise organizations (or simply "enterprises") will often receive malicious email in their inboxes. Some of these malicious emails are quite sophisticated. For instance, a malicious email that constitutes an attack on the employee or the enterprise may be designed to bypass existing protective measures, reach the employee's inbox, and then be opened. Such emails usually arrive unbeknownst to the security team of the enterprise.

Many employees will take action(s) upon receiving a malicious email that place data (e.g., her own personal data or enterprise data) at risk. For example, an employee may click on a link embedded in the malicious email, provide her credentials, send confidential information, or transmit money to the unauthorized entity (also referred to as an "attacker" or "adversary") responsible for generating the malicious email. Performance of such actions may result in the installation of malicious software, theft of credentials, compromise of the employee's email account, exfiltration of data, or theft of money.

Upon discovering the breach, the enterprise faces significant ramifications. These ramifications include:

Covering direct costs of the breach—especially if money was wired directly to the adversary;
Covering indirect costs of the breach, such as infected hardware and labor to remediate the attack; and/or
Covering fines assessed by regulatory agencies in the event of data theft.

Conventional email security software struggles to deal with attacks involving sophisticated malicious emails for several reasons.

First, an active adversary responsible for crafting personalized messages is often on the other side of sophisticated malicious emails. This is in contrast to less sophisticated email-based attacks, where a single person may send thousands or millions or generic, non-personalized emails in an attempt to succeed by sheer volume. Here, each sophisticated attack is new, unique, and personalized (e.g., for an employee or enterprise). Thus, employees will not observe the same sophisticated attack multiple times.

Second, sophisticated malicious emails generally will not include any attack signatures. The term "attack signature," as used herein, refers to a trait that has been previously observed in one or more emails determined to be malicious. Conventional solutions typically rely on attack signatures as well as pattern matching, but sophisticated malicious emails can obviate these conventional solutions through personalization. Moreover, some sophisticated malicious emails do not contain any links or attachments. Instead, a sophisticated malicious email may simply contain text, such as "Hey, can you handle a task for me?" Upon receiving a response, the adversary may instruct the employee to, for example, wire money or share data. Further, in the case of an employee's email account, all emails will originate from the actual email account, thereby making it extremely difficult to detect malicious activity.

Third, the volume of emails handled by an enterprise is large, and receipt of emails is time sensitive. The decision on whether an email constitutes fraud should be rendered quickly for most emails as email security software should not inject delay into the flow of email. However, in most instances, conventional email security software indefinitely delays the delivery of email determined to represent a security threat.

Fourth, a relatively small number of sophisticated malicious emails will be handled by an enterprise over a given timeframe. For example, an enterprise may only observe several examples of sophisticated malicious emails over the course of a week. Accordingly, breaches due to sophisticated content are rare, and thus little data exists that can be ingested by machine learning (ML) models designed to identify sophisticated malicious emails.

Thus, there is a need in the security field to create computer programs and associated computer-implemented techniques for detecting email-based threats and then mitigating those threats.

SUMMARY

A significant portion of targeted attacks on enterprises or their employees start with email, and these security threats are always evolving. As discussed above, a significant need for detecting and then resolving sophisticated email-based threats is becoming increasingly apparent. Conventional email security software does not adequately address the need for accurate, fast, and consistent detection of sophisticated malicious emails before those emails enter an inbox.

While a variety of different attack types should be addressed by a solution, two particular attack types present challenges in terms of detection and resolution. The first attack type is email account compromise (also referred to as "account takeover"). This form of attack is one in which an adversary accesses an employee's account with stolen credentials and then uses those credentials to steal money or data from the enterprise, or to send emails from the account in an effort to steal money or data from the enterprise or other employees. The second attack type is business email compromise. This form of attack is one in which an adversary impersonates an employee or a partner (e.g., a vendor). For example, the adversary may cause incoming email to appear as though it has been written by an employee (e.g., by changing the display name). This form of attack is usually performed in an effort to have an invoice—either legitimate or fictional—paid by the enterprise or to steal data.

Introduced here are threat detection platforms designed to collect and examine emails in order to identify security threats to an enterprise. A threat detection platform (also referred to as an "email security platform") can be designed to address the above-mentioned attack types as well as other attack types such as phishing (e.g., campaign-based attacks), spear phishing (e.g., personalized attacks), extortion (e.g., cryptocurrency, gift card, and wire transfer ransoms), financial/data theft (e.g., vendor, partner, and client impersonation), and many other types of attacks, including those that have never been seen before.

At a high level, the technologies described herein can function to build a model representative of the normal email behavior of an enterprise (or an individual employee of the enterprise) and then look for deviations to identify abnormalities by applying the model to incoming emails. By establishing what constitutes normal behavior traits and/or normal email content, the enterprise can be protected against new, sophisticated attacks such as employee impersonation, vendor impersonation, fraudulent invoices, email account compromise, and account takeover. Moreover, canonicalizing, structuring, and storing data related to email may permit other high-value datasets to be created. For example, a threat detection platform may be able to derive valuable information regarding enterprise resource planning (ERP) from the email data. As further discussed below, the technologies described herein can leverage machine learning, heuristics, rules, human-in-the-loop feedback and labeling, or some other technique for detecting an attack (e.g., in real time or near real time) based on features extracted from a communication (e.g., an email) and/or context of the communication (e.g., recipient, sender, content, etc.).

Remediation action may be taken once a security threat has been detected. The remediation actions, if any, deemed appropriate may depend on the type of security threat that has been detected. For example, a threat detection platform may perform different remediation actions upon discovering a malicious email that includes an embedded link rather than a malicious email with an attachment. As part of the threat detection, identification, and remediation process, the threat detection platform may consider as input user actions; user-reported emails; machine learning (ML) training data including human-labeled emails, historical threat information, and scores; probabilities for threat detection based on models of known types of attacks; and heuristics including rules for blacklisting and/or whitelisting emails that meet certain criteria.

BRIEF DESCRIPTION OF THE DRAWINGS

Various features of the technology will become more apparent to those skilled in the art from a study of the Detailed Description in conjunction with the drawings. Embodiments of the technology are illustrated by way of example and not limitation in the drawings, in which like references may indicate similar elements.

FIG. 11 depicts how an entity risk graph can contain historical combinations of entities that were discovered in an incoming email and risk scores associated with those historical combinations.

FIG. 13 provides an example matrix of the stages that may be performed by a threat detection platform as it processes data, extracts features, determines whether an event is representative of an attack, etc.

FIGS. 14A-H depict examples of different data structures that may be created/populated by the threat detection platform as it processes data, extracts features, determines whether an event is representative of an attack, etc.

FIG. 15B depicts an example of an interface through which an enterprise can examine IOCs discovered by the threat detection platform.

FIG. 19B depicts an example of a database that includes signatures and corpus statistics.

FIG. 21 depicts a high-level flow diagram of a process for scoring the threat posed by an incoming email.

FIG. 22 depicts a high-level flow diagram of a process for visually indicating how insights were derived by a threat detection platform.

FIG. 23A includes an example of a graphic that specifies why an email was flagged as a potential security threat.

FIG. 23B includes an example of a report (also referred to as a "summary") that specifies why an email was flagged as a potential security threat.

FIG. 23C includes several examples of emails that have been altered to visually indicate the analysis performed by the ML model(s) applied thereto.

FIG. 25 depicts a flow diagram of a process for detecting and characterizing email-based security threats in real time.

Figure 1:
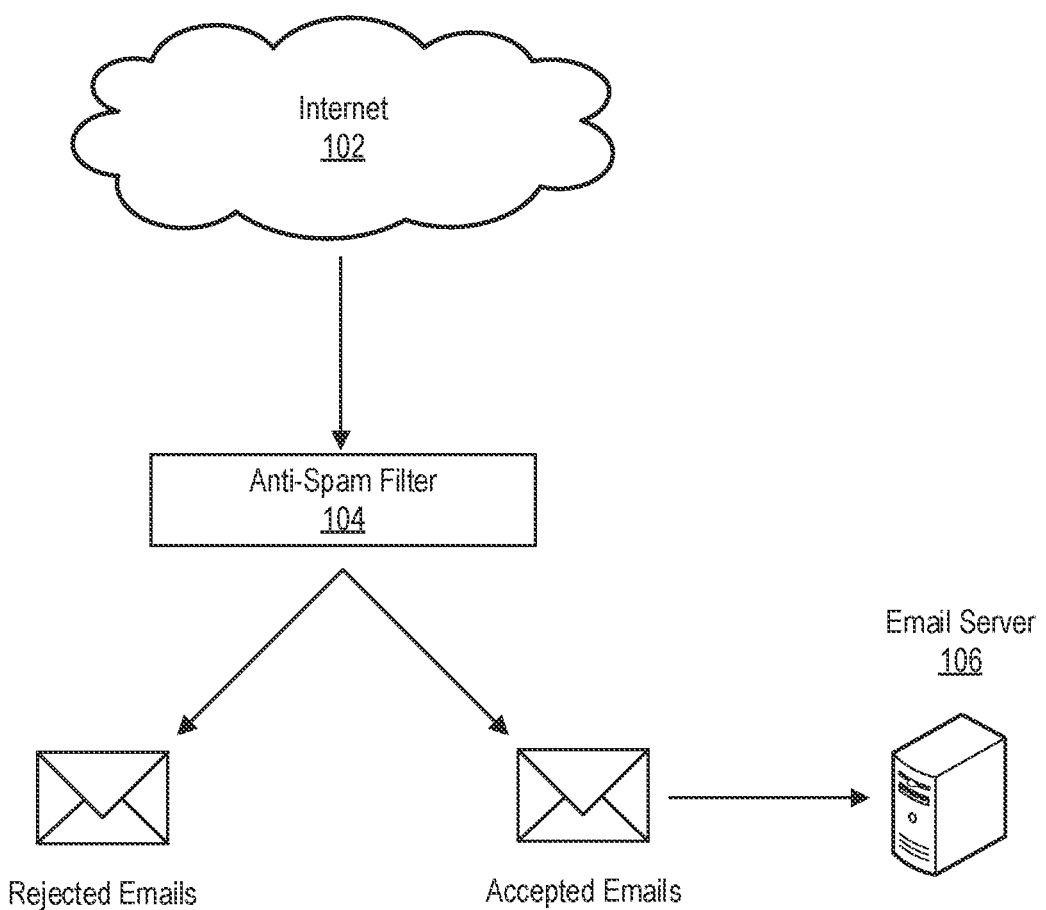
FIG. 1 illustrates how a conventional filtering service can examine incoming emails to determine which emails, if any, should be prevented from reaching their intended destination.

The drawings depict various embodiments for the purpose of illustration only. Those skilled in the art will recognize that alternative embodiments may be employed without departing from the principles of the technology. Accordingly, while specific embodiments are shown in the drawings, the technology is amenable to various modifications.

DETAILED DESCRIPTION

Introduced here are threat detection platforms designed to collect and examine emails in order to identify security threats to an enterprise. At a high level, the technologies described herein can function to build a model representative of the normal email behavior of an enterprise (or an individual employee of the enterprise) and then look for deviations to identify abnormalities by applying the model to incoming emails. By establishing what constitutes normal behavior traits and/or normal email content, the enterprise can be protected against new, sophisticated attacks such as employee impersonation, vendor impersonation, fraudulent invoices, email account compromise, and account takeover. As further discussed below, the technologies described herein can leverage machine learning, heuristics, rules, human-in-the-loop feedback and labeling, or some other technique for detecting an attack (e.g., in real time or near real time) based on features extracted from a communication (e.g., an email), attributes of the communication (e.g., recipient, sender, content, etc.), and/or datasets/information unrelated to communications. For instance, detecting sophisticated attacks that are plaguing an enterprise may require knowledge gleaned from multiple datasets. These datasets could include employee sign-in data, security events, calendar, contacts information, human resources (HR) information, etc. Each of these different datasets provides a different dimension to the normality of behavior of an employee and can be used to detect the most sophisticated attacks.

Remediation action may be taken once a security threat has been detected. The remediation actions, if any, deemed appropriate may depend on the type of security threat that has been detected. For example, a threat detection platform may perform different remediation actions upon discovering a malicious email that includes an embedded link rather than a malicious email with an attachment.

Embodiments may be described with reference to particular network configurations, attack types, etc. However, those skilled in the art will recognize that these features are equally applicable to other network configurations, attack types, etc. For example, while certain embodiments may be described in the context of the spear phishing attacks, the relevant feature(s) may be used in conjunction with other types of attacks.

Moreover, the technology can be embodied using special-purpose hardware (e.g., circuitry), programmable circuitry appropriately programmed with software and/or firmware, or a combination of special-purpose hardware and programmable circuitry. Accordingly, embodiments may include a machine-readable medium having instructions that may be used to program a computing device to perform a process for receiving input indicative of an approval to access email messages that were delivered to, or sent by, employees of an enterprise over a given interval of time, establishing a connection with a storage medium that includes the email messages, downloading the email messages into a local processing environment, building an ML model for identifying abnormal communication behaviors based on characteristics of the email messages, etc.

Terminology

References in this description to "an embodiment" or "one embodiment" means that the particular feature, function, structure, or characteristic being described is included in at least one embodiment. Occurrences of such phrases do not necessarily refer to the same embodiment, nor are they necessarily referring to alternative embodiments that are mutually exclusive of one another.

Unless the context clearly requires otherwise, the words "comprise" and "comprising" are to be construed in an inclusive sense rather than an exclusive or exhaustive sense (i.e., in the sense of "including but not limited to"). The terms "connected," "coupled," or any variant thereof is intended to include any connection or coupling between two or more elements, either direct or indirect. The coupling/connection can be physical, logical, or a combination thereof. For example, devices may be electrically or communicatively coupled to one another despite not sharing a physical connection.

The term "based on" is also to be construed in an inclusive sense rather than an exclusive or exhaustive sense. Thus, unless otherwise noted, the term "based on" is intended to mean "based at least in part on."

The term "module" refers broadly to software components, hardware components, and/or firmware components. Modules are typically functional components that can generate useful data or other output(s) based on specified input(s). A module may be self-contained. A computer program may include one or more modules. Thus, a computer program may include multiple modules responsible for completing different tasks or a single module responsible for completing all tasks.

When used in reference to a list of multiple items, the word "or" is intended to cover all of the following interpretations: any of the items in the list, all of the items in the list, and any combination of items in the list.

The sequences of steps performed in any of the processes described here are exemplary. However, unless contrary to physical possibility, the steps may be performed in various sequences and combinations. For example, steps could be added to, or removed from, the processes described here. Similarly, steps could be replaced or reordered. Thus, descriptions of any processes are intended to be open-ended.

Technology Overview

Basic filtering services are offered by most email platforms. FIG. 1 illustrates how a conventional filtering service can examine incoming emails to determine which emails, if any, should be prevented from reaching their intended destination. In some instances an enterprise applies an anti-spam filter to the incoming emails received via the Internet, while in other instances another entity, such as an email service, applies the anti-spam filter to the incoming emails on behalf of the enterprise. Emails received via the Internet 102 may be referred to as "external emails." The term "internal emails," meanwhile, may be used to refer to those emails that are sent within the enterprise. An example of an internal email is an intra-enterprise email (e.g., an email from one employee to another employee) that is delivered directly to the recipient mailbox rather than routed through the mail exchanger (MX) record, external gateways, etc.

Generally, the anti-spam filter 104 is designed to catch and quarantine malicious emails using blacklist(s) of senders, sender email addresses, and websites that have been detected in past unsolicited emails and/or policy frameworks defined by an enterprise. The term "anti-spam filter," as used herein can refer to any legacy email security mechanism capable of filtering incoming emails, including secure email gateways (SEGs) (also referred to as "gateways"). For example, the enterprise (or the email service) may maintain a list of sender email addresses from which malicious email has been received in the past. As another example, an enterprise may decide to implement a policy that prohibits employees from receiving emails originating from a given domain. Malicious emails that are caught by the anti-spam filter 104 can be quarantined so as to remain hidden from the intended recipients, while non-malicious emails may be stored on an email server 106 (e.g., a cloud-based email server) for subsequent access by the intended recipients. Email servers (also referred to as "mail servers") facilitate the delivery of emails from senders to recipients. Normally, an email will be transferred amongst a series of email servers as it travels toward its intended destination. This series of email servers allows emails to be sent between dissimilar email address domains.

Email servers can be broken down into two main categories: outgoing mail servers and incoming mail servers. Outgoing mail servers may be referred to as Simple Mail Transfer Protocol (SMTP) servers. Incoming mail servers will generally be either Post Office Protocol Version 3 (POP3) servers or Internet Message Access Protocol (IMAP) servers. POP3 servers are known for storing sent/received messages on local hard drives, while IMAP servers are known for storing copies of messages on servers (though most POP3 servers can store messages on servers too). Thus, the location of emails received by an enterprise may depend on the type of incoming mail server used by the enterprise.

Figure 2:
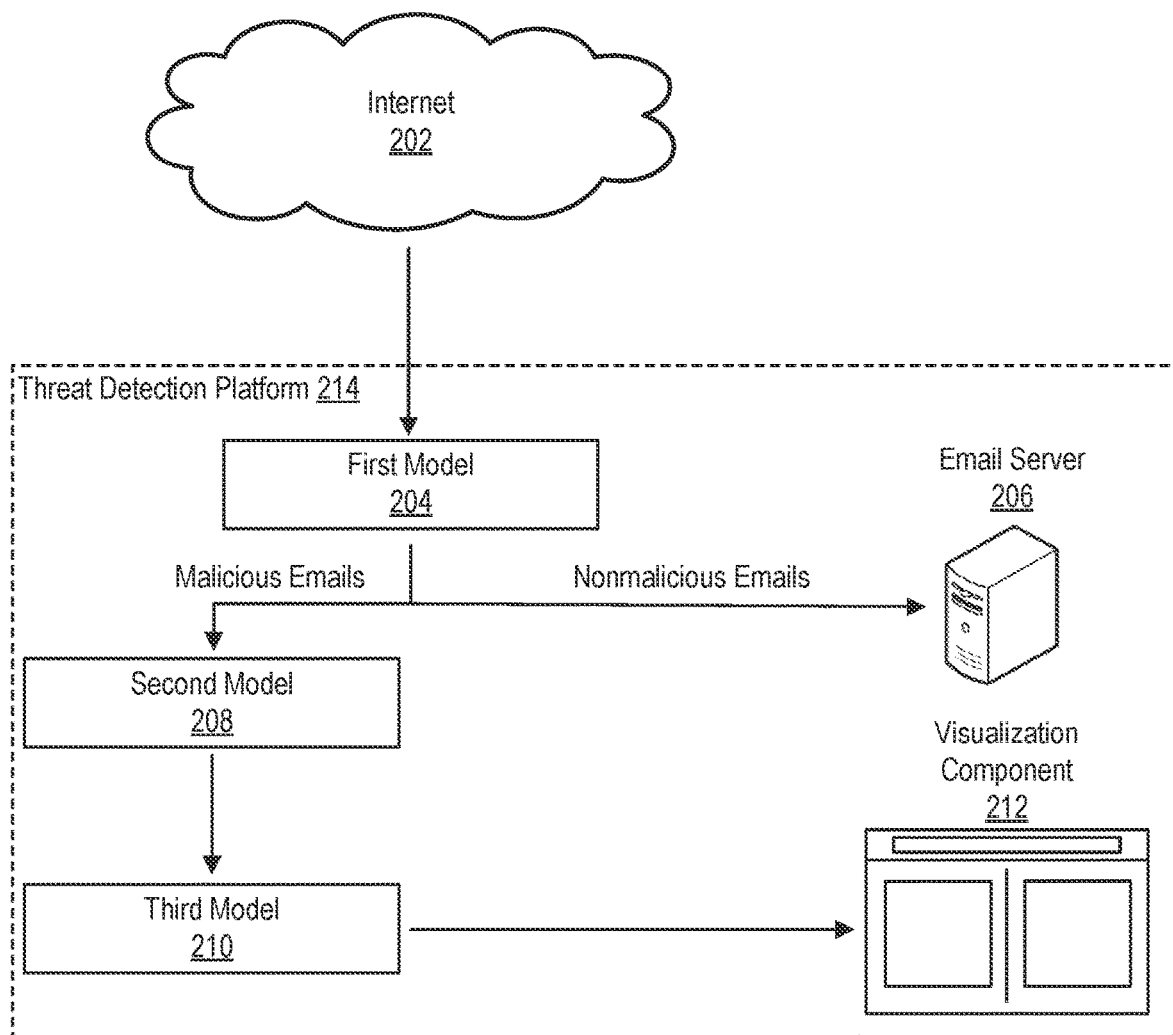
FIG. 2 illustrates how a threat detection platform may apply a multi-tiered ensemble model comprised of multiple sub-models to incoming emails received via the Internet to determine which emails, if any, should be prevented from reaching their intended destination.

As discussed above, such an arrangement is not suitable for recognizing sophisticated malicious emails. Accordingly, conventional filtering services often allow sophisticated malicious emails to reach employees' inboxes by mistake. Introduced here, therefore, are threat detection platforms designed to improve upon conventional filtering services. FIG. 2 illustrates how a threat detection platform 214 may apply a multi-tiered ensemble model comprised of multiple sub-models to incoming emails received via the Internet 202 to determine which emails, if any, should be prevented from reaching their intended destination.

Initially, the threat detection platform 214 may receive an email addressed to an employee of an enterprise. Upon receiving the email, the threat detection platform 214 may apply a first model 204 to the email to produce a first output indicative of whether the email is representative of a malicious email. The first model may be trained using past emails addressed to employee(s) of the enterprise that have been verified as non-malicious emails. Accordingly, the first model 204 may be referred to as the "surely-safe model." The first model 204 serves as the first level of threat detection, and therefore may be tuned/designed to permit most email (e.g., upwards of 90, 95, or 99 percent of all incoming email) to reach the email server 206. Normally, the first model 204 is designed such that the initial threat determination is made fairly quickly (e.g., in less than 100, 50, or 25 milliseconds). Thus, the first model 204 may be responsible for performing load shedding.

If the email cannot be verified as non-malicious by the first model 204, the threat detection platform 214 can apply a second model 208 to the email. For the purpose of illustration, emails forwarded to the second model 204 may be referred to as "malicious emails." However, these emails can be more accurately described as possibly malicious emails since the first model 204 is only able to verify whether emails are non-malicious. Upon being applied to the email, the second model 208 may produce a second output indicative of whether the email is representative of a given type of malicious email. Generally, the second model 208 is part of an ensemble of models applied to the email responsive to determining that the email is representative of a malicious email. Each model in the ensemble may be associated with a different type of security threat. For example, the ensemble may include separate models for determining whether the email includes a query for data/funds, a link to a Hypertext Markup Language (HTML) resource, an attachment, etc. As further discussed below, the second model 208 may be designed to establish different facets of the security threat responsive to a determination that the email is likely malicious. For instance, the second model 208 may discover facets of the security threat such as the strategy, goal, impersonated party, vector, and attacked party, and then upload this information to a profile associated with the intended recipient and/or the enterprise.

Then, the threat detection platform 214 may apply a third model 210 designed to convert the output produced by the second model 208 into a comprehensible visualization component 212. In embodiments where the second model 208 is part of an ensemble of models, the third model 210 can aggregate the outputs produced by the models in the ensemble, characterize the attack based on the aggregated outputs, and then convert the aggregated outputs into an explainable insight. For example, the third model 210 may generate a notification that identifies the type of security threat posed by the email, whether remediation actions are necessary, etc. As another example, the third model 210 may generate a human-readable insight (e.g., that includes text, graphics, or some combination thereof) using the facets, model features, and/or most discriminating features that triggered the determination that a security threat exists for the combination of email and attack. The explainable insight may be created so that security professionals responsible for addressing/mitigating security threats can more easily understand why the second model 208 flagged an incoming email as being representative of an attack.

Those skilled in the art will appreciate that the output of one model may be the entrance criteria for another model. Said another way, the order of the models employed by the threat detection platform 214 may triage which emails go to which models in an effort to reduce analysis time. Thus, the threat detection platform 214 may take a hierarchical bi-phasal approach to examining incoming emails.

The multi-tiered ensemble model may be comprised of different types of models, such as gradient boosting decision tree (GBDT) models, logistic regression models, and/or deep learning models. As further discussed below, each type of attack is generally scored by a separate model, so the threat detection platform 214 may employ different types of models based on the type of attack being detected.

Such an approach may be referred to as a "bi-phasal approach," as it allows emails determined to be non-malicious to be routed to the email server 206 with very little delay while additional time is spent analyzing emails determined to be malicious (or at least potentially malicious).

Threat Detection Platform for Detecting Email-Based Threats

Figure 3:
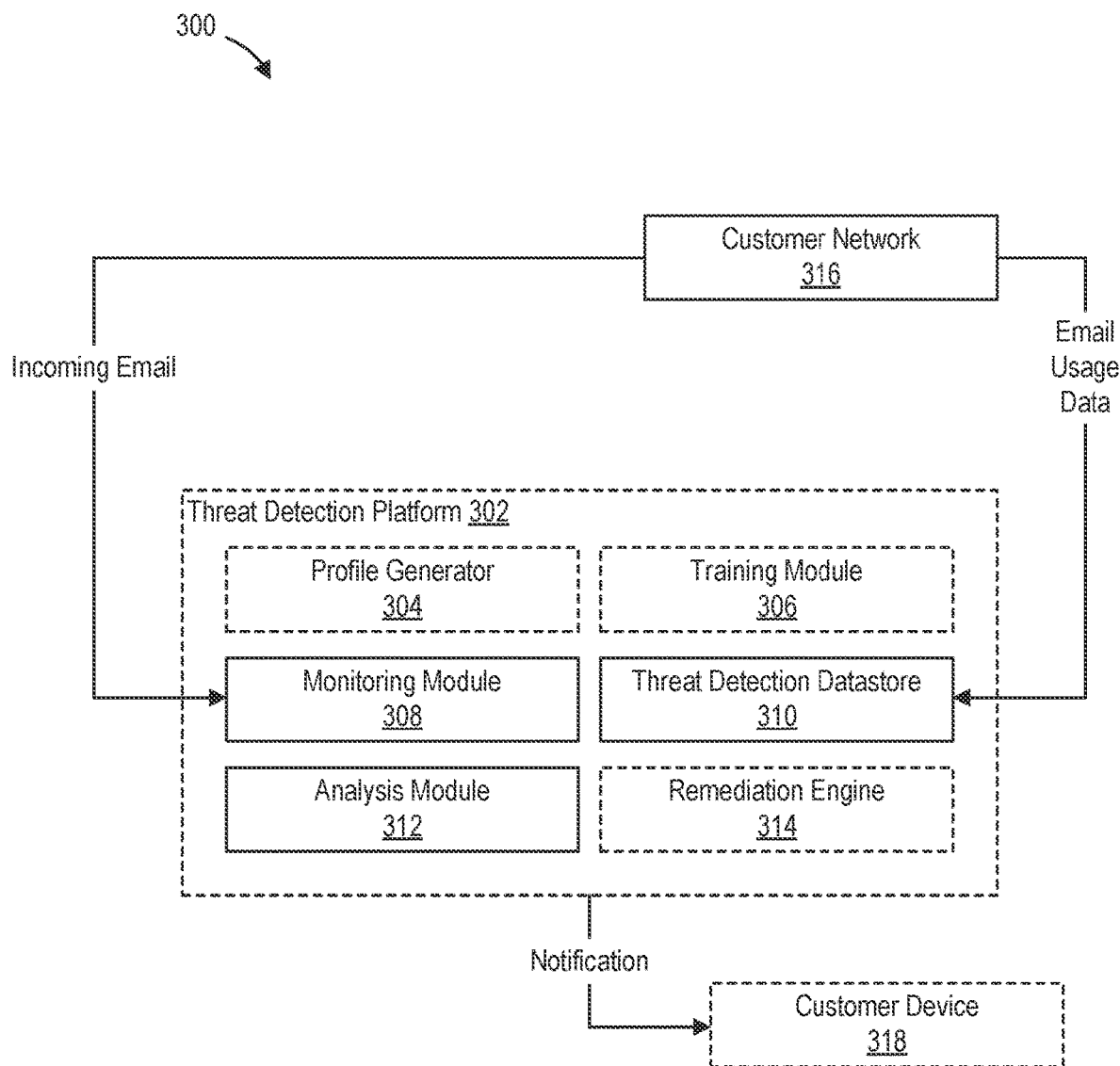
FIG. 3 depicts an example of a system for detecting email-based threats that includes a customer network (also referred to as an "enterprise network") and a threat detection platform.

FIG. 3 depicts an example of a system 300 for detecting email-based threats that includes a customer network 316 (also referred to as an "enterprise network") and a threat detection platform 302. As shown in FIG. 3, the threat detection platform 302 may include a profile generator 304, a training module 306, a monitoring module 308, a threat detection datastore 310, an analysis module 312, and a remediation engine 314. Some embodiments of the threat detection platform 302 include a subset of these components, while other embodiments of the threat detection platform 302 include additional components that are not shown in FIG. 3.

The system 300 can function to acquire email usage data of a customer (also referred to as an "enterprise"), generate a profile based on the email usage data that includes a number of received or inferred behavioral traits, monitor incoming emails, and, for each email, determine whether the email represents a security threat using a set of attack detectors (e.g., based on a deviation from behavioral trait(s) or normal content, such as by feeding the deviations into ML models), flag the email as a possible attack if the detectors indicate one, and if flagged, optionally perform one or more remediation steps on the email. The remediation step(s) may be performed in accordance with a customer-specified remediation policy and/or a default remediation policy. The term "customer," as used herein, may refer to an organization (e.g., a corporation or an enterprise), a business unit, an individual (e.g., associated with one or more email addresses), a team, or any other suitable set of users of the threat detection platform 302. While embodiments may be described in the context of enterprises, those skilled in the art will recognize that the relevant technologies may be applied to other types of customers. As further discussed below, the system 300 may train one or more ML modules to serve as detectors capable of detecting a plurality of email attack types that can appear in the incoming email based on deviations from customer behavioral traits, normal email content, etc.

In some embodiments, the system 300 detects attacks based on the entire email (e.g., including the content of the body). However, in other embodiments, the system 300 is designed to detect attacks based only on the email metadata (e.g., information regarding the email header, sender, etc.) or some other suitable data.

All or portions of the system 300 can be implemented in an entity's email environment (e.g., the customer network 316), a remote computing system (e.g., through which incoming emails and/or data regarding incoming emails can be routed through for analysis), the entity's gateway, or another suitable location. The remote computing system can belong to, or be maintained by, the entity, a third-party system, or another suitable user. The system 300 may be integrated into the entity's email system: inline (e.g., at the secure email gateway), via an application programming interface (API) (e.g., wherein the system receives email data via an API such as the Microsoft Outlook® API), or another suitable manner. Thus, the system 300 can supplement and/or supplant other communication security systems employed by the entity.

In a first variation, the system 300 is maintained by a third party (also referred to as a "threat detection service") that has access to multiple entities' emails. In this variation, the system 300 can route the emails, extracted features (e.g., primary attribute values), derivatory information (e.g., secondary attribute values), and/or other suitable communication information to a remote computing system maintained/managed by the third party. The remote computing system may be, for example, an instance on Amazon Web Services (AWS). In this variation, the system 300 can maintain one or more databases for each entity that include, for example, organizational charts, attribute baselines, etc. Additionally or alternatively, the system 300 may maintain federated database(s) shared amongst multiple entities such as detector databases, legitimate vendor databases, etc. In this variation, the third party can maintain different instances of the system 300 for different entities, or maintain a single instance for multiple entities. The data hosted in these instances can be obfuscated, encrypted, hashed, de-personalized (e.g., by removing personal identifying information (PII)), or otherwise secured or secreted.

In a second variation, the system is maintained by the entity whose emails are being monitored (e.g., remotely or on premises), and all data can be hosted by the entity's computing system. In this variation, data to be shared across multiple entities, such as detector database updates and new attack signatures, can be shared with a remote computing system maintained by a third party. This data can be obfuscated, encrypted, hashed, de-personalized (e.g., by removing PII), or otherwise secured or secreted. However, the system 300 can be maintained or executed using any other suitable computing and ownership configuration.

As shown in FIG. 3, the profile generator 304, training module(s) 306, monitoring module(s) 308, threat detection datastore 310, analysis module(s) 312, and remediation engine(s) 314 can be part of a threat detection platform 302. Alternatively, these components can be individually used and/or implemented. The threat detection platform 302 may be implemented by a threat detection service (also referred to as a "computer security service"), a customer (e.g., an enterprise, organization, or individual that has an account or is otherwise implementing threat detection services), an entity/individual associated with (or representative of) a customer, a trusted third party, or any other service, entity, or individual. In some embodiments, one or more aspects of the system 300 may be enabled by a web-accessible computer program operable on a computer server or a distributed computing system. For example, an individual may be able to interface with the threat detection platform 302 through a web browser executing on a computing device.

The customer network 316 can be an enterprise network, mobile network, wired network, wireless network, wireless spectrum network, or any other communications network maintained by a customer or a network operator associated with the customer. As noted above, the customer can be an individual, an enterprise, or another suitable entity. For example, an enterprise may utilize the services of a computer security company for at least email threat detection. The enterprise may grant permission to the computer security company to monitor the customer network 316, including monitoring incoming emails at the customer network 316, analyzing the emails for potential threats, and performing some remediation action(s) if threats are detected. In some embodiments, the enterprise further grants permission to the computer security company to collect or receive various pieces of data about the enterprise in order to build a profile that specifies enterprise norms, behavioral traits, and normal email content.

The threat detection datastore 310 may include one or more databases in which customer data, threat analysis data, remediation policy information, customer behavioral traits or norms, normal customer email content, and other pieces of data can be stored. The data can be: determined by the system 300 (e.g., calculated or learned from data retrieved, received, or otherwise collected from the customer network 316 or the entity's email provider), received from a user, retrieved from an external database (e.g., LinkedIn® or Microsoft Office 365®), or otherwise determined. In some embodiments, the threat detection database 310 also stores output from the threat detection platform 302, including human-readable information on detected threats and actions taken. Other various data or entities may be stored.

Customer data can include, but is not limited to, email usage data; organizational data such as organization members/employees and their titles; customer behavior traits or norms (e.g., determined based on historical emails); attack history (e.g., determined based on historical emails, determined by applying the attribute extractors and/or analysis modules to historical emails, etc.); entity profile(s); normal customer email content; email addresses and/or phone numbers of organization members; identities of entities and/or individuals who organization members frequently communicate with, both internally and externally; email volume during various times of the day; topics or subject matter most frequently discussed, and how frequently; and more.

The system 300 can optionally include a profile generator 304 that generates one or more entity profiles (also referred to as "customer profiles") based on past emails and/or email usage data associated with the entity. In a second variation, the system 300 includes multiple profile generators 304 that each extract one or more attributes of the entity profile. However, the system 300 can include any suitable number of profile generators in any suitable configuration.

Entity profiles can be generated for: each customer, each business unit, each individual (e.g., each employee or recipient of emails), each email address, each organization type, or another suitable entity or entity group. The entity profile is preferably used as the baseline for entity communication behavior (e.g., email behavior) but could be used in other manners. Moreover, profiles could be generated external to an entity, and these profiles may be federated across a customer base for use by all entities whose emails are being monitored by the system 300. For example, a profile for a trusted third party (e.g., Oracle), a representative of a trusted third party (e.g., a sales representative at Oracle), or a financial institution (e.g., with known routing numbers so as to detect fraudulent invoice payments) could be federated across a customer base. Thus, the system 300 may build a federated network of profiles modeling businesses, vendors, customers, or people.

An entity profile can include: primary attributes, secondary attributes, or any other suitable feature. These values can be: median values, mean values, standard deviations, ranges, thresholds, or any other suitable set of values (e.g., for the entity profile, extracted from new emails, etc.). The entity profile can include: time series (e.g., trends or values for a specific recurrent time, such as months of the year), static values, or may have other suitable contextual dependency.

Figure 6:
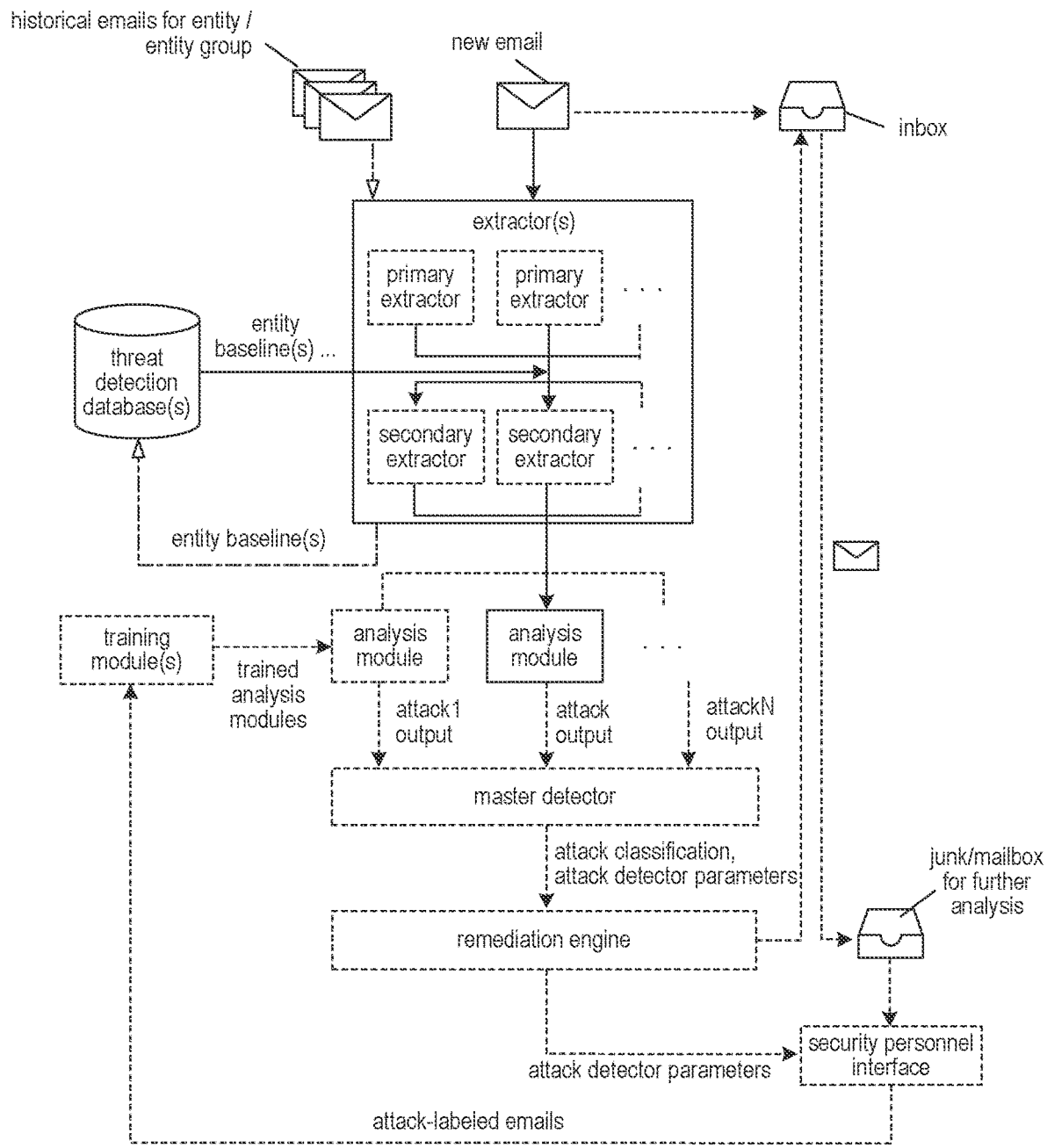
FIG. 6 depicts an example of a threat detection platform that includes multiple analysis modules and multiple extractors (e.g., multiple primary extractors and multiple secondary extractors) operating in conjunction with each other.

Primary attributes are preferably attributes or features extracted directly from a communication, but could be otherwise determined. The primary attributes can be extracted by one or more primary attribute extractors, each extracting one or more primary attributes from the communication as shown in FIG. 6, but could be otherwise extracted. The primary attribute extractor(s) can be global (e.g., shared across multiple entities), specific to an entity, or otherwise shared. Examples of primary attributes include the sender's display name, sender's username, Sender Policy Framework (SPF) status, DomainKeys Identified Mail (DKIM) status, number of attachments, number of links in the email body, spam or phishing metrics (e.g., continent or country of origin), whether data between two fields that should match are mismatched, header information, or any other suitable communication data. Primary attributes can optionally include metadata attributes (e.g., company identifier (ID), message ID, conversation ID, individual ID, etc.).

Secondary attributes are preferably attributes that are determined from the primary attributes and/or customer data (e.g., as determined from the threat detection datastore 310), but can be otherwise determined. The secondary attributes can be extracted, inferred, calculated, or otherwise determined. The secondary attributes may be determined by one or more secondary attribute extractors, each extracting one or more secondary attributes from the primary attributes for a given communication or entity as shown in FIG. 6, but could be otherwise determined. The secondary attribute extractors can be global (e.g., shared across multiple entities), specific to an entity, or otherwise shared. The secondary attributes can be determined from a time series of primary attribute values (e.g., wherein each primary attribute value can be associated with a timestamp, such as the sent timestamp or receipt timestamp of the email), from all primary attribute values, from a single primary attribute value, from the values of multiple primary attributes, or from any other suitable set of data. Examples of secondary attributes can include: frequencies, such as sender frequencies (e.g., sender fully qualified domain name (FQDN) frequencies, sender email frequencies, etc.) or domain frequencies (e.g., SPF status frequencies for a given domain, DKIM status frequencies for a given domain, the frequency at which the system receives the same or similar email body from a given domain, how frequently emails are received from that domain, how frequently emails are sent to that domain, etc.); determining a mismatch between one or more primary attributes that should match; employee attributes (e.g., name, title, whether the entity is employed, whether the entity has a high attack risk, whether the entity is suspicious, whether the entity has been attacked before, etc.); vendor attributes (e.g., vendor name, whether the vendor is an exact match with a known vendor, whether there is a vendor Unicode lookalike, etc.); whether the body of the communication includes one of a set of high-risk words, phrases, sentiments, or other content (e.g., whether the communication includes financial vocabulary, credential theft vocabulary, engagement vocabulary, non-ASCII content, attachments, links, etc.); domain information (e.g., domain age, whether the domain is blacklisted or whitelisted, whether the domain is internal or external, etc.); heuristics (e.g., whether the FQDN, domain, domain name, etc., has been seen before, either globally or by the entity); primary attribute value (e.g., as extracted from the communication) deviation from the respective baseline value (e.g., deviation magnitude, whether the value has deviated beyond a predetermined variance or difference threshold); or any other suitable attribute, feature, or variable. In some embodiments, the secondary attributes are determined as a function of the primary attributes. One example of a primary attribute is a sender email address, while one example of a secondary attribute is the statistics of communications patterns from sender address to recipient, department, organization, and universe of customers.

The entity profile can additionally or alternatively include: a number of customer behavioral traits or typical email content associated with the customer. In some embodiments, the profile generator 304 receives the email usage data from the customer network 316 or the threat detection datastore 310. The email usage data can include, but is not limited to, information on email addresses of employees and contacts, email content (e.g., the body of email messages), frequency of email, volume of email at given times of day, HTML/font/style usage within email, confidential topics and explicitly or implicitly authorized members discussing those topics, spam mail and characteristics thereof, and more.

The entity profile can be generated from: historic email data for the entity (e.g., retrieved using an API to the entity's email environment, retrieved from an email datastore, etc.); newly-received email (e.g., email received after system connection to the entity's email environment); user inputs; other entities (e.g., sharing a common feature or characteristic with the entity); or based on any other suitable data. In some embodiments, one or more pieces of email usage data can be collected, generated, or inferred by the profile generator 304 based on received pieces of customer data, monitoring of the customer network 316 given authentication and access by the customer, or some other means.

The entity profile can be generated using the same system(s) as typical email analysis (e.g., using the attribute extractors used to extract the attributes for real- or near-real-time threat detection), but can alternatively or additionally be generated using other suitable system(s).

In one variation, the profile generator 304 generates a customer profile by building a deep profile of the company's email usage, membership roles and/or hierarchy, daily norms, behavioral traits, and more in order to establish a model of what "normal" or "typical" looks like for the customer in terms of email usage and behavior, and, by extension and inference, what "abnormal" or "atypical" emails and/or activity may constitute for purposes of identifying likely threats.

In some embodiments, the customer profile is generated based on received, collected, and/or inferred customer data, email usage data, and other relevant information. Examples of questions that the customer profile may seek to model answers for regarding the customer include, but are not limited to: What are normal email addresses for each member of the organization? What are normal topics for each person, pair, and/or department to be discussing (e.g., Joe and Samantha normally discuss product release plans, but never accounting or billing topics)? What are normal login or email sending times for each user? What Internet Protocol (IP) address do they log in from? What geolocation do users usually log in from? Do users have suspicious mail filter rules set up (e.g., attackers who hijack email accounts sometimes set up mail filters to auto-delete emails containing certain keywords in order to conceal illicit activity from the account's true owner)? What's the normal tone or style each user uses? What's the tone used between each pair of users? What's the normal signature (e.g., "cheers" or "thanks") used by each employee? What types of words are used more in one department and less in another department? What are the normal vendors/partners that a customer communicates with and/or is billed by? Does a given pair of users usually talk? What are typical email authentication statuses for this person, pair, or entity (e.g., SPF, DKIM, or Domain-Based Message Authentication, Reporting, and Conformance (DMARC))? When a user receives or sends links/attachments, does a derived description of the link/attachment match a given description of the link/attachment? When an employee receives emails with attachments, what are the typical characteristics of the attachments (e.g., name, extension, type, size)?

The monitoring module 308 operates to monitor incoming emails at a network maintained by the customer. In some embodiments, the monitoring module 308 monitors incoming emails in real time or substantially real time. In some embodiments, the monitoring module 308 is authorized to monitor the incoming emails only upon the system 300 and/or the threat detection platform 302 being authenticated and granted permission and access by the customer network 316. In some embodiments, the system 300 and/or the threat detection platform 302 is integrated into an office suite or an email suite via an API.

The analysis module 312 operates to analyze each incoming email for possible threats/attacks. The analysis module 312 preferably detects attacks based on the secondary attributes (e.g., for one or more communications for the entity), but can alternatively or additionally detect attacks based on the primary attributes or any other suitable data. In one variation, the analysis module 312 is separate from the primary and secondary attribute extractor(s). In another variation, the analysis module 312 can include the primary and/or secondary attribute extractor(s). However, the analysis module 312 can be otherwise configured.

Figure 5:
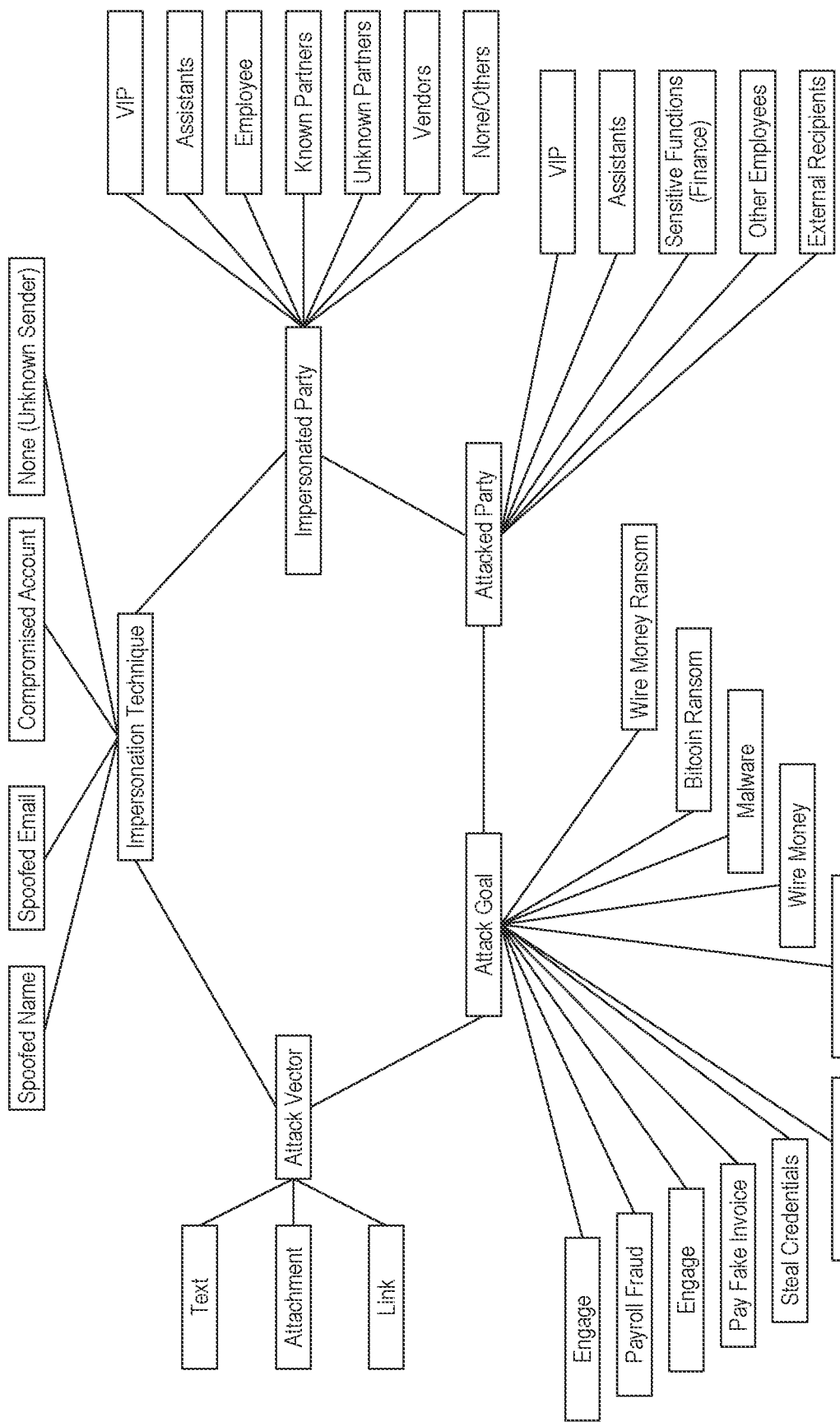
FIG. 5 depicts an example of a hierarchical graph of possible attack types as generated by a machine learning (ML) model for a particular customer.

The system 300 can include one or more analysis modules 312, operating in parallel, in series, or in another suitable order. An example of multiple analysis modules 312 operating in conjunction with each other is shown in FIG. 6. The set of analysis modules 312 used for a given entity or communication can be: predetermined, manually determined, selected based on historical communications, selected based on operation context (e.g., fiscal quarter), or otherwise determined. In a first variation, the system 300 includes one or more analysis modules 312, of the same type or different types, for each known attack type. For example, each attack type may be associated with a different analysis module 312. In a second variation, the system 300 includes a single analysis module 312 for all attack types. In a third variation, the system 300 includes one or more analysis modules for each attack type (e.g., a first set for phishing attacks, a second set for impersonation attacks, etc.). In a fourth variation, the system 300 includes a cascade/tree of analysis modules 312, where a first layer of analysis module(s) classifies incoming email with a potential attack type and subsequent layer(s) of analysis module(s) analyze whether the email has the characteristics of the attack type. FIG. 5 depicts an example of a hierarchical graph of possible attack types as generated by an ML model for a particular customer, as described above with respect to the training module 306. In this example, high-level classifications include impersonation technique, attack vector, impersonated party, attacked party, and attack goal. Within the impersonation technique classification, attack types may include spoofing a user's name, spoofing a user's email, compromising an account, or none due to unknown sender. Based on the attack goals, attack types may include payroll fraud, stealing credentials, encouraging a user to wire money, bitcoin ransom, wire money ransom, etc.

However, the system 300 can include any suitable number of analysis modules 312 for detecting any number of attack types. In particular, the approach of modeling employed by the system 300 to discover behavioral norms of employee, vendor, and organizational communication allows for the ability to identify attacks that have not been seen before, as well as zero-day phishing attacks.

The analysis modules 312 can include or use one or more of: heuristics, neural networks, rules, decision trees (e.g., gradient-boosted decision trees), ML-trained algorithms (e.g., decision trees, logistic regression, linear regression, etc.), or any other suitable analysis method/algorithm. The analysis modules 312 can output: discrete or continuous outputs, such as a probability (e.g., attack probability), a binary output (e.g., attack/not attack), an attack classification (e.g., classification as one of a plurality of possible attacks), or output any other suitable output. The analysis modules 312 can be: received from a database (e.g., a database of known attack patterns or fingerprints), received from a user, learned (e.g., based on data shared across multiple entities, based on communication data for the entity, etc.), or otherwise determined.

Each analysis module can be specific to an attack, an attack type/class, or any other suitable set of attacks. The system 300 can include one or more analysis modules 312 per attack set. In one variation, the attack set can be associated with multiple analysis modules 312, where the system 300 can dynamically select the analysis module to use (and/or which output to use) based on the performance metrics of each analysis module for the given attack set. For example, the system 300 can include a heuristics-based analysis module and an ML-based analysis module for a given attack that are executed in parallel for each piece of communication; monitor the recall and/or the precision (e.g., as determined based on entity feedback of the email classifications) for both analysis modules; and select the analysis module with the higher performance value for subsequent communication analysis. The output of all but the highest-performant analysis module can be hidden from the user and/or not used in email attack classification; alternatively, the outputs of lower-performant analysis modules can be used to verify the highest-performant analysis module output, or otherwise used.

One or more of the analysis modules 312 can be specific to an entity (e.g., an organization, a business organization, a title, an individual, an email address, etc.), be shared between multiple entities (e.g., be a global analysis module), or be otherwise customized or generic.

In one example, first, for each incoming email, the analysis module 312 (e.g., secondary attribute extractor) determines a deviation of the mail from each of the plurality of customer behavioral traits or content norms. In some embodiments, the deviation is a numerical value or percentage representing a delta between the customer behavioral trait and an assigned behavioral trait determined from the incoming email. For example, if a customer behavioral trait is "Joe Smith almost exclusively sends email from js@customerentity.com" and an incoming email purporting to be from Joe Smith has the email address joesmith@genericmail.com, then the deviation will be assigned a high number. If Joe Smith sends from a genericmail.com account approximately 20 percent of the time, then the deviation will still be relatively high, but the deviation will be lower than the previous example. Second, the analysis module 312 feeds the measured deviations as input into one or more attack detectors (e.g., rules-based engines, heuristics engines, ML models, etc.), each of which can generate an output. Third, the analysis module 312 flags the email as a possible attack corresponding to an email attack type if an indication is received from one or more of the ML models that a deviation threshold for the email attack type has been exceeded. The analysis module 312 can instruct the ML models to categorize the deviations in an incoming email as indicating a likely malicious email or a likely non-malicious email, as well as categorize the email according to a possible attack type. In some embodiments, the ML model "trips"—that is, f(email) exceeds a threshold for deviations from customer behavioral traits and content norms—and then flags the email as a possible attack.

The output(s) produced by the analysis module(s) 312 can optionally be fed into a master detector that analyzes these output(s) in order to produce a final classification for the communication as an attack or non-attack, as shown in FIG. 6. The master detector can optionally output the factors, rules, weights, variables, decision tree nodes, or other attack detector parameters that contributed to the attack classification.

The remediation engine 314 optionally operates to perform one or more remediation processes. The remediation engine 314 is preferably implemented in response to communication classification as an attack (e.g., by one or more analysis modules 312, by the master detector, etc.), but can alternatively or additionally be implemented at any other suitable time. In some embodiments, the remediation steps are based on or correlate to a customer remediation policy. The customer remediation policy may be predefined and received by the threat detection platform 302, be generated based on inference, analysis, and customer data, or be otherwise determined. In some embodiments, the threat detection platform 302 may prompt the customer to provide one or more remediation steps or components of the remediation policy in various situations. Remediation steps may include, for example, moving the email to a junk folder as shown in FIG. 6, moving the email to a hidden folder, permanently deleting the email, performing different measures according to how users have acted on it, sending notifications to users (e.g., employees, administrators, members of a security team), resetting the password of the affected employee, ending all sessions, pushing signatures to a firewall or an endpoint protection system, pushing signatures to an endpoint protection system to lock one or more computing devices, etc. For example, upon discovering a compromised account, the threat detection platform 302 may invoke API(s) to block the compromised account, reset connections with services/databases, or change the password through a workflow. Additionally or alternatively, remediation steps can include moving the email from the junk folder back into the inbox (e.g., in response to determination that the email was not an attack).

In some embodiments, the remediation engine 314 provides threat detection results and/or other output to the customer via, for example, a customer device 318. Examples of customer devices 318 include mobile phones, laptop computers, and other computing devices. In some embodiments, the remediation engine 314 sends the output in a human-readable format to the threat detection platform 302 for display on an interface.

The system 300 can optionally include a training module 306 that operates to train the ML model(s) employed by the analysis module(s) 312. Each ML model preferably detects a single attack type, but can alternatively detect multiple attack types. In some embodiments, the training module 306 trains the ML models by feeding training data into the ML models. The training data can include: entity-labeled communications (e.g., system-analyzed emails that have been sent to security personnel and labeled as attacks or non-attacks, as shown in FIG. 6), third-party-labeled communications, or any other suitable set of communications. In some embodiments, the customer data, ML models, and/or thresholds are all different per customer as a result of the unique customer's behavioral traits being fed into the ML models to generate custom analyses. In some embodiments, the training data ingested by the models includes labeled datasets of "bad" emails, which are received or generated by one or more components of the threat detection platform 302. In some embodiments, the labeled datasets of bad emails include human-labeled emails. Through human labeling from, for example, customer administrators, network operators, employees, or security service representatives, a solid body of malicious emails can be built up for a customer, and these malicious emails can be used to train the ML models based on that customer. In some embodiments, the training data includes the received, collected, or inferred customer data and/or email usage data. In some embodiments, the training data can include historical threats that have been previously identified in customer inboxes. In some embodiments, different ML models employed have been developed for different known types of attacks. In some embodiments, emails are scored, weighted, or assigned a percentage or numerical value based on using these ML model(s). In some embodiments, if an email scores over the threshold for any of the ML models, it may be flagged, unless a heuristic or other element of the threat detection platform 302 indicates that it should not be flagged.

In some embodiments, the training data for training the ML models can include human inputs received from the customer. Organizations often have phishing mailboxes where employees can report emails to security teams, or where security teams can automatically/manually reroute messages meeting certain criteria. The training data can include emails that are placed in these phishing mailboxes as malicious emails. In some embodiments, the human inputs can include end user actions that can feed into ML models. For example, if an individual moves an email that the ML models cannot decide with certainty whether to discard, that user action can be included as training data to train the ML models as to what action should be taken in similar contexts.

Examples of potential attack types that the ML models can be trained to detect in varying embodiments include, but are not limited to, vendor impersonation and ransom attacks.

In some embodiments, a plurality of heuristics data is utilized as an alternative to, or in combination with, the ML models to detect threats, train the ML models, infer behavioral traits or content norms for a customer based on customer data, select potential attack types of a customer, or perform other threat detection tasks. In some embodiments, one or more aspects of training the ML models includes feeding the plurality of heuristics data as input training data into one or more of the ML models. In some embodiments, the heuristics data is utilized in relation to a rules engine which operates to decide which heuristics to apply in different situations. In some embodiments, the rules engine determines whether to apply machine learning or heuristics in a particular threat detection task. In some embodiments, one or more rules may include a blacklist and/or a whitelist for certain email criteria.

In some embodiments, any level of granularity can be contemplated for the system 300 regarding the analysis module 312, ML models, heuristics, rules, and/or human labeling of inputs. In some embodiments, "normal" and "abnormal" behavioral traits and content norms could be determined on a per-employee, per-pair, per-department, per-company, and/or per-industry basis.

In some embodiments, the ML models can optionally be refined in a number of ways in the course of operation. In some embodiments, the monitoring module 308 monitors the customer's phishing mailbox to locate false negatives (i.e., emails that were missed by the ML models that employees subsequently reported to the security team). In some embodiments, a customer may reverse the remediation decision made by the heuristics and/or the ML models, and in response the ML models may incorporate that feedback. In some embodiments, if a customer marks a particular feature in an email (e.g., sender mail, display name, authentication state, etc.) as suspicious, that can feed back into the ML models. In some embodiments, such feedback is weighted in an ML model based on the stature or reputation of the individual responsible for providing the feedback. For example, an ML model may trust a Tier 3 employee's judgment on an email significantly more than a Tier 1 employee's judgment, and would weigh their feedback more heavily into the ML model.

In some embodiments, different types of ML models may be used, including but not limited to gradient-boosted decision trees, logistic regression, linear regression, and more. In some embodiments, ML models are replaced with purely rules-based engines.

Figure 4:
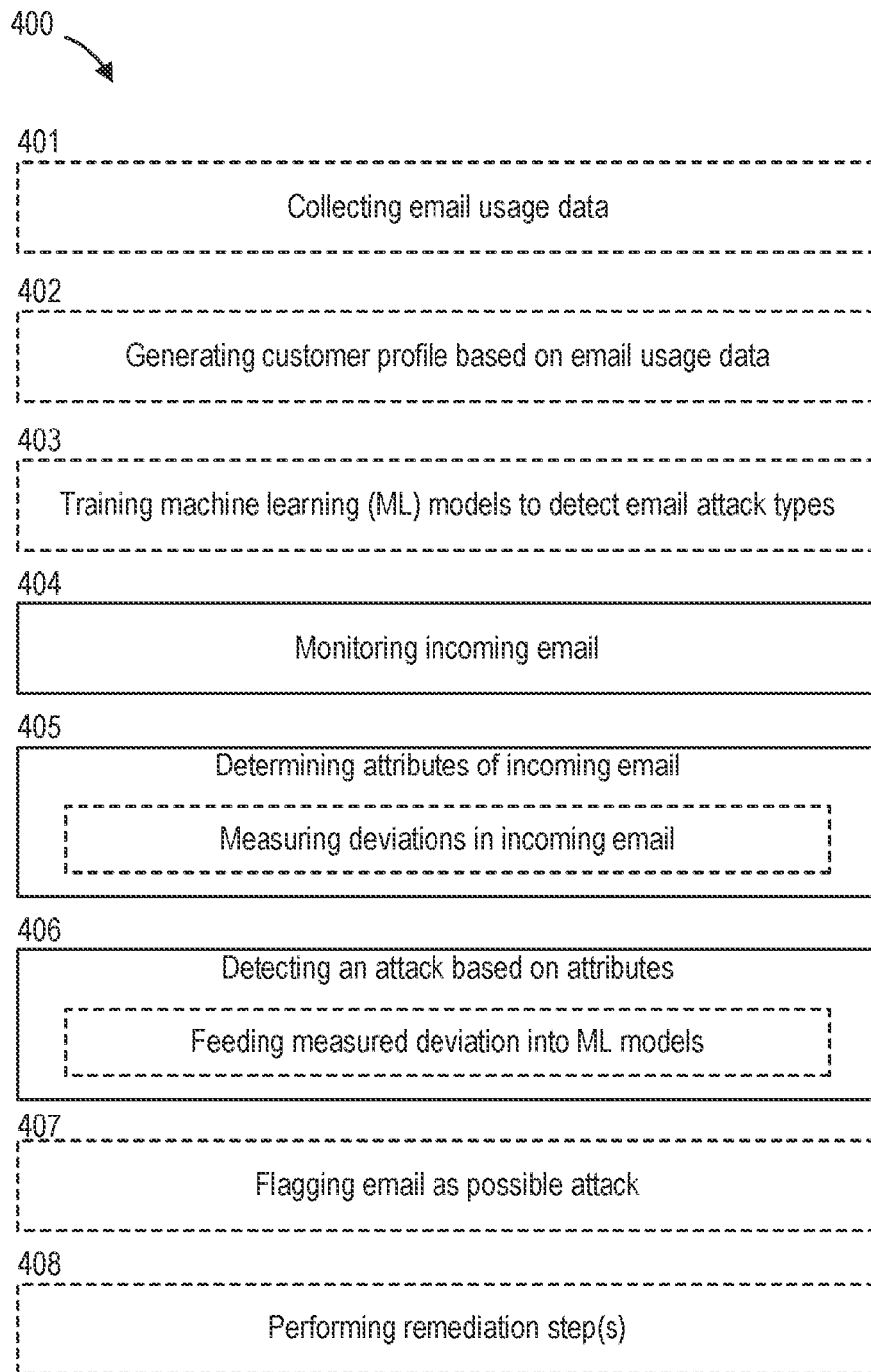
FIG. 4 depicts a flow diagram of a process for detecting email-based threats by monitoring incoming emails, determining email attributes, detecting an attack based on the determined attributes, and optionally performing remediation steps.

FIG. 4 depicts a flow diagram of a process 400 for detecting email-based threats by monitoring incoming emails (step 404), determining email attributes (step 405), detecting an attack based on the determined attributes (step 406), and optionally performing remediation steps (step 408). In one example, the process 400 can include collecting email usage data (step 401), generating an entity profile based on the email usage data (step 402), monitoring incoming emails (step 404), determining deviations in the incoming email, feeding the measured deviations into the ML models, flagging the email as a possible attack (step 407), and performing remediation steps (step 408). The process 400 can optionally include training ML models to detect email attack types (step 403).

The process 400 functions to provide email-based threat detection according to a generated customer profile that models normal customer behavior and normal email content, and then feeds the deviations from these normal behavior traits and normal content as input into ML models training on malicious emails.

In some embodiments, the process 400 is enabled by a web-based platform (e.g., threat detection platform 302 of FIG. 3) operable on a computer server or a distributed computing system. Additionally or alternatively, the process 400 may be performed on any suitable computing device capable of ingesting, processing, and/or analyzing customer data and email usage data, performing ML techniques, and/or performing remediation actions.

The process 400 can be performed in parallel or in series with email delivery to an email inbox. In one variation, the process 400 is performed in parallel with email delivery to the recipient's email inbox, wherein the email is retroactively removed from the email inbox in response to determination that the email is an attack (and/or has a high probability of being an attack). In a second variation, the process 400 is performed in series with email delivery, where the email is only delivered to the recipient's email inbox in response to determination that the email is not an attack. However, the process 400 can be otherwise integrated into email delivery paradigms. The method can analyze: all incoming emails, only emails labeled as non-attacks by a preceding security system, only emails labeled as attacks by a preceding security system, or any suitable set of emails.

Monitoring incoming emails (step 404) is preferably performed using a monitoring module (e.g., monitoring module 308 of FIG. 3), as discussed above, but emails can be otherwise ingested.

Email attributes are preferably determined by extractors, as discussed above, but can be otherwise determined. In one example, the method includes: extracting primary attributes from the incoming email (e.g., with one or more specialized primary attribute extractors executing in parallel), and determining secondary attributes for the email (e.g., with one or more specialized secondary attribute extractors executing in parallel) from the primary attributes and customer data.

The attack is preferably determined using one or more analysis modules, as discussed above, but can be otherwise determined. In one variation, the determined attributes (e.g., primary or secondary attributes) can be fed into one or more analysis modules (e.g., executing in parallel or in series). In some embodiments, each analysis module is specific to an attack type, where the plurality of outputs from the plurality of analysis modules is further analyzed (e.g., by a master detector) to determine whether the email is an attack. In other embodiments, the analysis module detects multiple attack types (e.g., outputs multiple output values, each corresponding to a different attack type, where the output can be a likelihood and/or confidence in the corresponding attack type), and the email can be labeled as an attack when the output value exceeds a predetermined threshold for the corresponding attack type. However, the attack can be otherwise detected.

Step 408 optionally includes performing remediation steps, as described above with respect to remediation engine 314 of FIG. 3, but the email can be otherwise remediated.

Step 401 includes collecting or receiving email usage data, as described above with respect to profile generator 304 of FIG. 3.

Step 402 includes generating a customer profile based on the email usage data, as described above with respect to profile generator 304 of FIG. 3.

Step 403 includes training ML models to detect email attack types, as described above with respect to training module 306 of FIG. 3.

Step 405 includes measuring deviations in incoming email, as described above with respect to analysis module 312 of FIG. 3.

Step 406 includes feeding the measured deviations into ML models, as described above with respect to analysis module 312 of FIG. 3.

Step 407 optionally includes flagging email as a possible attack, as described above with respect to analysis module 312 of FIG. 3.

Integrative Approach to Detecting Security Threats

As discussed above, conventional email filtering services are not suitable for recognizing sophisticated malicious emails, and therefore may allow sophisticated malicious emails to reach employees' inboxes by mistake. Introduced here are threat detection platforms designed to take an integrative approach to detecting the security threats to an enterprise.

Unlike conventional email filtering services, a threat detection platform can be completely integrated within the enterprise environment. For example, the threat detection platform may receive input indicative of an approval by an individual (e.g., an administrator associated with the enterprise or an administrator of the email service employed by the enterprise) to access email, active directory, mail groups, identity security events, risk events, documents, etc. The approval may be given through an interface generated by the threat detection platform. For example, the individual may access the interface generated by the threat detection platform and then approve access to these resources as part of a registration process.

Upon receiving the input, the threat detection platform can establish a connection with storage medium(s) that include these resources via application programming interface(s) (APIs). For example, the threat detection platform may establish, via an API, a connection with a computer server managed by the enterprise or some other entity on behalf of the enterprise.

The threat detection platform can then download resources from the storage medium(s) to build an ML model that can be used to identify email-based security threats. Thus, the threat detection platform can build an ML model based on retrospective information in order to better identify security threats in real time as emails are received. For example, the threat detection platform may ingest incoming emails and/or outgoing emails corresponding to the last six months, and then the threat detection platform may build an ML model that understands the norms of communication with internal contacts (e.g., other employees) and/or external contacts (e.g., vendors) for the enterprise. Thus, actual threats rather than synthetic threats can be used to identify whether an incoming email is representative of a security threat.

Such an approach allows the threat detection platform to employ an effective ML model nearly immediately upon receiving approval from the enterprise to deploy it. Most standard integration solutions, such as anti-spam filters, will only have access going forward in time (i.e., after receiving the approval). Here, however, the threat detection platform may employ a backward-looking approach to develop personalized ML model(s) that are effective immediately. Moreover, such an approach enables the threat detection platform to go through a repository of past emails to identify security threats residing in employees' inboxes.

The aforementioned API-based approach provides a consistent, standard way of looking at all email handled by an enterprise (or another entity, such as an email service, on behalf of the enterprise). This includes internal-to-internal email that is invisible from standard integration solutions. A SEG integration, for example, that occurs through the mail exchanger (MX) record will only be able to see incoming email arriving from an external source. The only way to make email arriving from an internal source visible to the SEG integration would be to externally reroute the email through the gateway.

Figure 7:
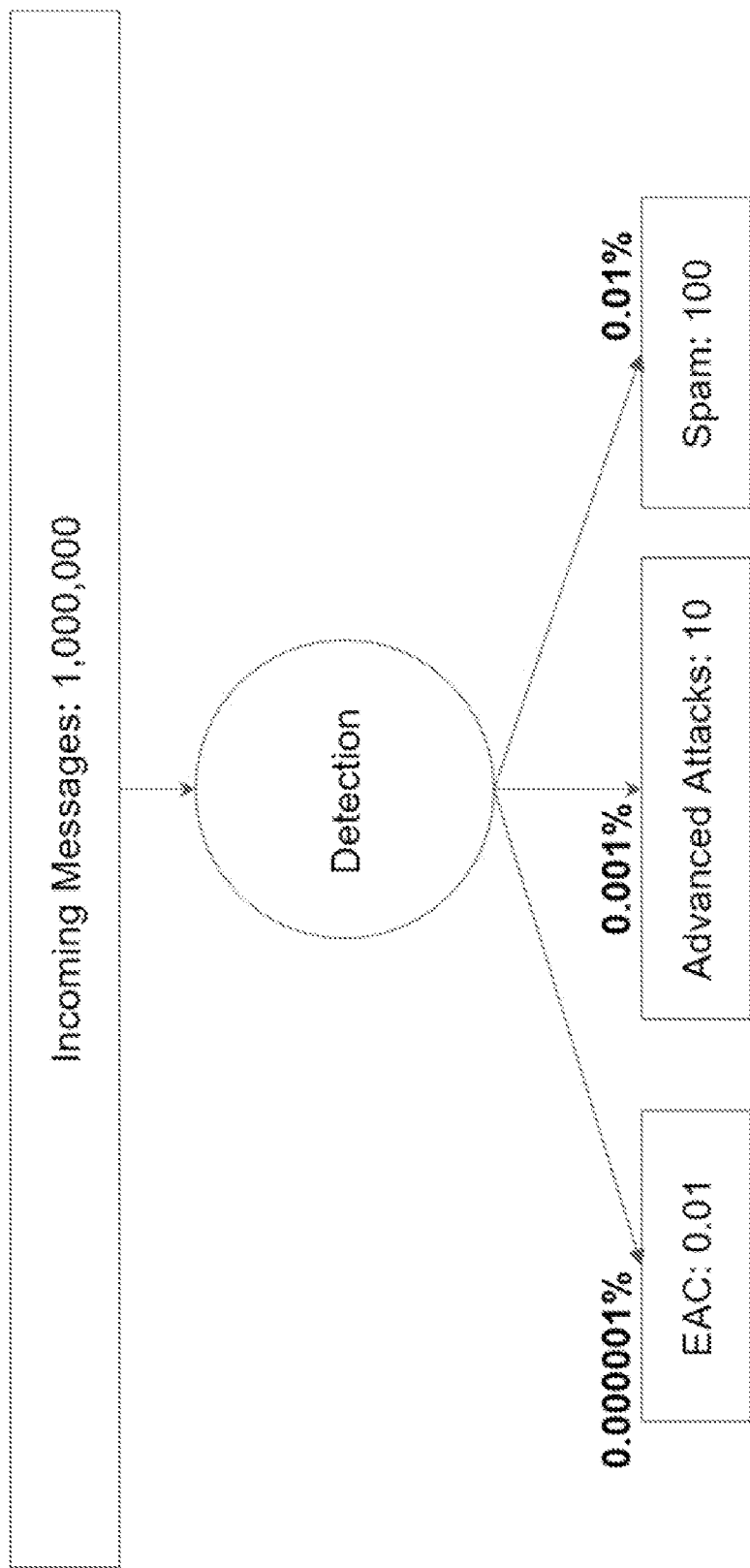
FIG. 7 depicts how the vast majority of incoming messages may be classified as non-malicious while a small percentage of incoming messages may be classified as malicious.

The threat detection platform can design the ML model to sort emails determined to be possible security threats into multiple categories. FIG. 7 depicts how the vast majority of incoming messages may be classified as non-malicious while a small percentage of incoming messages may be classified as malicious. Here, for example, nearly 99.99% of incoming messages have been classified as non-malicious, and thus immediately forwarded to the appropriate inbox. However, the threat detection platform has discovered three types of security threats: (1) email account compromise (EAC) attacks; (2) advanced attacks; and (3) spam attacks. In some embodiments, the threat detection platform employs a single ML model able to classify these different types of security threats. In other embodiments, the threat detection platform employs multiple ML models, each of which is able to classify a different type of security threat.

Figure 8A:
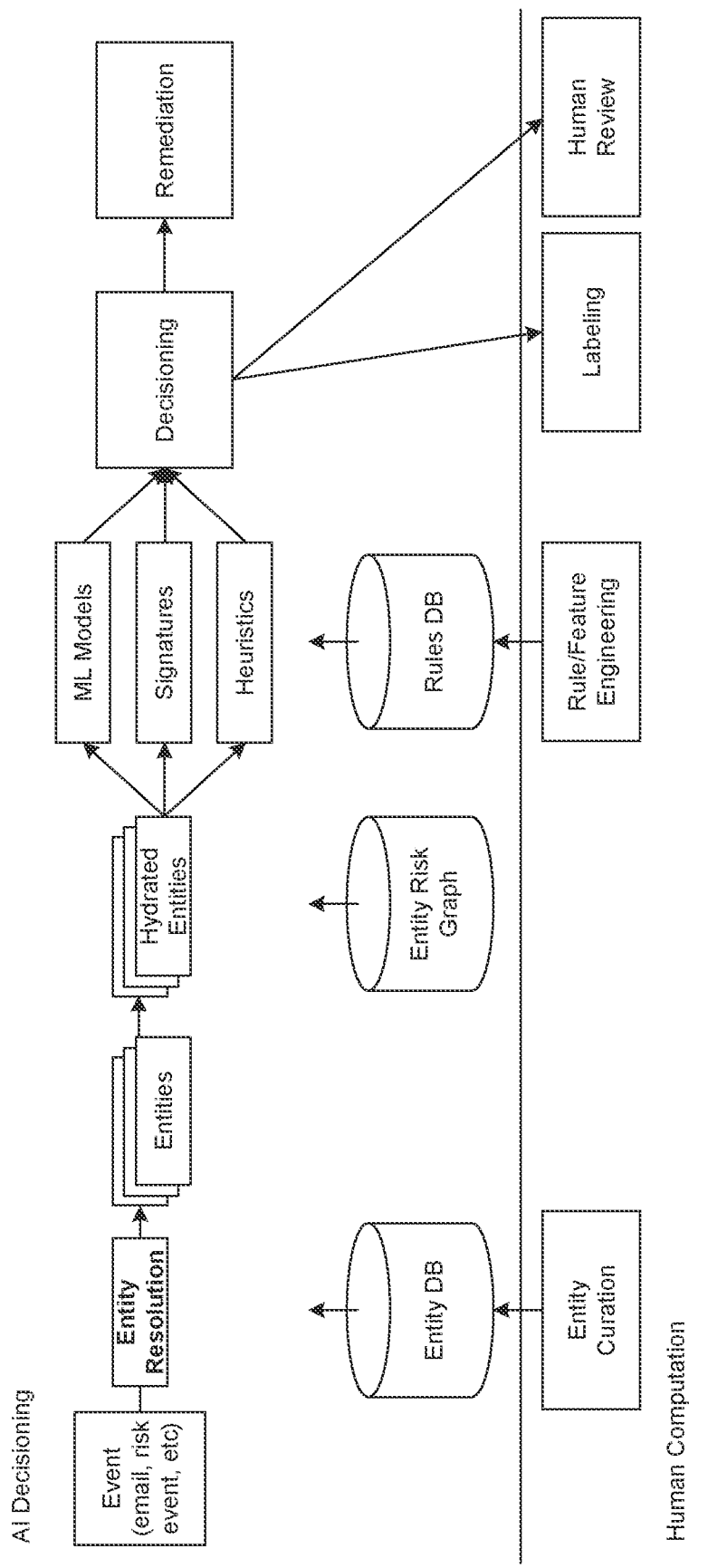
FIG. 8A includes a high-level illustration of the detection architecture of a threat detection platform in accordance with some embodiments.

FIG. 8A includes a high-level illustration of the detection architecture of a threat detection platform in accordance with some embodiments. Initially, the threat detection platform will determine that an event has occurred or is presently occurring. One example of an event is the receipt of an incoming email. As discussed above, the threat detection platform may be programmatically integrated with an email service employed by an enterprise so that all external emails (e.g., those received from an external email address and/or those transmitted to an external email address) and/or all internal emails (e.g., those sent from one employee to another employee) are routed through the threat detection platform for examination.

Then, the threat detection platform will perform an entity resolution procedure in order to identify the entities involved in the event. Generally, the entity resolution procedure is a multi-step process.

Figure 9:
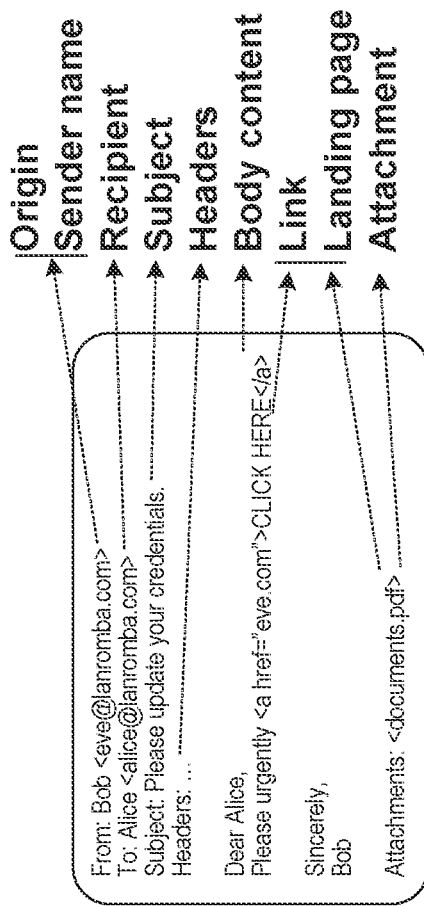
FIG. 9 depicts an example of an incoming email that may be examined by the threat detection platform.

First, the threat detection platform will acquire information regarding the event. For example, if the event is the receipt of an incoming email, the threat detection platform may examine the incoming email to identify the origin, sender identity, sender email address, recipient identity, recipient email address, subject, header(s), body content, etc. Moreover, the threat detection platform may be able to determine whether the incoming email includes any links, attachments, etc. FIG. 9 depicts an example of an incoming email that may be examined by the threat detection platform.

Figure 10A:
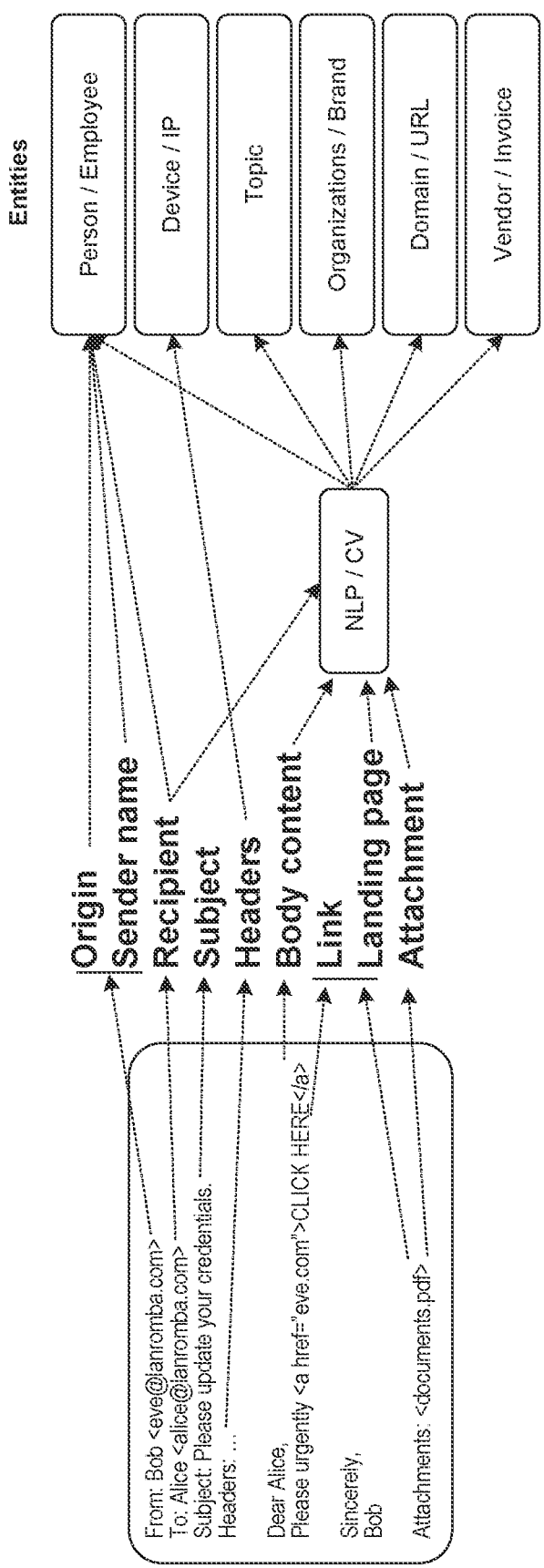
FIG. 10A depicts how information gleaned from the incoming email can be used to establish different entities.
Figure 10B:
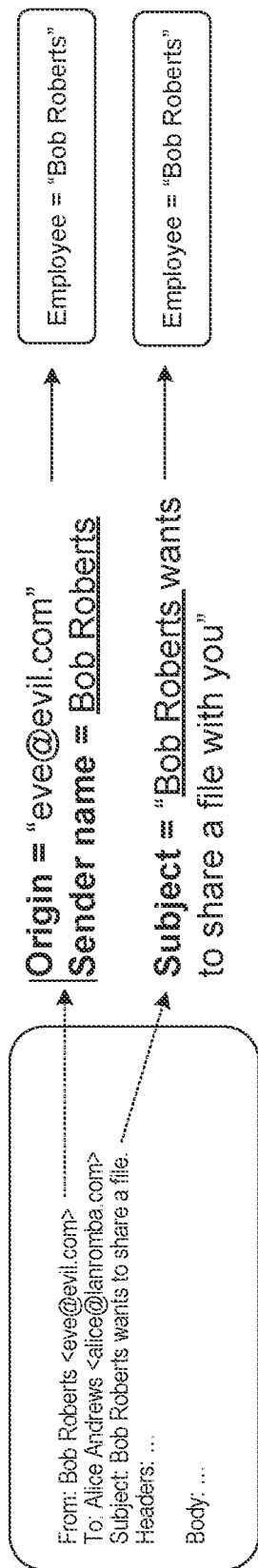
FIG. 10B depicts an example of how the threat detection platform can execute the entity resolution procedure to establish the identity of the sender of the incoming email.

Second, the threat detection platform will resolve the entities involved in the event by examining the acquired information. FIG. 10A depicts how information gleaned from the incoming email can be used to establish different entities (also referred to as "features" or "attributes" of the incoming email). Some information may correspond directly to an entity. Here, for example, the identity of the sender (or purported sender) may be established based on the origin or sender name. Other information may correspond indirectly to an entity. Here, for example, the identity of the sender (or purported sender) may be established by applying a natural language processing (NLP) algorithm and/or computer vision (CV) algorithm to the subject, body content, etc. Accordingly, entities may be established based on the incoming email, information derived from the incoming email, and/or metadata accompanying the incoming email. FIG. 10B depicts an example of how the threat detection platform can execute the entity resolution procedure to establish the identity of the sender of the incoming email. Here, the threat detection platform has identified the sender identity based on (1) the sender name ("Bob Roberts") as derived from the incoming email and (2) the subject as processed by an NLP algorithm.

In some embodiments, the threat detection platform will augment the acquired information with human-curated content. For example, feature(s) of an entity may be extracted from human-curated datasets of well-known brands, domains, etc. These human-curated datasets may be used to augment information gleaned from the enterprise's own datasets. Additionally or alternatively, humans may be responsible for labeling entities in some situations. For example, a human may be responsible for labeling landing pages and/or Uniform Resource Locators (URLs) of links found in incoming emails. Human involvement may be useful when quality control is a priority, when comprehensive labeling of evaluation metrics is desired, etc. For example, a human may actively select which data/entities should be used for training the ML model(s) used by the threat detection platform.

Figure 12:
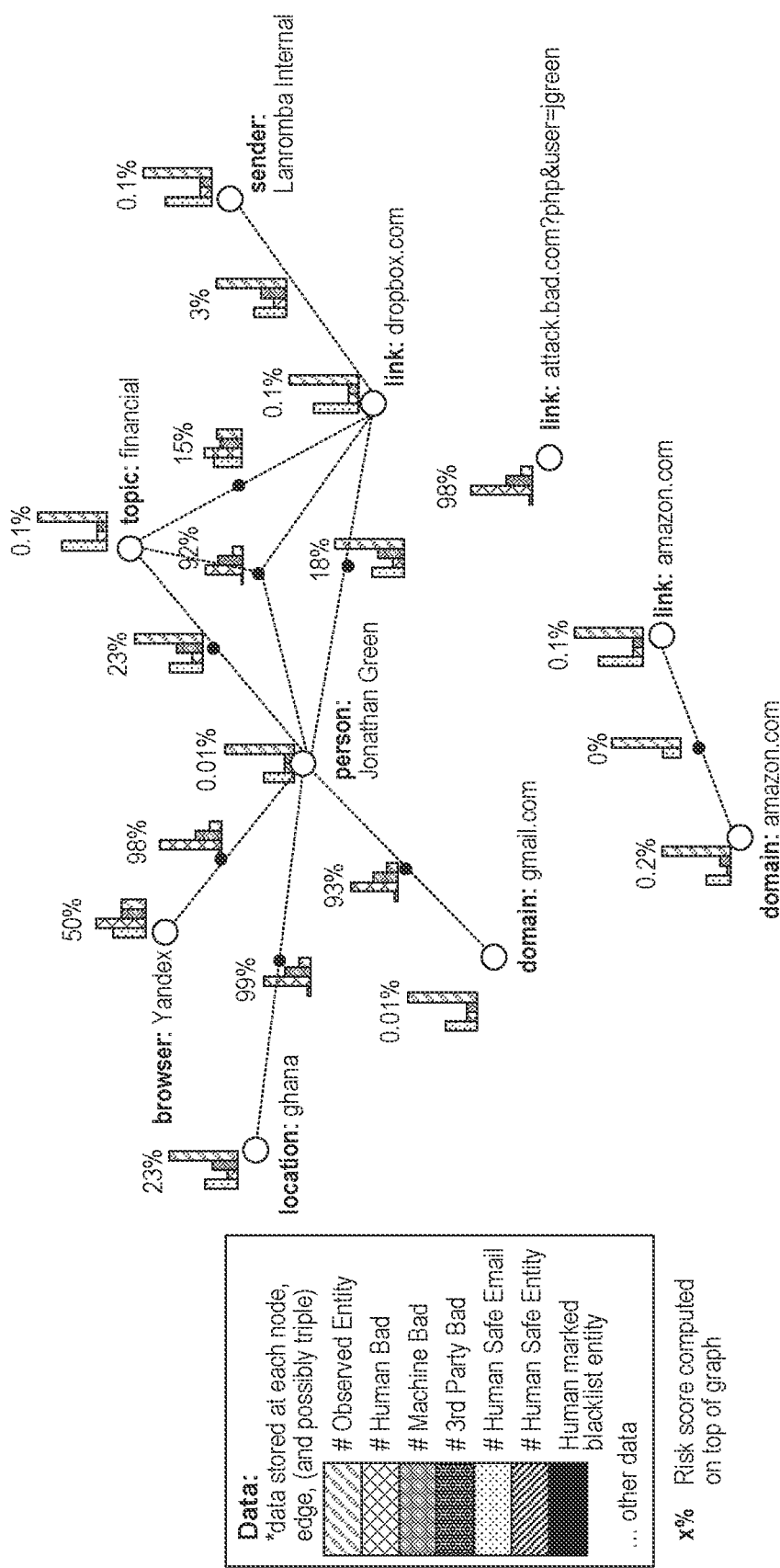
FIG. 12 depicts an example of an entity risk graph.

The threat detection platform can then establish, compile, and/or calculate corpus statistics for the entities determined to be involved in the event. These corpus statistics can be stored/visualized in terms of an entity risk graph. As shown in FIG. 11, the entity risk graph can contain historical combinations of these entities and risk scores associated with those historical combinations. Thus, the entity risk graph represents one way to visualize the types of corpus statistics that have been established, compiled, and/or calculated by the threat detection platform. Each node in the entity risk graph corresponds to a real-world entity, IP address, browser, etc. Accordingly, the entity risk graph may include a risk score for a domain detected in the incoming email, a risk score for an IP address detected in metadata accompanying the incoming email, a risk score for the sender ("Employee A") communicating with the recipient ("Employee B"), etc. Each connection between a pair of nodes, meanwhile, is representative of risk as determined on past events involving those nodes. FIG. 12 depicts an example of an entity risk graph.

Figure 8B:
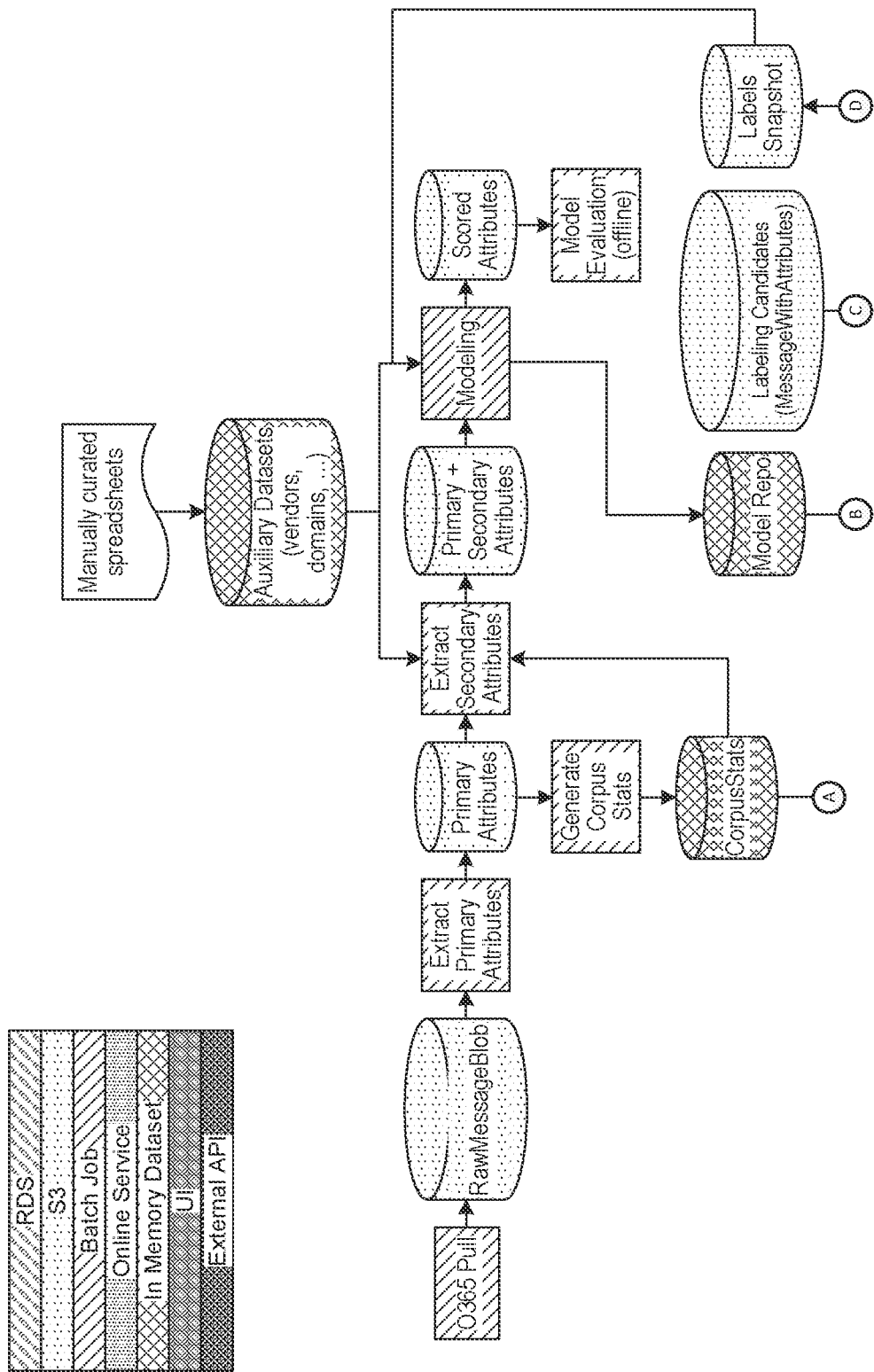
FIG. 8B includes a more detailed example of a process by which a threat detection platform can process data related to past emails (here, acquired from Microsoft Office® 365), extract primary attributes from the past emails, generate corpus statistics based on the primary attributes, derive secondary attributes based on the primary attributes and the corpus statistics, train ML model(s) with the primary attributes and/or the secondary attributes, and then employ the ML model(s) to score incoming emails based on the risk posed to an enterprise.

FIG. 8B includes a more detailed example of a process by which a threat detection platform can process data related to past emails (here, acquired from Microsoft Office® 365), extract primary attributes from the past emails, generate corpus statistics based on the primary attributes, derive secondary attributes based on the primary attributes and the corpus statistics, train ML model(s) with the primary attributes and/or the secondary attributes, and then employ the ML model(s) to score incoming emails based on the risk posed to an enterprise.

FIG. 13 provides an example matrix of the stages that may be performed by a threat detection platform as it processes data, extracts features, determines whether an event is representative of an attack, etc. During a first stage, the threat detection platform can download various data related to the communication activity of an enterprise. For example, the threat detection platform may establish, via an API, a connection with a storage medium that includes data related to past communication activities involving employees of the enterprise. The storage medium could be, for example, an email server that includes past emails sent/received by employees of the enterprise. Accordingly, the threat detection platform can download various data into a local processing environment, such as raw emails, raw attachments, raw directory list(s) (e.g., the enterprise's Microsoft Outlook® directory), raw mail filters, raw risk events, etc.

During a second stage, the threat detection platform can extract text, metadata, and/or signals (collectively referred to as "extracted items") from the downloaded data. For example, the threat detection platform may identify an attachment signal in an email using learned model parameter(s) for text extraction. The term "extracted signal," as used herein, refers to any information, raw or derived, used by the algorithm(s) employed by the threat detection platform as input. Examples of extracted signals include, but are not limited to, structured data such as IP addresses, third-party data or datasets, API-based integration information with any third-party tool, or other enterprise data or datasets. The extracted items can be persisted in a columnar format in which each column is independently updated. As shown in FIG. 14A, each column may be associated with one of three different criteria: (1) extractors (e.g., auth extraction); (2) model application (e.g., extracting spam-text model prediction); and (3) rule (e.g., extract specific phrase defined via a rules interface). FIGS. 14B-C, meanwhile, depicts examples of data structures that may be populated by the threat detection platform using the extracted items.

During a third stage, the threat detection platform can identify the entities involved in a communication activity. For example, if the communication activity is the receipt of an incoming email, the threat detection platform may identify the sender identity, sender email address, or topic based on the text, metadata, and/or signals extracted during the second stage. As discussed above, humans may be responsible for assisting in entity resolution in some instances. Thus, the third stage may be partially performed by human(s) and partially performed by the threat detection platform, or may be entirely performed by the threat detection platform.

During a fourth stage, the threat detection platform can produce summaries for the entities (also referred to as "attributes" of the email) identified in the third stage based on the past communication activities involving those entities. That is, the threat detection platform may produce corpus statistics that are representative of risk scores associated with historical combinations of the entities identified in the third stage. These corpus statistics can be stored/visualized in terms of an entity risk graph, as shown in FIG. 12. Additionally or alternatively, these corpus statistics can be stored in one or more databases. FIG. 14D depicts an example of a database that includes all corpus statistics, and FIG. 14E depicts an example of a database that includes the corpus statistics related to the sender.

During a fifth stage, the threat detection platform can produce a score indicative of risk to the enterprise. Scores may be produced on a per-communication, per-attack-type, or per-entity basis. Accordingly, the threat detection platform may score each incoming email directed to an employee of the enterprise to determine which incoming emails, if any, should be prevented from reaching the employee's inbox. Generally, incoming emails are scored based on compromise score, and compromise is scored based on the number/type of malicious emails that are received. For example, the threat detection platform may include a threat detection engine and an account compromise engine that separately consider incoming emails. The output produced by each engine (e.g., in terms of score, suspiciousness, etc.) may be used by the other engine for better detection. For example, if an account is determined to be in the suspicious range by the account compromise engine, all emails originating from that account may be monitored more sensitively by the threat detection engine. This protects against cases where an unauthorized entity (also referred as an "attacker") takes over an account and then uses that account to mount phishing attacks. Scoring of communication activities is further discussed below with respect to FIG. 21.

Figures 14F, 14G:
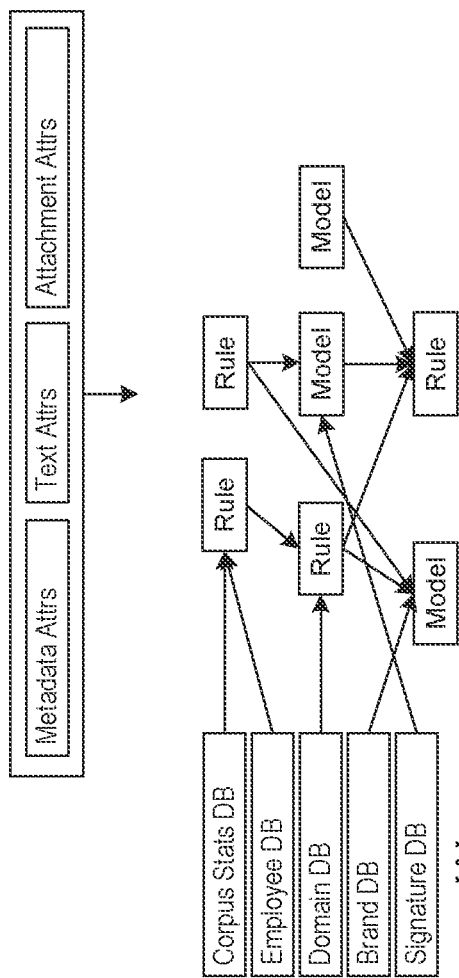

In some embodiments, the threat detection platform also "hydrates" the entities identified in the third stage. The term "hydrate," as used herein, refers to the action of appending additional signals to a communication such as an email. These additional signals can be defined in three locations: (1) code-defined extractor (e.g., secondary attributes); (2) model application (e.g., URL extraction model, ransom model, employee impersonation model); and (3) rule (e.g., specific whitelists or blacklists). As shown in FIG. 14F, an email can be hydrated using a directed acyclic graph (DAG) of databases, rules, and/or models to produce a final set of signals to be used in detection. FIG. 14G illustrates an example of a hydrated email (i.e., an email with primary, secondary, and/or scored attributes).

Figure 14H:
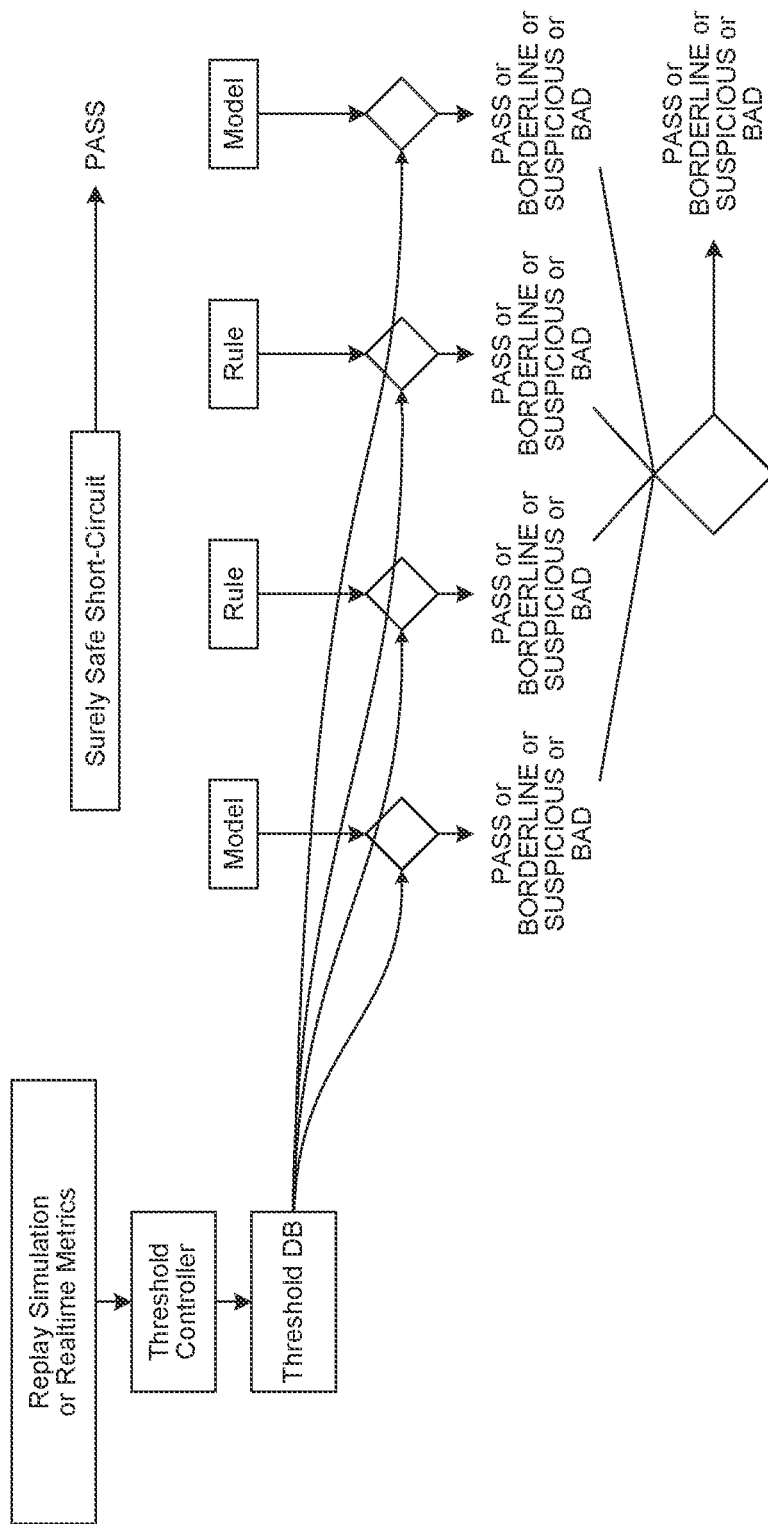

During a sixth stage, the threat detection platform can compare each score with a threshold to determine how the email should be classified. For example, the threat detection platform may determine whether to classify the email as borderline, suspicious, or bad. The thresholds used to determine how each email should be classified may be controlled using live data and/or replay from logs to determine the acceptable number of flagged messages. In some embodiments, the thresholds are updated, continually or periodically, to maintain a target flag rate. For example, the threat detection platform may alter the threshold so that a predetermined percentage of all incoming emails (e.g., 0.1%, 0.5%, or 1.0%) are flagged as borderline, suspicious, or bad. The threshold for a given model may be calibrated based on an internal target for the number of false positives and/or false negatives generated by the given model. Generally, increasing a threshold will result in the model having fewer false positives at the expense of more false negatives, while lowering a threshold will result in the model having fewer false negatives at the expense of more false positives. FIG. 14H illustrates how each rule/model employed by the threat detection platform may return a score that can be modulated by a threshold. These rules/models may correspond to a subset of the entities extracted in the second stage.

Threat Intelligence

Customers may desire to receive threat intelligence about attacks that the threat detection platform has discovered. Because the threat detection platform can monitor incoming emails in real time, unique threat intelligence can be produced that allows abnormal communication activities to be detected more quickly than would be possible with conventional email filtering services.

The threat detection platform can be designed to serve as a centralized system that captures indicators of compromise (IOC) gleaned from a variety of sources, including internal sources (e.g., enterprise databases) and external sources. Examples of IOCs include IP addresses, email addresses, URLs, domains, email attachments, cryptocurrency (e.g., Bitcoin) addresses, etc. A database of IOCs can be used for a few different purposes. While the most paramount purpose is the detection of incoming emails representative of security threats, the database could be provided to enterprises for ingestion into other security products, such as firewalls, security orchestration, automation and response (SOAR) tools, etc. For example, an enterprise may find it useful to provide IOCs deemed to be malicious to a management tool, such as a gateway, to help protect employees from future threats, poor choices, etc. As another example, an enterprise may surface employee accounts associated with IOCs for further examination (e.g., to determine whether those employee accounts have been compromised). Additionally or alternatively, the threat management platform may be programmed to infer a threat condition of each IOC. For instance, the threat management platform might classify each IOC as being representative of a phishing, malware, or compromise operation.

Many enterprises may find it sufficient to examine malicious email campaigns and comprised employee accounts surfaced by the threat detection platform. However, some enterprises have begun monitoring IOCs in order to address security threats in real time. For instance, an enterprise may monitor IOCs gleaned from incoming emails by the threat detection platform to identify appropriate responses and/or proactive measures to prevent these IOCs from entering its environment again in the future.

At a high level, the threat detection platform can be designed to perform various tasks including:

Ingestion of threat intelligence from different types of sources such as:
Inferred IOCs based on statistics of previously-seen attacks (e.g., the number of good or bad emails sent from the same source IP address);
IOCs based on detected attacks (e.g., compromised domains and phishing links); and
Internal security analysts installed by enterprises; and
Exportation of threat intelligence (e.g., as a database for inline use in examining incoming emails, or as a feed to be ingested by other security threat products);

Embodiments of the threat detection platform may also be designed to permit enabling/disabling of IOCs on a per-enterprise basis. For example, an enterprise may upload a list of IOCs to the threat detection platform that should be used specifically when examining their emails. Moreover, the threat detection platform may annotate IOCs with a probability so that those IOCs which are probably malicious can be supported. Thus, the threat detection platform could be designed to flag those emails determined to be malicious, as well as those emails that may be malicious. In some embodiments, the threat detection platform is able to place a time limit on each IOC to prevent permanent blacklisting. For example, if a given website is found to be hosting a phishing website, the threat detection platform may capture the given website as an IOC for a specified time period after which it checks whether the given website is still hosting the phishing website.

Figure 15A:
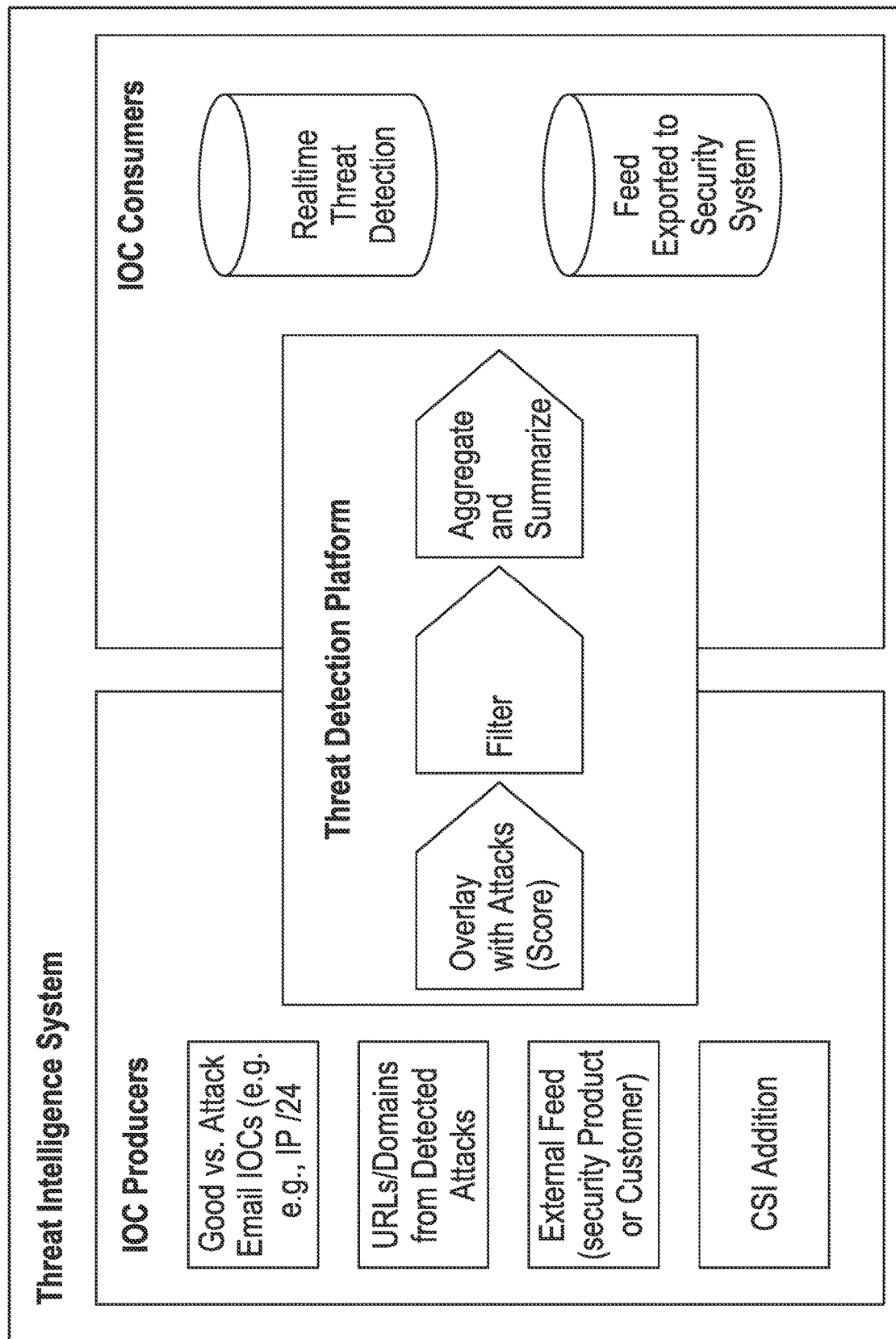
FIG. 15A includes a high-level system diagram of a threat intelligence system of which the threat detection platform is a part.

FIG. 15A includes a high-level system diagram of a threat intelligence system of which the threat detection platform is a part. As shown in FIG. 15A, IOCs can be produced/identified by several different sources. These sources include incoming email, URLs, domains, external feeds (e.g., from another security threat product), internal security analysts, etc.

The threat detection platform may overlay the IOCs with attacks discovered, for example, by examining incoming email. That is, the threat detection platform may attempt to match the IOCs with corresponding attacks so that the score calculated for each attack can be attributed to the appropriate IOC. Thereafter, the threat detection platform may filter the IOCs (e.g., based on the scores that have been attributed to them) and then use the filtered IOCs (and corresponding scores) to further bolster the ability to detect security threats.

In some embodiments, the threat detection platform may utilize its ecosystem of multiple enterprises to offer federated capabilities. For example, the threat detection platform could build a central vendor database across its entire environment to establish a list of vendors and learn what constitutes normal behavior for each vendor. For example, the central vendor database may specify the email endpoints used by each vendor, the accountant(s) responsible for sending invoices for each vendor, the invoicing software used by each vendor, the routing/bank account numbers for each vendor, the location from which the invoices of each vendor originate, etc. As another example, the threat detection platform could build a central threat database across its entire environment to establish a list of entities (e.g., IP addresses, URLs, domains, email addresses) that are most notable in sending attacks. The central threat database may be helpful as it permits the threat detection platform to apply knowledge gained from one enterprise across the entire ecosystem. As another example, the threat detection platform may automatically monitor inboxes to which employees have been instructed to forward suspicious email. When the threat detection platform discovers a malicious email that was missed by its ML models, the threat detection platform may automatically pull the malicious email from all other inboxes in the enterprise where it was found. Moreover, the threat detection platform may use its federated ecosystem to pull the malicious email from inboxes of other enterprises.

Generally, the threat detection platform is designed so that datasets can be computed, tracked, and added to the modeling pipeline in which ML models are developed, trained, etc. Each dataset may be readily reproducible, updatable, and searchable/viewable. As noted above, the datasets may be editable through interfaces generated by the threat detection platform. For example, a human may label different elements included in a dataset for the purpose of training an ML model. Examples of databases that may be accessible to the threat detection platform include:

A vendor database that includes a set of common vendors from which enterprises receive emails. Examples of vendors include American Express®, Chase®, Lloyd's Bank®, Microsoft®, etc. In the vendor database, each vendor may be associated with a canonical name, a list of safe domains (e.g., domains that an email links to, domains the emails are received from, domains with which the vendor works), a list of alias names, a list of regular expressions (e.g., "Employee via Third-Party Service"), or another appropriate signifier, etc. The threat detection platform may use the vendor database to whitelist domains known to be good/safe that vendors send emails from or to perform other types of email scoring or analysis.

A domain database that includes a set of top-level domains. For each domain, the threat detection platform can track some additional data. For example, the threat detection platform may establish whether the domain has been whitelisted as a safe domain, whether the domain corresponds to a hosting service, and whether the domain is a redirector. Moreover, the threat detection platform may establish what, if anything, Google's SafeBrowsing API says about the domain, how often the domain is included in emails received by the enterprise, how much labeled data can be seen, what cached Whois data is available for the domain, etc.

A Whois registrant database that includes information about each registrant that is derived from Whois data stored in the domain database.

A URL database that includes URL-level data derived from links included in emails received at an enterprise. For each URL, the threat detection platform may populate an entry with a model of URL suspiciousness, external data regarding URL quality (e.g., data from phishtank.com), data acquired via Google's Safe-Browsing API, or statistics regarding how often the URL is seen by the enterprise.

An employee database that includes information on employees of an enterprise. Generally, the threat detection platform maintains a separate employee database for each enterprise whose email is being monitored. For each employee, the threat detection platform may populate an entry with a company identifier, name, employee identifier, alias name(s), common email address(es) (e.g., enterprise email addresses and personal email addresses that have been verified), Lightweight Directory Access Protocol (LDAP) role, and the number of attacks observed against the employee.

A label database (also referred to as a "feedback database") that includes labelled data to be used to build aggregated feedback for each enterprise, employee, etc. An entry could include aggregated feedback for an email address, domain, link, normalized/hashed body, etc. For example, an entry in the label database may specify that 15 of 30 labels for emails from "A@exploit.com" have been labeled as positive for attacks, or that 10 out of 11 labels for emails containing a link to http://xyz.com have been labeled as positive for attacks.

As discussed above, an enterprise may monitor IOCs gleaned from incoming emails by the threat detection platform to identify appropriate responses and/or proactive measures to prevent these IOCs from entering its environment again in the future. By exposing IOCs in a rapid manner, the threat detection platform can alert enterprises so that security postures can be improved to counteract security threats. FIG. 15B depicts an example of an interface through which an enterprise can examine IOCs discovered by the threat detection platform.

In some embodiments, the threat detection platform provides the ability to extract and/or export IOCs. For example, through the interface shown in FIG. 15B, an enterprise may export information (also referred to as "threat intelligence") related to these IOCs into a management tool to improve its ability to detect/address these security threats in the future. The threat detection platform may format the information (e.g., into a machine-readable form) so that it is readable/shareable. For example, the information may be formatted in accordance with the Structured Threat Information Expression (STIX) and Trusted Automated Exchange of Indicator Information (TAXII) specifications. Generally, STIX will indicate what type of threat intelligence is formatted, while TAXII will define how the underlying information is relayed.

A schema may be employed to ensure that threat intelligence is accounted for in a consistent manner. For a given IOC, the scheme may indicate:

An observable output (e.g., the actual URL, IP address, domain, or account);

A classification (e.g., whether the IOC is private or public);

A type (e.g., whether the IOC is a URL, IP address, domain, or account);

A severity (e.g., whether the IOC poses a low, medium, high, or very high threat);

A confidence metric (e.g., a score on a 0-100 scale indicating confidence that the IOC represents a security threat);

An observed time; and/or

A Traffic Light Protocol (TLP) metric indicating how widely the underlying information should be shared.

As shown in FIG. 15B, some of this data may be presented on the interface for review by the enterprise. For example, the interface may allow the enterprise to readily sort IOCs by severity level so that those IOCs representing the largest threat can be dealt with.

Figure 16:
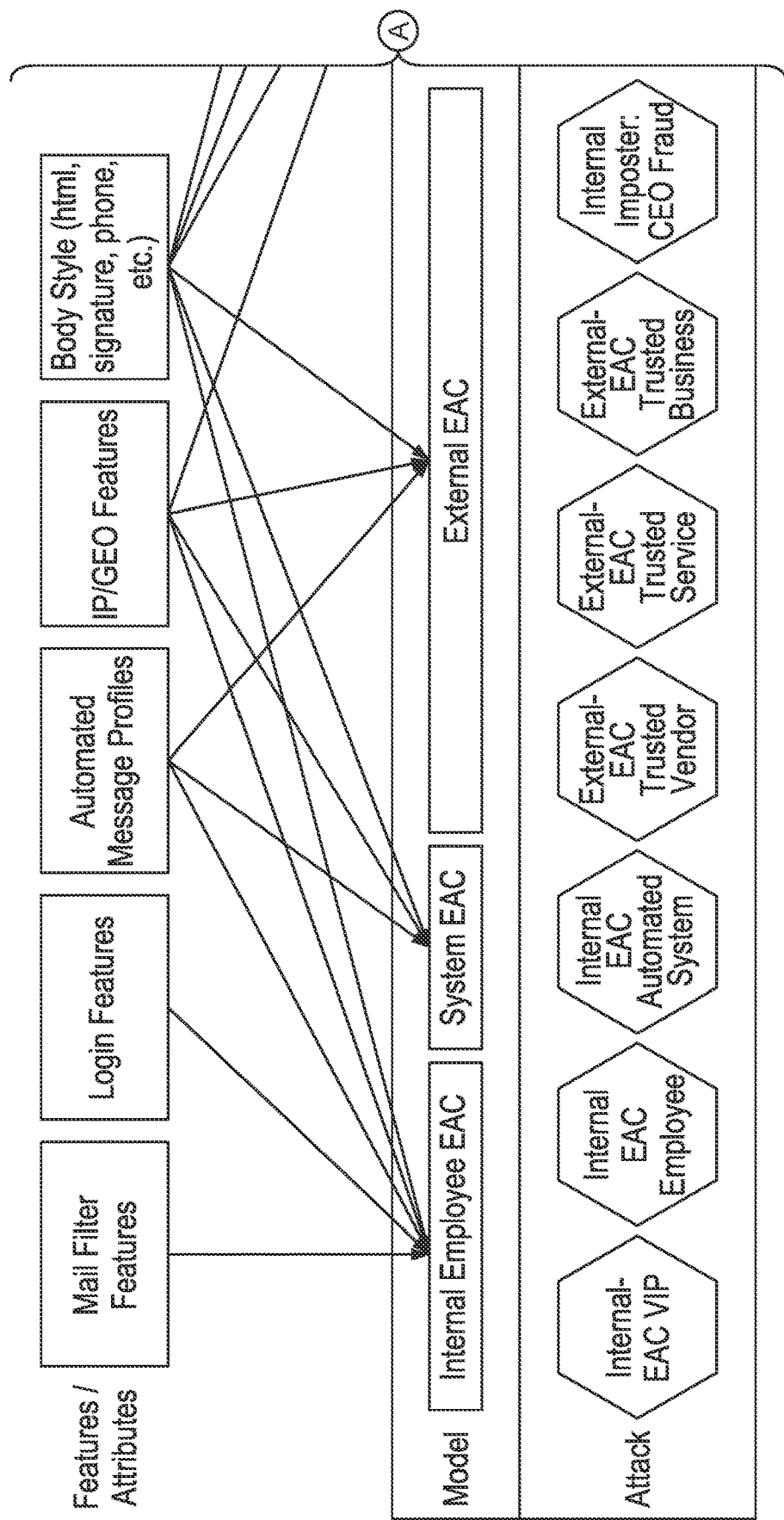
FIG. 16 illustrates how a threat detection platform may derive/infer attributes from data acquired from various sources, profile those attributes to ML models as input, and then examine the output produced by those ML models to determine whether a security threat exists.

FIG. 16 illustrates how a threat detection platform may derive/infer attributes from data acquired from various sources, profile those attributes to ML models as input, and then examine the output produced by those ML models to determine whether a security threat exists. As shown in FIG. 16, the attributes could be provided as input to various ML models associated with different types of attacks. Here, for example, features related to the body style (e.g., HTML, signature, phone number, etc.) of an incoming email could be fed to ML models designed to detect internal employee EAC attacks, system EAC attacks, external EAC attacks, employee impersonation attacks, vendor impersonation attacks, and partner impersonation attacks.

Figure 17:
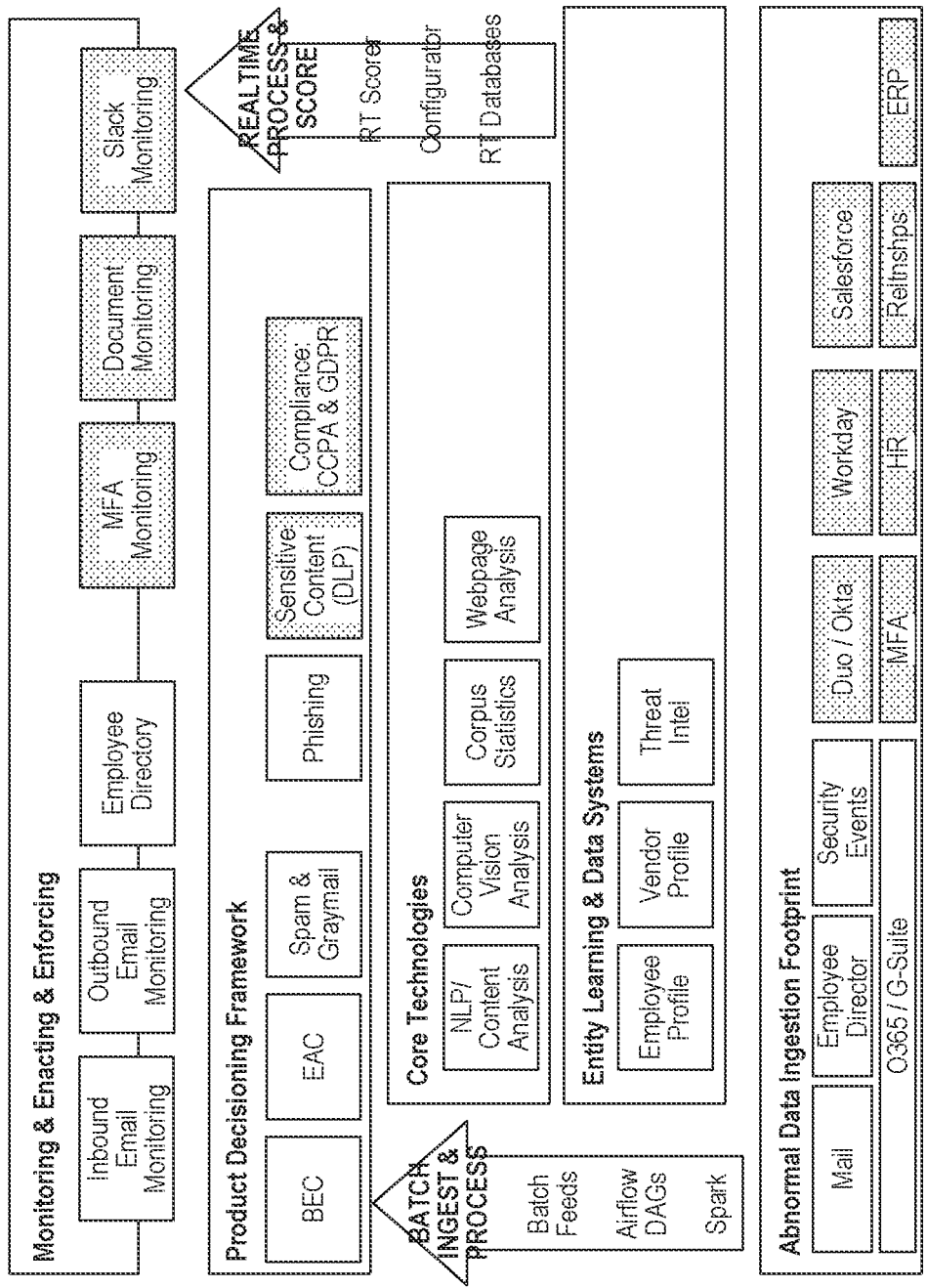
FIG. 17 includes a high-level architectural depiction of a threat detection platform able to generate/update the data used for real-time processing of incoming emails via batch processing.

FIG. 17 includes a high-level architectural depiction of a threat detection platform able to generate/update the data used for real-time processing of incoming emails via batch processing. Batch processing may be particularly helpful in facilitating real-time processing to further enhance the threat detection capabilities of the threat detection platform. This concept may be referred to as near real-time scoring, and it could be used for compute-intensive detection tasks such as processing the attachments that have been attached to incoming emails.

Threat intelligence may represent a core pillar of a long-term strategy for addressing email-based security threats. For example, a threat detection platform may be employed by an enterprise to better understand threats to its security in several ways. First, the threat detection platform could examine corpus statistics to detect instances of employee account compromise (EAC). For instance, given a series of sign-in activities and email activities, how often are good events and/or bad events detected for a particular attribute such as IP address, sender email address, sender location, etc. Second, the threat detection platform could examine corpus statistics to determine what constitutes normal/abnormal communication activity based on the attributes of emails associated with an enterprise. Third, the threat detection platform could produce a set of "bad entities" or "malicious entities" that enterprises can programmatically access to trigger actions in their respective environments. For instance, an enterprise may configure its firewall based on the set of bad entities. Examples of entities include employees, brands, vendors, domains, locations, etc. Fourth, the threat detection platform could generate and/or react to signatures considered malicious in near real time (e.g., within minutes) of obtaining the necessary data. Fifth, given an attribute of a risk event, the threat detection platform could identify past risk events that contained this attribute. By analyzing these past risk events, the threat detection platform can better understand whether the attribute is associated with risk events that were ultimately determined to be safe or malicious. A specialized module (also referred to as a "graph explorer") may be responsible for visually displaying how these past risk events affect the determination of riskiness.

At a high level, the threat detection platform can be described as analyzing risk events (or simply "events") to discover threats to enterprises. An example of a risk event is the receipt or transmission of an email. Another example of a risk event is a sign-in activity or some other communication with a cloud-based mail provider. Another example of a risk event is the creation of a mail filter. The maliciousness of a given risk event may be correlated with the maliciousness of the entities associated with the given risk event. For example, a mail filter will correspond to an employee of an enterprise, an email with an invoice will be received from a vendor, etc. All of these entities are connected to each other by arbitrary connections (e.g., a sender of the email will work for the vendor, the employee will email other employees of the enterprise). The term "signature," as used herein, refers to the combination of one or more attributes that categorizes a risk event. Signatures may be key to counting the risk events that have a particular combination of attributes.

Figure 18A:
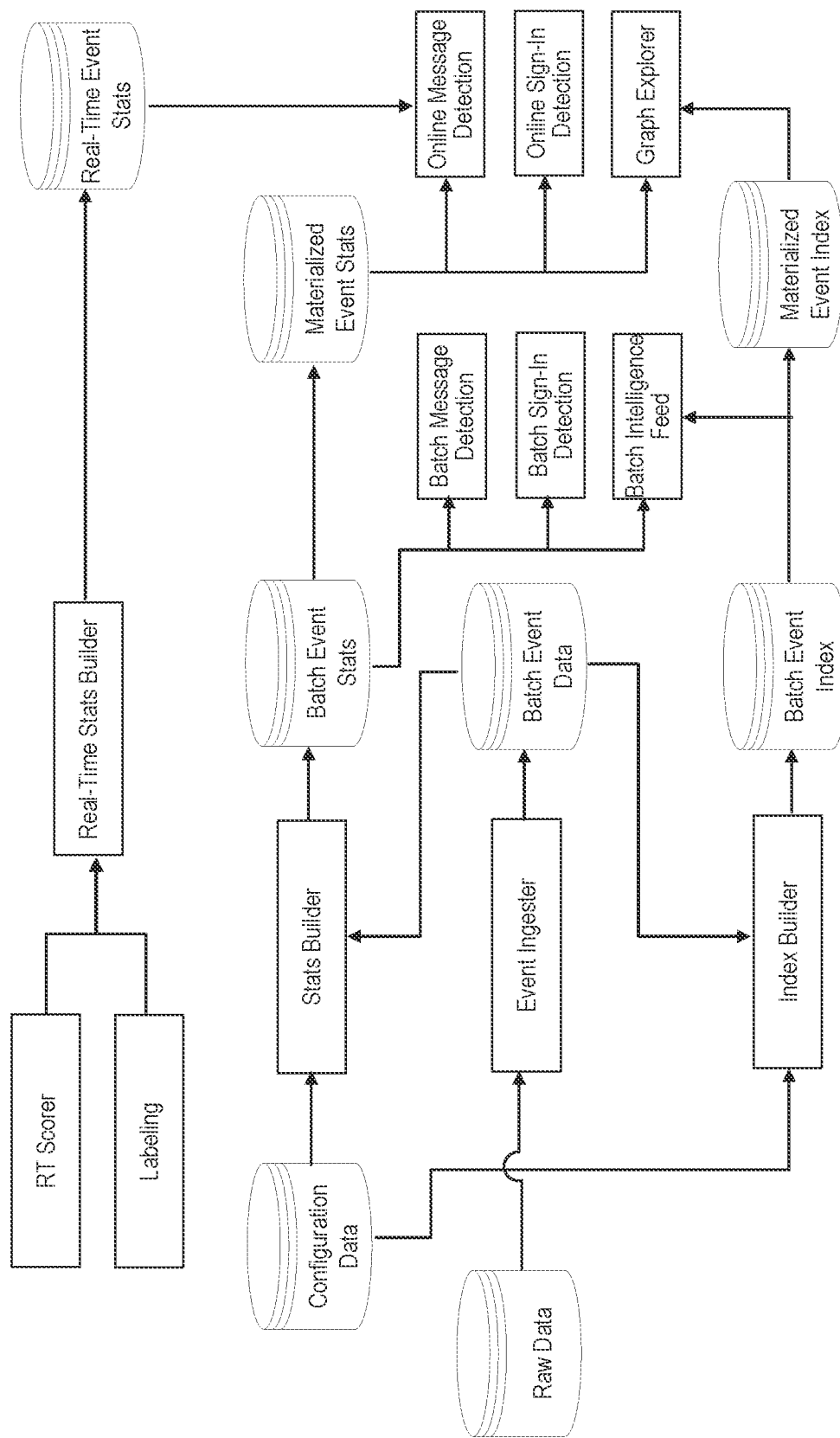
FIG. 18A includes a high-level illustration of a process by which a threat detection platform can perform threat intelligence.

FIG. 18A includes a high-level illustration of a process by which a threat detection platform can perform threat intelligence. As shown in FIG. 18A, data can be obtained from several different inputs (also referred to as "sources"). Here, configuration data includes definitions of risk event attributes that will be tracked by the threat detection platform. For example, the configuration data may include an instruction/algorithm that prompts the threat detection platform to "listen" for risk events that are associated with a given display name and a given sender email address. Domain-specific raw data (e.g., incoming emails with attributes) can also be obtained by the threat detection platform. In some embodiments, a user is permitted to provide functions that extract/map risk events to their attributes.

The event ingester module (or simply "event ingester") may be responsible for converting the raw data into an internal schema for risk events. The schema may be designed to hold various risk events regardless of type (e.g., email, sign-in activity, mail filter). The stats builder module (or simply "stats builder") may be responsible for mapping signatures of attribute dimensions for a date range to counts of risk events.

Figure 18B:
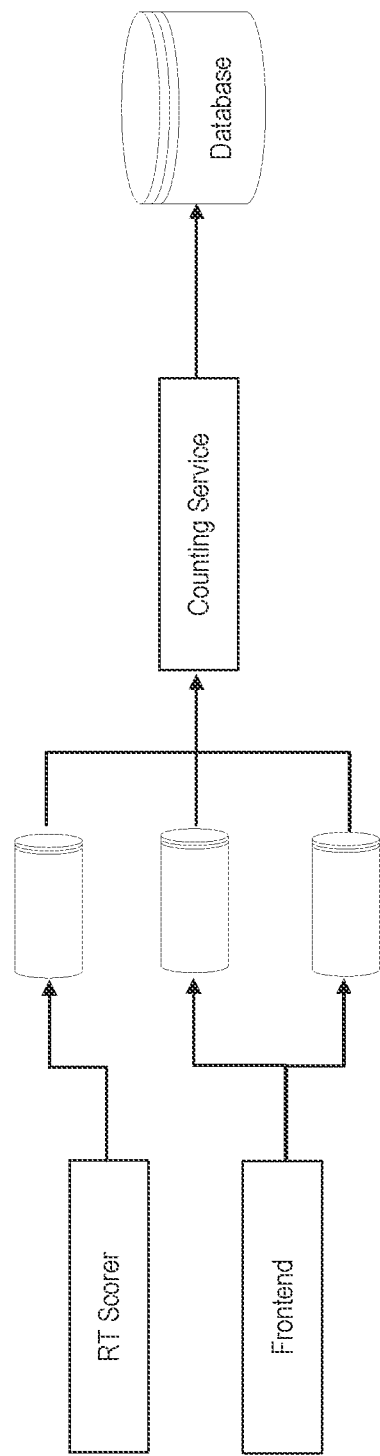
FIG. 18B includes a high-level illustration of a process by which a threat detection platform can "productionalize" a signature to be used to determine the threat posed by incoming emails.

FIG. 18B includes a high-level illustration of a process by which a threat detection platform can "productionalize" a signature to be used to determine the threat posed by incoming emails. Initially, the real-time scoring module (also referred to as the "RT scorer") can process raw data related to incoming emails. The processed data associated with each incoming email can be passed to a counting service (also referred to as a "counting system") that converts the processed data into a processed risk event.

Moreover, each incoming email labeled through the frontend (e.g., via an interface generated by the threat detection platform) can be passed to the counting service that converts the labeled email into a processed risk event. The labels may indicate whether the incoming emails represent a security threat. Accordingly, the processed risk events derived from the labeled emails may be associated with a security risk metric.

The processed risk events created by the counting service can be stored in a database (e.g., a Redis distributed database). This database can be queried for signatures. For example, a query may be submitted for a whitelist of signatures determined not to represent a security threat. As another example, a query may be submitted for a count of signatures having a given attribute or combination of attributes.

Instant Signatures and Corpus Statistics

As discussed above, embodiments of the threat detection platform can be designed to detect security threats by examining behavior, identity, and content rather than metadata, links, domains, signatures, etc. However, it may be advantageous to consider this information in order to detect security threats in a more accurate, consistent, and efficient (e.g., in terms of time and resources) manner.

Several different components of the threat detection platform could extract value from this information. Examples of such components include:
   A database that ingests signatures on a periodic basis and then uses these signatures to detect attacks;
   An ML model designed to ingest signatures on a periodic basis and then employ those signatures in a probabilistic fashion to detect attacks;
   An algorithm able to aggregate activities deemed to be safe or normal over history to be provided as inputs to ML models;
   A trawling module (also referred to as a "trawler") able to create new signatures by examining raw data from the past;
   An ML model designed to infer a general rule for detecting URL-based attacks by examining past emails with unsafe URLs; and
   An ML model designed to periodically examine signatures (or the raw data from which those signatures are derived) to detect changes in communication patterns (e.g., as determined based on the subject line, sender address, etc.).

For example, assume that an email is received from a previously unseen address (attacker@badsite1.com), and the email includes an attachment with a link to an unknown website (badsite2.net). The threat detection platform may separately and immediately identify all emails received from this address as potentially representing a security threat and all emails including a link to this website as potentially representing a security threat. This could be done without requiring that a human review the unknown website.

Figure 19A:
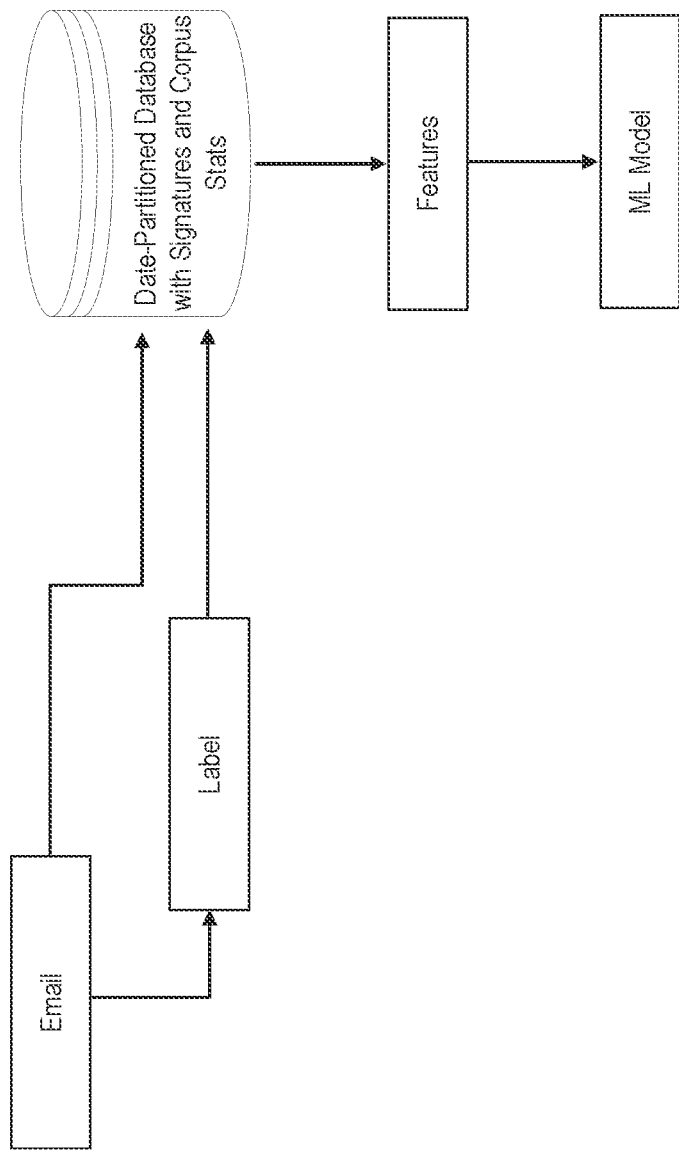
FIG. 19A includes a high-level illustration of a process by which a threat detection platform can index corpus statistics to create a date-partitioned database of signatures and corpus statistics that can be used to identify unsafe entities more effectively.

The keys to accomplishing this include (1) updating corpus statistics in a timely (i.e., non-batch) manner and (2) having date-indexed corpus statistics. FIG. 19A includes a high-level illustration of a process by which a threat detection platform can index corpus statistics to create a date-partitioned database of signatures and corpus statistics that can be used to identify unsafe entities more effectively. Such a process allows the unsafe entities to be identified via an exact match with signatures residing in the database and a probabilistic match with the signatures as determined by the ML models. Moreover, this bi-furcated approach to identifying unsafe entities allows the threat detection platform to react more quickly to attacks that involve unsafe domains and possibly unsafe domains (also referred to as "compromised domains"), as well as attacks that leverage safe domains such as dropbox.com.

FIG. 19B depicts an example of a database that includes signatures and corpus statistics. The date partition may be needed so that the database can be used against messages without future knowledge in training. The database may be updated in near real time based on, for example, outputs produced by a real-time scoring module (e.g., RT scorer of FIG. 18B) and/or labels input via an interface (e.g., as received by frontend of FIG. 18B). As discussed above, the database may be populated/backfilled based on past emails associated with a given interval of time (e.g., 3, 6, 9, or 12 months).

Conceptually, the threat detection platform can organize data into one or more data structures. In the case of corpus statistics, for example, each enterprise may be assigned a single table. These tables may have "N" number of rows, where N is a relatively fixed integer. For example, a table for corpus statistics may include 270 rows if the threat detection platform is interested in tracking 270 days' worth of data, 365 rows if the threat detection platform is interested in tracking 365 days' worth of data, etc. Similarly, the threat detection platform could assign a single table for signatures to each enterprise. However, the number of rows in these tables will normally vary as new signatures are discovered in incoming emails.

Employee Account Compromise

Figure 20:
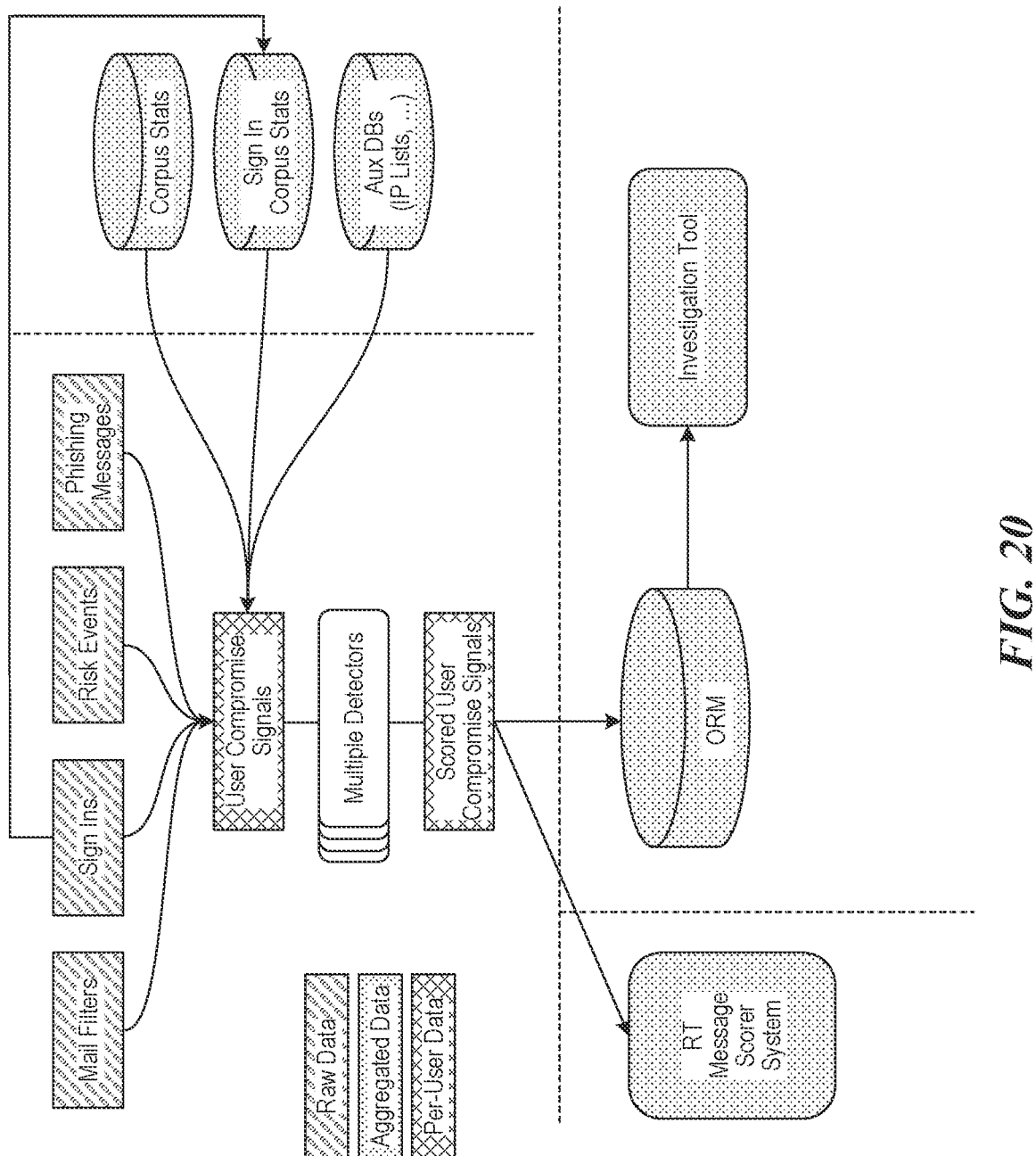
FIG. 20 illustrates how the threat detection platform can detect instances of employee account compromise (EAC).

FIG. 20 illustrates how the threat detection platform can detect instances of employee account compromise (EAC). At a high level, the threat detection platform can learn about an enterprise by identifying their launch points (e.g., virtual private networks (VPNs) and IP addresses), establishing which launch points are considered normal, and then employing personalized, enterprise-based learning to detect security threats. Here, for example, the threat detection platform examines raw data (e.g., in the form of mail filters, sign ins, risk events, and phishing messages) and aggregated data (e.g., in the form of corpus statistics, sign-in corpus statistics, and auxiliary databases) to discover one or more user compromise signals.

Then, the threat detection platform employs multiple detectors to score the user compromise signals. Each score may be representative of how highly the user compromise signal corresponds to the likelihood that an employee's account has been compromised. Accordingly, the user compromise signals may be discovered on a per-user basis (e.g., for each employee of an enterprise).

The threat detection platform can detect instances of EAC by comparing user activity to the scored user compromise signals. For example, the threat detection platform may discover, based on the location and/or the frequency of sign ins, that a given user's account may have become compromised. However, the threat detection platform need not necessarily take action immediately. For instance, the threat detection platform may determine what actions, if any, to take based on which user compromise signal(s) indicate abnormal behavior, the score(s) of those user compromise signal(s), etc. As an example, the threat detection platform may take immediate action to prevent further accesses of the account if the relevant user compromise signal(s) have high scores, but the threat detection platform may continue to monitor the account if the relevant user compromise signal(s) have low scores.

Methodologies for Accurate Scoring

The term "accurate scoring" covers a combination of several concepts further discussed above. FIG. 21 depicts a high-level flow diagram of a process 2100 for scoring the threat posed by an incoming email.

First, a threat detection platform may employ one or more ML models, such as deep learning models, to consume the universe of features that have been extracted for an incoming email from primary and secondary attributes to identify potential security threats (step 2101). Collectively, these ML model(s) may be referred to as the "ML detector." In some embodiments, a real-time proportional-integral-derivative (PID) controller is used to tune the threshold for each entity whose emails are being monitored to take into consideration the changing landscape of attack type, email content, etc. The thresholds ensure that the ML model(s) have high precision and continue to be highly precise over time. To cover the general attack landscape, the threat management platform may employ a combination of federated ML models and enterprise-specific ML models able to capture the per-enterprise nuances of sophisticated attacks (e.g., spear phishing attacks).

Second, the threat detection platform can glean the signatures of IOCs in real time to determine the nature of any security threats identified by the ML detector (step 2102). Examples of IOCs include IP addresses, email addresses, URLs, domains, etc. For zero-hour attacks, as email-based attacks are identified by the ML detector, the IOCs can be extracted from the emails. These IOCs can be automatically ingested into a database as "signatures" in real time. Thereafter, the signatures can be used in conjunction with the ML detector to discover future attacks with the same features.

Third, the threat detection platform can perform deep feature extraction to identify zero-hour attacks (step 2103). Identifying zero-hour attacks requires deeper content analysis to understand the nuances of a possible attack. For example, deep learning sub-model(s) may be applied to understand the text, content, sentiment, and/or tone of an email. As another example, to find phishing pages, computer vision may be used to compare the landing page of a link embedded in an email to a set of known sign-on pages. As another example, webpage crawling may be performed to extract information regarding a deep link (e.g., a link embedded in an attachment or a link accessible on a linked website) to discover instances of deep phishing.

In some situations, it may be useful to understand how a threat detection platform derived insights from an email addressed to an employee of an enterprise. For instance, an individual may want to know how the ML model(s) applied to the email produced the insights given the words, phrases, or sentiments in the body of the email. One example of such an individual is a security operations center (SOC) analyst that is responsible for reviewing and/or addressing security threats on behalf of the enterprise. FIG. 22 depicts a high-level flow diagram of a process 2200 for visually indicating how insights were derived by a threat detection platform.

Initially, the threat detection platform can acquire an incoming email addressed to an employee of an enterprise (step 2201). Then, the threat detection platform can employ one or more ML models, such as deep learning models, to identify linguistic features in the email from which a determination of risk can be made (step 2202). Examples of linguistic features include words, phrases, and sentiments that are helpful in establishing the risk posed by the email. For instance, the threat detection platform may apply ML models designed to identify financial terminology, credential theft terminology, engagement terminology, non-ASCII content, terminology indicative of attachments or links, terminology indicative of requests, and the like. Each ML model employed by the threat detection platform is normally designed to detect linguistic features of a single type. Thus, the threat detection platform may employ multiple ML models to detect linguistic features of different types. For instance, the threat detection platform may employ a first ML model designed to identify terminology indicative of requests, a second ML model designed to identify financial terminology, etc.

Figure 23A:
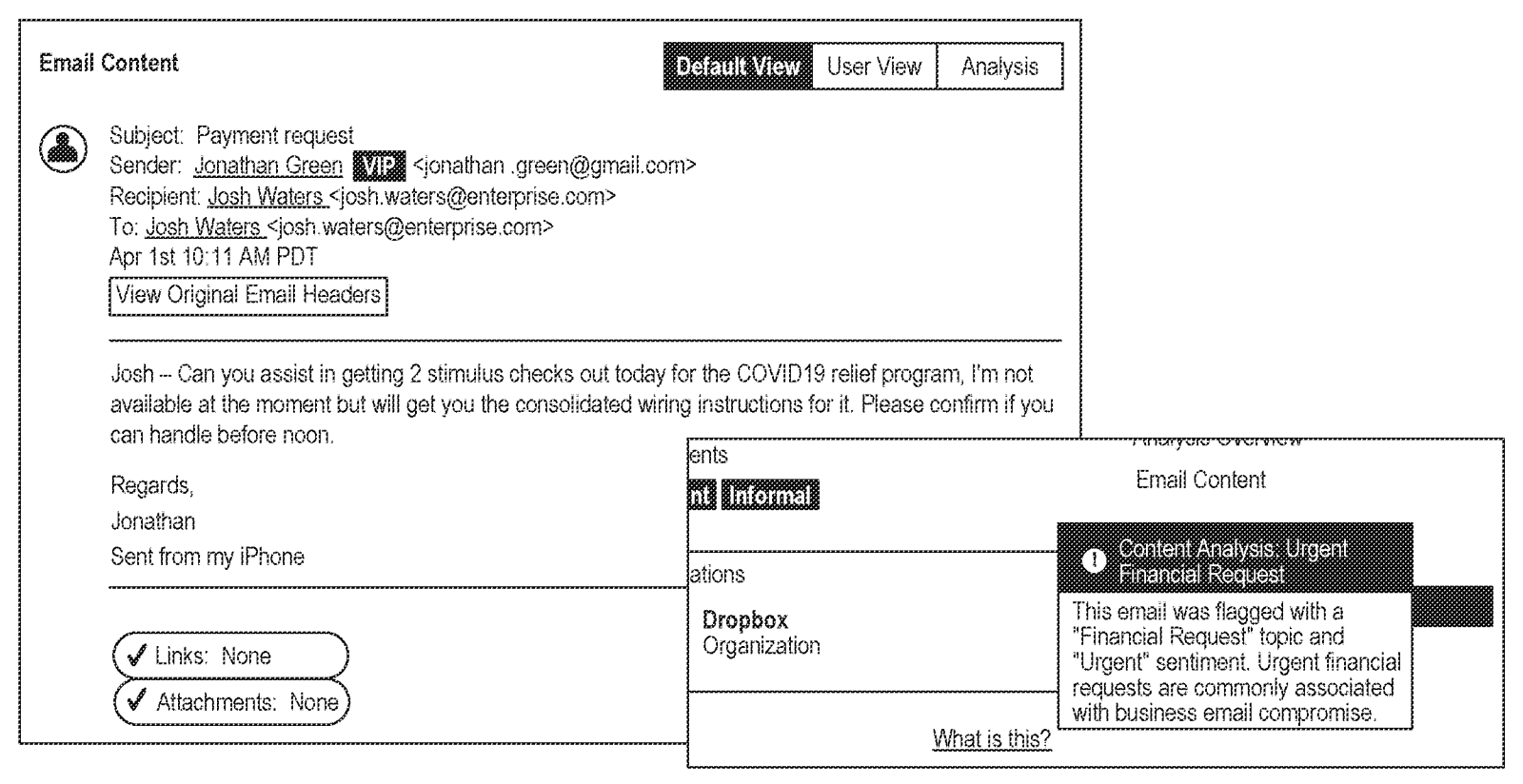

As discussed above, the threat detection platform can determine whether the email poses a risk to the enterprise based on the linguistic features identified in the email (step 2203). Said another way, the threat detection platform can derive insights into the risk posed by the email based on the linguistic features. To improve comprehensibility, the threat detection platform may cause display of a visualization component that indicates how these insights were derived on an interface (step 2204). This can occur in several different ways. In some embodiments, insights are called out within the email when viewed by an individual. For example, in FIG. 23A, a graphic specifying why the email was flagged as a potential security threat overlays the email when viewed. In other embodiments, a report (also referred to as a "summary") is generated and then displayed that specifies why the email was flagged as a potential security threat as shown in FIG. 23B. The report may be useful as information regarding risk can be presented in a structured, coherent manner. In other embodiments, the email is altered to visually indicate how the ML model(s) analyzed the email (and thus identified the linguistic features). FIG. 23C includes several examples of emails that have been altered to visually indicate the analysis performed by the ML model(s) applied thereto. As shown in FIG. 23C, each linguistic feature may be set within the bounds of a digital element that includes a tag indicating the type of linguistic feature. These digital elements may be rendered in different colors to improve comprehensibility. For example, digital elements associated with a first type of linguistic feature may be red, digital elements associated with a second type of linguistic feature may be blue, and digital elements associated with a third type of linguistic feature may be green. These color-type relationships may be predetermined so that visualization components can be quickly examined by experienced individuals. Thus, an experienced individual may learn that digital elements of a given color (e.g., orange) are always representative of linguistic features of a given type (e.g., financial terminology). Such an approach may be helpful in ensuring that the individuals responsible for addressing security threats to an enterprise can comprehend how the threat detection platform made the risk determination.

Threat Detection, Assessment, and Remediation

Figure 24:
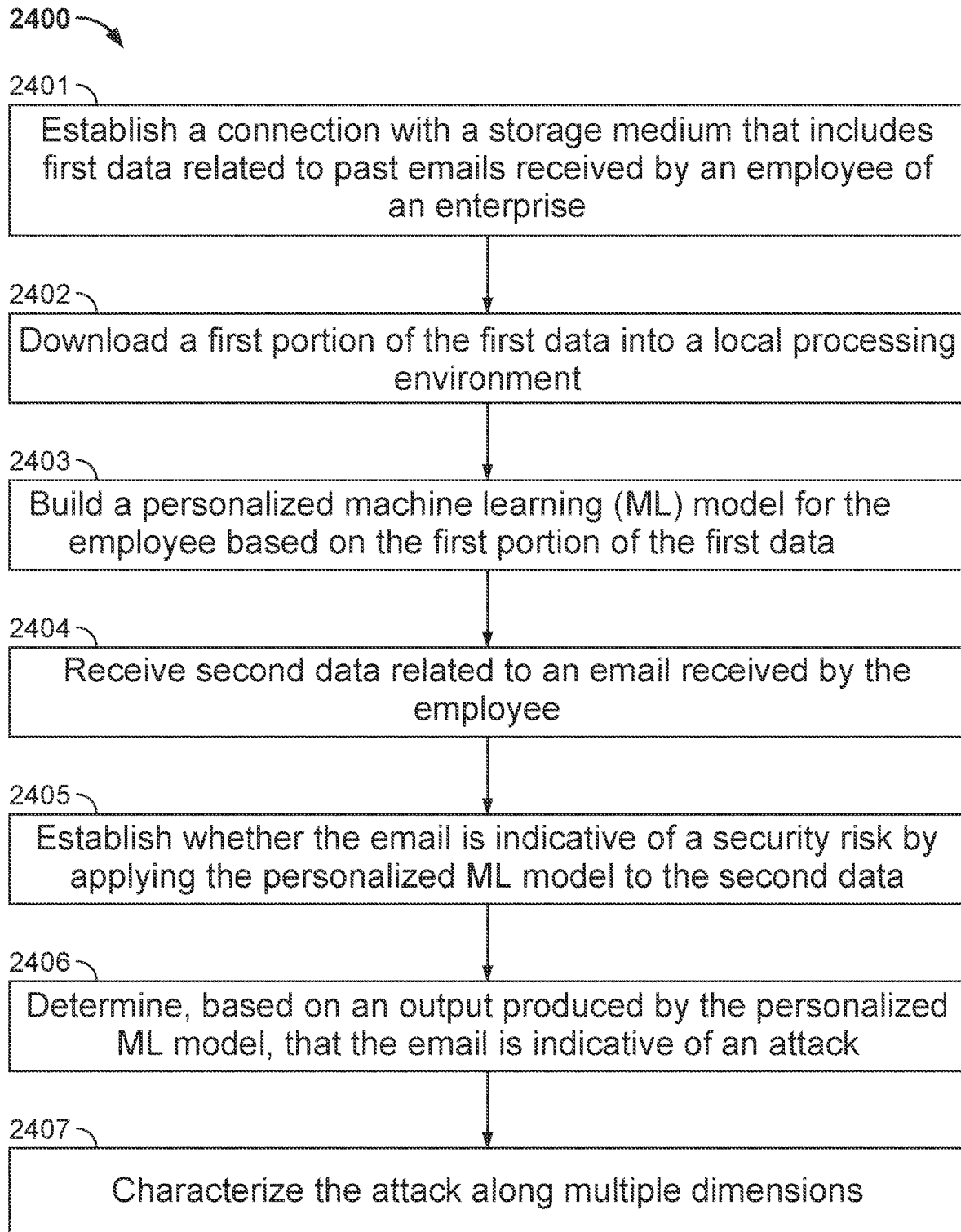
FIG. 24 depicts a flow diagram of a process for applying a personalized machine learning (ML) model to emails received by an employee of an enterprise to detect security threats.

FIG. 24 depicts a flow diagram of a process 2400 for applying a personalized machine learning (ML) model to emails received by an employee of an enterprise to detect security threats. Initially, a threat detection platform can establish a connection with a storage medium that includes first data related to past emails received by the employee of the enterprise (step 2401). The first data could include the past emails themselves, or information related to the past emails such as primary attributes or secondary attributes. In some embodiments, the threat detection platform establishes the connection with the storage medium via an application programming interface (API). In such embodiments, the threat detection platform may not establish the connection with the storage medium until it receives input indicative of an approval from an administrator associated with the enterprise to access the first data.

The threat detection platform can download a first portion of the first data into a local processing environment (step 2402). For example, the threat detection platform may download all emails received by the employee over the last 3 months, 6 months, 12 months, etc. Then, the threat detection platform can build a personalized ML model for the employee based on the first portion of the first data (step 2403). For example, the threat detection platform may parse each email included in the first data to discover one or more attributes, and then the threat detection platform can provide these attributes to the ML model as input for training. Examples of attributes include the sender name, sender email address, subject, etc. Because the personalized ML model is trained using past emails received by the employee, normal communication habits can be established immediately upon deployment.

Thereafter, the threat detection platform may receive second data related to an email received by the employee (step 2404). The threat detection platform can establish whether the email is representative of a security risk by applying the personalized ML model to the second data (step 2405). Such action will cause the personalized ML model to produce an output that indicates whether the email is indicative of an attack. For example, the output may specify whether the email is suspicious, or the output may specify that the email does not conform with the employee's past communication activities.

In some instances, the threat detection platform will determine, based on the output, that the email is indicative of an attack (step 2406). In such instances, the threat detection platform can characterize the attack along multiple dimensions (also referred to as "facets") (step 2407). For example, the threat detection platform may establish the identity of the attacked party, the attack vector, the identity of the impersonated party, the impersonation strategy, and/or the attack goal.

Other steps may also be included in some embodiments. For example, the threat detection platform may download a second portion of the first data corresponding to the local processing environment. The second portion of the first data may correspond to a different interval of time than the first portion of the first data. For example, the first portion of the first data may include all emails received by the employee over the last 6 months, and the second portion of the first data may include all emails received by the employee from 6-12 months ago. Then, the threat detection platform can establish whether any emails included in the second portion of the first data are representative of security risks by applying the personalized ML model to the second portion of the first data.

FIG. 25 depicts a flow diagram of a process 2500 for detecting and characterizing email-based security threats in real time. Initially, a threat detection platform can receive an email addressed to an employee of an enterprise (step 2501). Then, the threat detection platform can apply a first model to the email to produce a first output indicative of whether the email is representative of a malicious email (step 2502). The first model may be trained using past emails addressed to the employee (and possible other employees) that have been verified as non-malicious emails. Accordingly, the first model may be referred to as the "surely-safe model." The first model serves as the first level of threat detection, and therefore may be tuned/designed to permit most email (e.g., upwards of 90, 95, or 99 percent of all incoming email) to reach the intended destination.

In some instances, the threat detection platform will determine, based on the first output, that the email is representative of a malicious email (step 2503). In such instances, the threat detection platform can apply a second model to the email to produce a second output indicative of whether the email is representative of a given type of malicious email (step 2504). As discussed above, the second model may be one or multiple models applied to the email responsive to determining that the email is representative of a malicious email. Thus, the threat detection platform may apply multiple models to the email to produce multiple outputs, and each model of the multiple models may correspond to a different type of malicious email.

The threat detection platform can then determine whether to remediate the email based on the second output (step 2505). That is, the threat detection platform can determine what actions, if any, should be performed based on the second output. For example, if the second output indicates that the email includes a link to an HTML resource, the threat detection platform may follow the link so that the HTML resource is accessed using a virtual web browser, extract a Document Object Model (DOM) for the HTML resource through the virtual web browser, and analyze the DOM to determine whether the link represents a security risk. As another example, if the second output indicates that the email includes a primary link to a resource hosted by a network-accessible hosting service (e.g., Google Drive®, Box®, Dropbox®, or Microsoft OneDrive®), the threat detection platform may follow the primary link so that the resource is accessed using a virtual web browser, discover whether any secondary links to secondary resources are present by examining content of the resource through the virtual web browser, follow each secondary link to analyze content of the corresponding secondary resource through the virtual web browser, and determine whether the primary link represents a security threat based on whether any secondary links were determined to represent security threats. As another example, if the second output indicates that the email includes a link to an HTML resource, the threat detection platform may follow the link so that the HTML resource is accessed using a virtual web browser, capture a screenshot of the HTML resource through the virtual web browser, apply a computer vision (CV) algorithm designed to identify similarities between the screenshot and a library of verified sign-in websites, and determine whether the link represents a security threat based on an output produced by the CV algorithm. As another example, if the second output indicates that the email includes an attachment, the threat detection platform may open the attachment within a secure processing environment and then determine whether the attachment represents a security threat based on an analysis of content of the attachment. For instance, the threat detection platform may use a headless browser instance running on a standalone computer server (also referred to as a "sandbox computer server") to inspect the attachment (e.g., by generating a screenshot of its contents), rather than open the attachment directly on a computing device associated with the recipient of the email. Moreover, the threat detection platform may examine any links included in the attachment as discussed above.

In some embodiments, the threat detection platform is further configured to apply a third model designed to produce a comprehensible visualization component based on the second output (step 2506). In embodiments where the second model is part of an ensemble of models applied by the threat detection platform, the third model can aggregate the outputs produced by the models in the ensemble, characterize the attack based on the aggregated outputs, and then convert the aggregated outputs into a comprehensible visualization component. For example, the third model may generate a notification that identifies the type of security threat posed by the email, whether remediation actions are necessary, etc. The comprehensible visualization component may be created so that security professionals responsible for addressing/mitigating security threats can more easily understand why an incoming email was flagged as being representative of an attack.

Processing System

Figure 26:
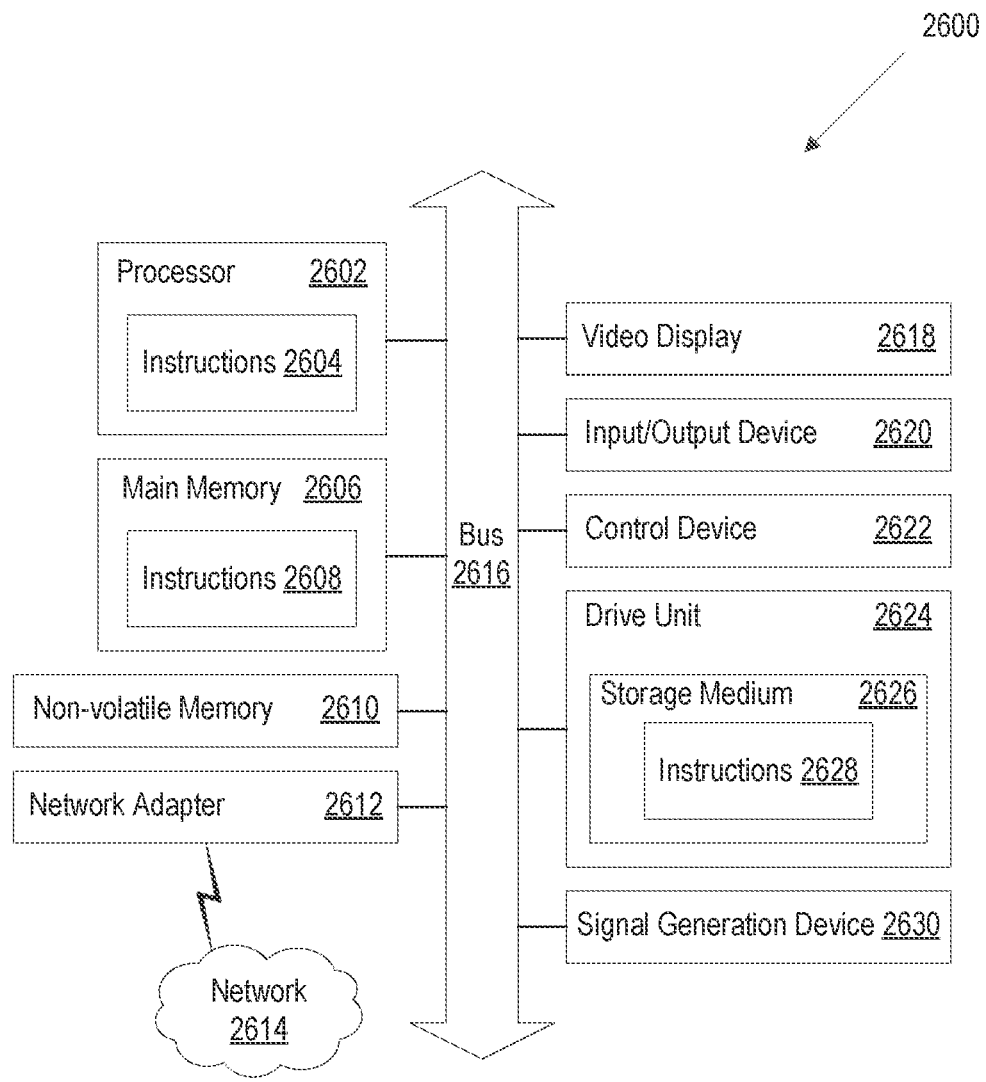
FIG. 26 is a block diagram illustrating an example of a processing system in which at least some operations described herein can be implemented.

FIG. 26 is a block diagram illustrating an example of a processing system 2600 in which at least some operations described herein can be implemented. For example, some components of the processing system 2600 may be hosted on a computing device that includes a threat detection platform (e.g., threat detection platform 214 of FIG. 2). As another example, some components of the processing system 2600 may be hosted on a computing device that is queried by a threat detection platform to acquire emails, data, etc.

The processing system 2600 may include one or more central processing units ("processors") 2602, main memory 2606, non-volatile memory 2610, network adapter 2612 (e.g., network interface), video display 2618, input/output devices 2620, control device 2622 (e.g., keyboard and pointing devices), drive unit 2624 including a storage medium 2626, and signal generation device 2630 that are communicatively connected to a bus 2616. The bus 2616 is illustrated as an abstraction that represents one or more physical buses and/or point-to-point connections that are connected by appropriate bridges, adapters, or controllers. The bus 2616, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), an IIC (I2C) bus, or an Institute of Electrical and Electronics Engineers (IEEE) standard 1394 bus (also referred to as "Firewire").

The processing system 2600 may share a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the processing system 2600.

While the main memory 2606, non-volatile memory 2610, and storage medium 2626 (also called a "machine-readable medium") are shown to be single mediums, the term "machine-readable medium" and "storage medium" should be taken to include a single medium or multiple media (e.g., a centralized/distributed database and/or associated caches and servers) that store one or more sets of instructions 2628. The term "machine-readable medium" and "storage medium" shall also be taken to include any medium that is capable of storing, encoding, or carrying a set of instructions for execution by the processing system 2600.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 2604, 2608, 2628) set at various times in various memory and storage devices in a computing device. When read and executed by the one or more processors 2602, the instruction(s) cause the processing system 2600 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually affect the distribution.

Further examples of machine-readable storage media, machine-readable media, or computer-readable media include recordable-type media such as volatile and non-volatile memory devices 2610, floppy and other removable disks, hard disk drives, optical disks (e.g., Compact Disk Read-Only Memory (CD-ROMS), Digital Versatile Disks (DVDs)), and transmission-type media such as digital and analog communication links.

The network adapter 2612 enables the processing system 2600 to mediate data in a network 2614 with an entity that is external to the processing system 2600 through any communication protocol supported by the processing system 2600 and the external entity. The network adapter 2612 can include a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 2612 may include a firewall that governs and/or manages permission to access/proxy data in a computer network, and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A non-transitory computer-readable medium with instructions stored thereon that, when executed by a processor, cause the processor to perform operations comprising:
   receiving an email addressed to a recipient who is an employee of an enterprise;
   determining an identity of a sender based on an analysis of the email;
   obtaining a first set of models that includes (i) a first model trained using past emails sent by the sender that have been verified as non-malicious and (ii) a second model trained using past emails received by the recipient that have been verified as non-malicious, wherein the first model is trained to identify deviations in features, content, or context that are representative of changes in behavior of the sender, and wherein the second model is trained to identify deviations in features, content, or context that are representative of changes in behavior of the recipient;
   applying the first set of models to the email to produce a first output indicative of whether the email is representative of a malicious email;
   determining, based on the first output, whether the email is a malicious email;
   in response to a determination that the email is a malicious email, applying a second set of models to the email to produce a second output indicative of whether the email is representative of a given type of malicious email; and
   performing an action with respect to the email based on the second output.

2. The non-transitory computer-readable medium of claim 1, wherein the second output indicates that the email is not of the given type of malicious email, and wherein performing the action comprises forwarding the email to an inbox of the employee.

3. The non-transitory computer-readable medium of claim 1, wherein each model of the second set of models is associated with a different type of malicious email.

4. The non-transitory computer-readable medium of claim 3, wherein each model in the second set of models produces a separate output when applied to the email, and wherein the operations further comprise: applying a third model designed to aggregate the separate outputs produced by the second set of models into a comprehensible visualization component.

5. The non-transitory computer-readable medium of claim 1, wherein the second output indicates that the email includes a link to a Hypertext Markup Language (HTML) resource, and wherein performing the action comprises:
   following the link so that the HTML resource is accessed using a virtual web browser,
   extracting a Document Object Model (DOM) for the HTML resource through the virtual web browser, and
   analyzing the DOM to determine whether the link represents a security threat.

6. The non-transitory computer-readable medium of claim 1,
   wherein the second output indicates that the email includes a primary link to a resource hosted by a network-accessible hosting service, and wherein performing the action comprises:
   following the primary link so that the resource is accessed using a virtual web browser,
   discovering whether any secondary links to secondary resources are present by examining content of the resource through the virtual web browser, for each secondary link, following the secondary link so that the corresponding secondary resource is accessed using the virtual web browser, and analyzing content of the corresponding secondary resource to determine whether the secondary link represents a security threat, and determining whether the primary link represents a security threat based on whether any secondary links were determined to represent security threats.

7. The non-transitory computer-readable medium of claim 1, wherein the second output indicates that the email includes a link to a Hypertext Markup Language (HTML) resource, and wherein performing the action comprises:

following the link so that the HTML resource is accessed using a virtual web browser, capturing a screenshot of the HTML resource through the virtual web browser, applying a computer vision algorithm designed to identify similarities between the screenshot and a library of verified sign-in websites, and determining whether the link represents a security threat based on an output produced by the computer vision algorithm.

8. The non-transitory computer-readable medium of claim 1, wherein the second output indicates that the email includes an attachment, and wherein performing the action comprises:

opening the attachment within a secure processing environment, and determining whether the attachment represents a security threat based on an analysis of content of the attachment.

9. A system, comprising:

a processor configured to:

receive an email addressed to a recipient who is an employee of an enterprise;

determine an identity of a sender based on an analysis of the email;

obtain a first set of models that includes: (i) a first model trained using past emails sent by the sender that have been verified as non-malicious, and (ii) a second model trained using past emails received by the recipient that have been verified as non-malicious, wherein the first model is trained to identify deviations in features, content, or context that are representative of changes in behavior of the sender, and wherein the second model is trained to identify deviations in features, content, or context that are representative of changes in behavior of the recipient;

apply the first set of models to the email to produce a first output indicative of whether the email is representative of a malicious email;

determine, based on the first output, whether the email is a malicious email;

in response to a determination that the email is a malicious email, apply a second set of models to the email to produce a second output indicative of whether the email is representative of a given type of malicious email; and perform an action with respect to the email based on the second output; and a memory coupled to the processor and configured to provide the processor with instructions.

10. The system of claim 9, wherein the second output indicates that the email is not of the given type of malicious email, and wherein performing the action comprises forwarding the email to an inbox of the employee.

11. The system of claim 9, wherein each model of the second set of models is associated with a different type of malicious email.

12. The system of claim 11, wherein each model in the second set of models produces a separate output when applied to the email, and wherein the operations further comprise applying a third model designed to aggregate the separate outputs produced by the second set of models into a comprehensible visualization component.

13. The system of claim 9, wherein the second output indicates that the email includes a link to a Hypertext Markup Language (HTML) resource, and wherein performing the action comprises:

following the link so that the HTML resource is accessed using a virtual web browser;

extracting a Document Object Model (DOM) for the HTML resource through the virtual web browser; and analyzing the DOM to determine whether the link represents a security threat.

14. The system of claim 9, wherein the second output indicates that the email includes a primary link to a resource hosted by a network-accessible hosting service, and wherein performing the action comprises:

following the primary link so that the resource is accessed using a virtual web browser;

discovering whether any secondary links to secondary resources are present by examining content of the resource through the virtual web browser;

for each secondary link, following the secondary link so that the corresponding secondary resource is accessed using the virtual web browser, and analyzing content of the corresponding secondary resource to determine whether the secondary link represents a security threat; and determining whether the primary link represents a security threat based on whether any secondary links were determined to represent security threats.

15. The system of claim 9, wherein the second output indicates that the email includes a link to a Hypertext Markup Language (HTML) resource, and wherein performing the action comprises:

following the link so that the HTML resource is accessed using a virtual web browser;

capturing a screenshot of the HTML resource through the virtual web browser;

applying a computer vision algorithm designed to identify similarities between the screenshot and a library of verified sign-in websites; and determining whether the link represents a security threat based on an output produced by the computer vision algorithm.

16. The system of claim 9, wherein the second output indicates that the email includes an attachment, and wherein performing the action comprises:

opening the attachment within a secure processing environment; and determining whether the attachment represents a security threat based on an analysis of content of the attachment.

17. A method, comprising:

receiving an email addressed to a recipient who is an employee of an enterprise;

determining an identity of a sender based on an analysis of the email;

obtaining a first set of models that includes: (i) a first model trained using past emails sent by the sender that have been verified as non-malicious, and (ii) a second model trained using past emails received by the recipient that have been verified as non-malicious, wherein the first model is trained to identify deviations in features, content, or context that are representative of changes in behavior of the sender, and wherein the second model is trained to identify deviations in features, content, or context that are representative of changes in behavior of the recipient;

applying the first set of models to the email to produce a first output indicative of whether the email is representative of a malicious email;

determining, based on the first output, whether the email is a malicious email;

in response to a determination that the email is a malicious email, applying a second set of models to the email to produce a second output indicative of whether the email is representative of a given type of malicious email; and performing an action with respect to the email based on the second output.

18. The method of claim 17, wherein the second output indicates that the email is not of the given type of malicious email, and wherein performing the action comprises forwarding the email to an inbox of the employee.

19. The method of claim 17, wherein each model of the second set of models is associated with a different type of malicious email.

20. The method of claim 19, wherein each model in the second set of models produces a separate output when applied to the email, and wherein the operations further comprise:

applying a third model designed to aggregate the separate outputs produced by the second set of models into a comprehensible visualization component.

21. The method of claim 17, wherein the second output indicates that the email includes a link to a Hypertext Markup Language (HTML) resource, and wherein performing the action comprises:

following the link so that the HTML resource is accessed using a virtual web browser;

extracting a Document Object Model (DOM) for the HTML resource through the virtual web browser; and analyzing the DOM to determine whether the link represents a security threat.

22. The method of claim 17, wherein the second output indicates that the email includes a primary link to a resource hosted by a network-accessible hosting service, and wherein performing the action comprises:

following the primary link so that the resource is accessed using a virtual web browser;

discovering whether any secondary links to secondary resources are present by examining content of the resource through the virtual web browser;

for each secondary link, following the secondary link so that the corresponding secondary resource is accessed using the virtual web browser, and analyzing content of the corresponding secondary resource to determine whether the secondary link represents a security threat; and determining whether the primary link represents a security threat based on whether any secondary links were determined to represent security threats.

23. The method of claim 17, wherein the second output indicates that the email includes a link to a Hypertext Markup Language (HTML) resource, and wherein performing the action comprises:

following the link so that the HTML resource is accessed using a virtual web browser;

capturing a screenshot of the HTML resource through the virtual web browser;

applying a computer vision algorithm designed to identify similarities between the screenshot and a library of verified sign-in websites; and determining whether the link represents a security threat based on an output produced by the computer vision algorithm.

24. The method of claim 17, wherein the second output indicates that the email includes an attachment, and wherein performing the action comprises:

opening the attachment within a secure processing environment; and determining whether the attachment represents a security threat based on an analysis of content of the attachment.

* * * * *